US008908494B2

(12) United States Patent
Han et al.

(10) Patent No.: US 8,908,494 B2
(45) Date of Patent: Dec. 9, 2014

(54) SEQUENCE-GENERATING METHOD, AND APPARATUS FOR SAME

(75) Inventors: Seung Hee Han, Anyang-si (KR); Jin Sam Kwak, Gunpo-si (KR); Sung Ho Moon, Anyang-si (KR); Min Seok Noh, Seoul (KR); Hyun Woo Lee, Anyang-si (KR)

(73) Assignee: LG Electronics Inc., Seoul (KR)

( * ) Notice: Subject to any disclaimer, the term of this patent is extended or adjusted under 35 U.S.C. 154(b) by 272 days.

(21) Appl. No.: 13/425,262

(22) Filed: Mar. 20, 2012

(65) Prior Publication Data
US 2012/0177145 A1 Jul. 12, 2012

Related U.S. Application Data

(63) Continuation of application No. 13/119,670, filed as application No. PCT/KR2010/000824 on Feb. 10, 2010, now Pat. No. 8,520,501.

(60) Provisional application No. 61/153,291, filed on Feb. 17, 2009, provisional application No. 61/156,892, filed on Mar. 3, 2009, provisional application No. 61/168,221, filed on Apr. 10, 2009, provisional application No. 61/223,355, filed on Jul. 6, 2009.

(30) Foreign Application Priority Data

Aug. 21, 2009 (KR) .................. 10-2009-0077562

(51) Int. Cl.
*H04J 11/00* (2006.01)
*H04L 5/00* (2006.01)
*H04J 13/10* (2011.01)

(52) U.S. Cl.
CPC .............. *H04L 5/0007* (2013.01); *H04L 5/003* (2013.01); *H04J 13/10* (2013.01)
USPC ............ 370/210; 370/308; 375/295; 375/340

(58) Field of Classification Search
None
See application file for complete search history.

(56) References Cited

U.S. PATENT DOCUMENTS

| 6,006,089 | A | 12/1999 | Sasaki et al. | |
|---|---|---|---|---|
| 7,203,245 | B1 * | 4/2007 | Murphy | ........................ 375/260 |

(Continued)

FOREIGN PATENT DOCUMENTS

| CN | 101047683 A | 10/2007 |
|---|---|---|
| CN | 101296210 A | 10/2008 |

(Continued)

OTHER PUBLICATIONS

Kwon et al., "Design and Implementation of a Simulator Based on a Cross-Layer Protocol between MAC and PHY Layers in a WiBro Compatible IEEE 802.16e OFDMA System," Cross-Layer Design, IEEE Communications Magazine, vol. 43, No. 12, Dec. 2005, pp. 136-146.

*Primary Examiner* — David Oveissi
(74) *Attorney, Agent, or Firm* — Birch, Stewart, Kolasch & Birch, LLP

(57) ABSTRACT

The present invention relates to a wireless communication system. More particularly, the present invention relates to a method for enabling a transmitter to transmit a sequence in a wireless communication system, and to an apparatus for the same. A sequence-transmitting method comprises the steps of: performing at least one of a complex conjugate operation and a reverse operation on a first sequence to generate a second sequence; mapping the second sequence to a plurality of subcarriers in an Orthogonal Frequency Division Multiple Access (OFDMA) symbol; and transmitting the OFDMA symbol to a receiver. The invention also relates to an apparatus for the sequence-generating method.

20 Claims, 18 Drawing Sheets

(56) References Cited

U.S. PATENT DOCUMENTS

| | | |
|---|---|---|
| 8,320,508 B1 | 11/2012 | Lee et al. |
| 8,520,501 B2 * | 8/2013 | Han et al. ............... 370/210 |
| 2006/0133451 A1 | 6/2006 | Birru et al. |
| 2006/0153282 A1 | 7/2006 | Jung et al. |
| 2006/0193393 A1 | 8/2006 | Shen et al. |
| 2008/0212463 A1 * | 9/2008 | Huo ............... 370/210 |
| 2009/0268602 A1 | 10/2009 | Han et al. |
| 2010/0027704 A1 | 2/2010 | Ho et al. |
| 2010/0086078 A1 * | 4/2010 | Dogan et al. ............ 375/295 |
| 2010/0165942 A1 | 7/2010 | Liao et al. |
| 2010/0172341 A1 | 7/2010 | Park et al. |
| 2010/0220695 A1 | 9/2010 | Han et al. |
| 2010/0329186 A1 | 12/2010 | Lim et al. |
| 2011/0019567 A1 | 1/2011 | Jiao et al. |
| 2012/0243635 A1 | 9/2012 | Kwon et al. |

FOREIGN PATENT DOCUMENTS

| | | |
|---|---|---|
| JP | 2009-517915 A | 4/2009 |
| JP | 2009-519670 A | 5/2009 |
| JP | 2009-540665 A | 11/2009 |
| JP | 2011-10303 A | 1/2011 |
| JP | 2011-517144 A | 5/2011 |
| JP | 2012-513712 A | 6/2012 |
| JP | 2012-514889 A | 6/2012 |
| WO | WO 2007/055531 A2 | 5/2007 |
| WO | WO 2008/075881 A2 | 6/2008 |
| WO | WO 2010/075806 A1 | 7/2010 |
| WO | WO 2010/079953 A2 | 7/2010 |

* cited by examiner

Differential auto-correlation in frequency domain

Cubin metric

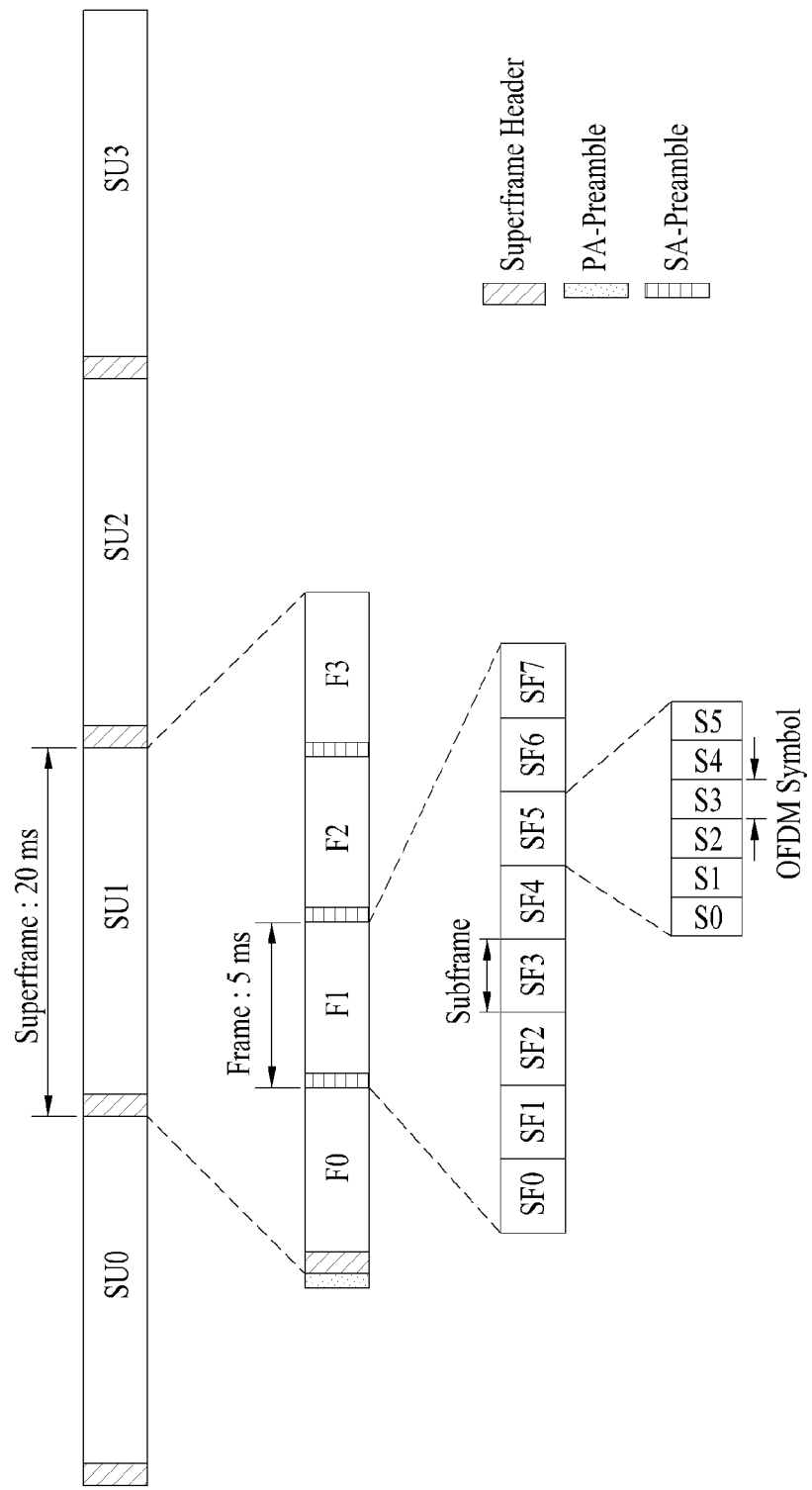

Similarly, each four blocks of the 4-antenna case is transmitted using two antennas in the 8-antenna case using the interleaved structure FIG. 16
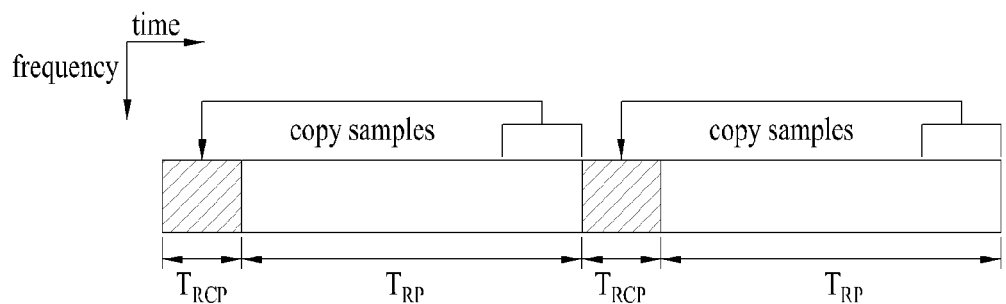
(a) Structure 1
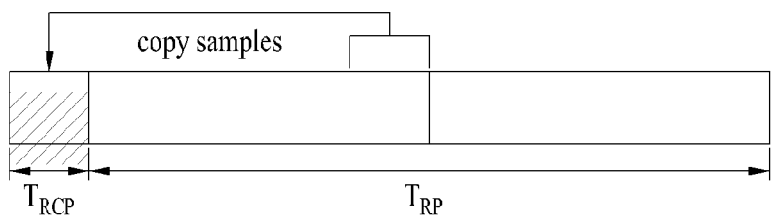
(b) Structure 2
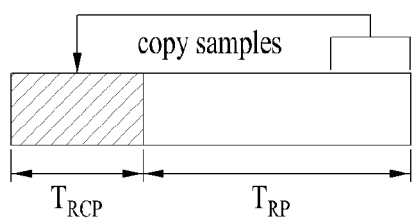
(c) Structure 3
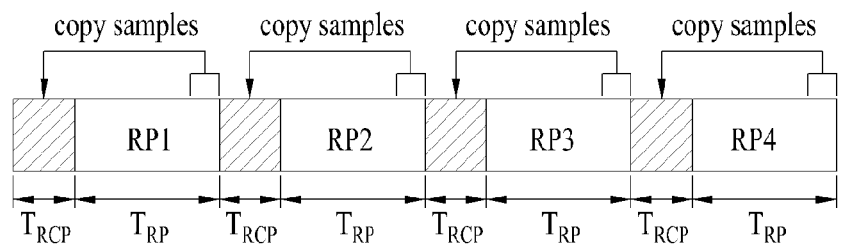
(d) Structure 4

SEQUENCE-GENERATING METHOD, AND APPARATUS FOR SAME

CROSS REFERENCE TO RELATED APPLICATIONS

This application is a Continuation application of U.S. application Ser. No. 13/119,670, filed on Mar. 17, 2011, now U.S. Pat. No. 8,520,501, which is the National Phase of PCT/KR2010/000824 filed on Feb. 10, 2010, which claims priority under 35 USC 119(e) to U.S. Provisional Application Nos. 61/153,291 filed Feb. 17, 2009; 61/156,892 filed Mar. 3, 2009; 61/168,221 filed Apr. 10, 2009; 61/223,355 filed Jul. 6, 2009 and under 35 USC 119(a) to Patent Application No. 10-2009-0077562 filed in Republic of Korea on Aug. 21, 2009, all of which are hereby expressly incorporated by reference into the present application.

TECHNICAL FIELD

The present invention relates to a wireless communication system, and more particularly, to a method and apparatus for transmitting and receiving a sequence in a wireless communication system.

BACKGROUND ART

FIG. 1 illustrates an exemplary wireless communication system. Referring to FIG. 1, a wireless communication system 100 includes a plurality of Base Stations (BSs) 110a, 110b and 110c and a plurality of Mobile Stations (MSs) 120a to 120i. The wireless communication system 100 may include a homogeneous network or a heterogeneous network. A heterogeneous network refers to a network in which different network entities co-exist, such as macro cells, femto cells, pico cells, relays, etc. A BS is typically a fixed station that communicates with MSs and each BS 110a, 110b or 110c provides services to a specific geographical area 102a, 102b or 102c. To increase system performance, the specific area may be divided into a plurality of smaller areas 104a, 104b and 104c, which may be called cells, sectors, or segments. In an Institute of Electrical and Electronics Engineers (IEEE) 802.16 system, a cell Identifier (ID) (IDcell) is assigned from the perspective of the entire system, whereas a sector ID or segment ID is assigned from the perspective of the coverage area of each BS, ranging from 0 to 2. The MSs 120a to 120i are fixed or mobile terminals that are usually distributed over the wireless communication system 100. Each MS may communicate with one or more BSs at a given time instant on a downlink and uplink. The communication between an MS and a BS may be carried out in Frequency Division Multiple Access (FDMA), Time Division Multiple Access (TDMA), Code Division Multiple Access (CDMA), Single Carrier-FDMA (SC-FDMA), Multi Carrier-FDMA (MC-FDMA), Orthogonal Frequency Division Multiple Access (OFDMA), or a combination of two or more of them. Herein, the term "uplink" refers to a communication link directed from an MS to a BS, and the term "downlink" refers to a communication link directed from a BS to an MS.

FIG. 2 illustrates the structure of a downlink subframe in an IEEE 802.16e system. The downlink frame structure was designed for operation in Time Division Duplex (TDD) mode.

Referring to FIG. 2, the downlink subframe includes a plurality of Orthogonal Frequency Division Multiplexing (OFDM) symbols. The downlink subframe is divided in structure into a preamble, a Frame Control Header (FCH), a Downlink-MAP (DL-MAP), an Uplink-MAP (UL-MAP), and DL bursts. Each downlink subframe starts with a preamble that occupies the first OFDM symbol of the downlink subframe. The preamble is used for time synchronization acquisition, frequency synchronization acquisition, cell search, and channel estimation.

FIG. 3 illustrates subcarriers to which a preamble is mapped in 1024-Fast Fourier Transform (FFT) mode (a 10-MHz bandwidth) in the IEEE 802.16e system.

Referring to FIG. 3, some areas at both sides of a given bandwidth are used as guard bands. Therefore, the preamble is mapped to the rest except the guard bands. The remaining frequency area except the guard bands is divided into three segments for three sectors. A preamble is inserted at an interval of three subcarriers, with 0s filled at the other subcarriers. For example, a preamble for segment 0 is inserted at subcarriers 0, 3, 6, 9, ..., 843, 846 and 849. A preamble for segment 1 is inserted at subcarriers 1, 4, 7, 10, ..., 844, 847 and 850. A preamble for segment 2 is inserted at subcarriers 2, 5, 8, 11, ..., 845, 848 and 851.

In the IEEE 802.16e system, a sequence used for the preamble is a binary code inserted in a frequency area, as proposed by Runcom. Among sequences that can be generated as binary codes, sequences that satisfy certain correlation properties and have low Peak-to-Average Power Ratios (PAPRs) in the time domain were found by computer-aided search. Table 1 below lists some preamble sequences.

TABLE 1

| Index | IDcell | Segment | Series to modulate (in hexadecimal format) |
|---|---|---|---|
| 0 | 0 | 0 | 0xA6F294537B285E1844677D133E4D53CCB1F182DE00489E53E6B6E77065C7EE7D0ADBEAF |
| 1 | 1 | 0 | 0x668321CBBE7F462E6C2A07E8BBDA2C7F7946D5F69E35ACEACF7D64AB4A33C467001F3B2 |
| 2 | 2 | 0 | 0x1C75D30B2DF72CEC9117A0BD8EAF8E0502461FC07456AC906ADE03E9B5AB5E1D3F98C6E |
| 3 | 3 | 0 | 0x5F9A2E5CA7CC69A5227104FB1CC2262809F3B10D0542B9BDFDA4A73A7046096DF0E8D3D |

Referring to Table 1, a preamble sequence is determined according to a segment number and a parameter IDcell. Each preamble sequence is converted to a binary signal and modulated by Binary Phase Shift Keying (BPSK), prior to mapping to subcarriers. Specifically, a hexadecimal sequence is converted to a binary sequence $W_k$ and modulated by BPSK in the order from the Most Significant Bit (MSB) to the Least Significant Bit (LSB) (0=>+1, 1=>−1). For example, hexadecimal sequence 0 is converted to $W_k$[110000010010 . . . ] and then modulated to [−1 −1 +1 +1 +1 +1 +1 −1 +1 +1 −1 +1 . . . ].

FIGS. 2 and 3 are examples of using sequences for signal transmission. Besides the preamble, sequences are used for transmission of many other channels and signals in the wireless communication system. For example, sequences have a variety of usages including synchronization channels, a midamble, a reference signal, control channels, scrambling codes, and multiplexing in the wireless communication system. The sequences preferably satisfy the following characteristics:

The sequences have good correlation properties to provide good detection performance;

The sequences have Low Cubic Metrics (CMs) or PAPRs to maximize the efficiency of a power amplifier;

Many sequences are available to facilitate transmission of a large amount of information or cell planning;

The sequences reduce a memory size requirement for storing the sequences; and

A receiver has a low complexity, when the receiver uses the sequences.

Especially the complexity of the receiver is a very significant factor that directly affects its battery lifetime. Accordingly, there exists a need for a method for generating a sequence so as to further decrease a memory size requirement, while reducing complexity.

DISCLOSURE

Technical Problem

Accordingly, the present invention is directed to a method for generating a sequence that substantially obviates one or more problems due to limitations and disadvantages of the related art.

An object of the present invention is to provide a method and apparatus for generating sequences in a wireless communication system.

Another object of the present invention is to provide a method and apparatus for generating sequences having excellent correlation properties and low Peak-to-Average Power Ratios (PAPRs) or Cubic Metrics (CMs).

Another object of the present invention is to provide a method and apparatus for generating sequences in such a manner that maximizes the number of available sequences.

A further object of the present invention is to provide a method and apparatus for generating sequences which have a low memory size requirement and which a receiver can detect or estimate with low complexity.

Technical Solution

To achieve these objects and other advantages and in accordance with the purpose of the invention, as embodied and broadly described herein, a method for transmitting a sequence at a transmitter in a wireless communication system includes generating a second sequence by performing at least one of complex conjugation and a reverse operation on a first sequence, mapping the second sequence to a plurality of subcarriers in an Orthogonal Frequency Division Multiple Access (OFDMA) symbol, and transmitting the OFDMA symbol to a receiver.

The method may further include modulating the first sequence to a complex sequence according to a type of the first sequence.

The first sequence may be at least one of sequences included in a sequence set that is stored in the transmitter.

The type of the first sequence may be Quadrature Phase Shift Keying (QPSK).

The second sequence may be transmitted on a synchronization channel. Also, the second sequence may be transmitted on a ranging channel.

The first sequence may be at least one of sequences listed in Table 11, Table 12 and Table 13.

In another aspect of the present invention, a transmitter for transmitting a sequence in a wireless communication system includes a second sequence generator for generating a second sequence by performing at least one of complex conjugation and a reverse operation on a first sequence, a subcarrier mapper for mapping the second sequence to a plurality of subcarriers in an OFDMA symbol, and a transmission module for transmitting the OFDMA symbol to a receiver.

The transmitter may further include a constellation mapper for modulating the first sequence to a complex sequence according to a type of the first sequence.

In another aspect of the present invention, a method for transmitting a sequence at a transmitter in a wireless communication system includes modulating a first sequence to a complex sequence according to a type of the first sequence, mapping the complex sequence to a plurality of subcarriers in an OFDMA symbol, and transmitting the OFDMA symbol to a receiver. The first sequence is at least one of sequences included in Table 11, Table 12 and Table 13.

The type of the first sequence may be QPSK. Then, the first sequence $W_i^{(p)}$ may be modulated to QPSK symbols $w_{2i}^{(p)}$ and $w_{2i+1}^{(p)}$ by the following equation, $$w_{2i}^{(p)} = \exp\left(j\frac{\pi}{2}(2 \cdot a_{i,0}^{(p)} + a_{i,1}^{(p)})\right)$$

$$w_{2i+1}^{(p)} = \exp\left(j\frac{\pi}{2}(2 \cdot a_{i,2}^{(p)} + a_{i,3}^{(p)})\right)$$

where $W_i^{(p)} = 2^3 \cdot a_{i,0}^{(p)} + 2^2 \cdot a_{i,1}^{(p)} + 2^1 \cdot a_{i,2}^{(p)} + 2^0 \cdot a_{i,3}^{(p)}$ and i is an integer from 0 to 107.

The first sequence may be cyclically extended according to a Fast Fourier Transform (FFT) size.

The first sequence may be a Secondary Advanced Preamble (SA-Preamble) used for downlink synchronization. The SA-Preamble may be mapped to subcarriers by the following equation, $$SAPreambleCarrierSet_n = n + 3 \cdot k + 40 \cdot \frac{N_{SAP}}{144} + \left\lfloor \frac{2 \cdot k}{N_{SAP}} \right\rfloor$$

where n denotes an index of an SA-Preamble carrier set, indicating a segment Identifier (ID) ranging from 0 to 2, $N_{SAP}$ denotes a length of the SA-Preamble, and k is an integer ranging from 0 to $N_{SAP}-1$.

The first sequence may indicate information about a cell ID, IDcell according to the following equation, IDcell=256×n+Idx where n is an index of an SA-Preamble carrier set, indicating a segment ID ranging from 0 to 2, and Idx is an integer ranging from 0 to 255.

The method may further include performing at least one of complex conjugation and a reverse operation on the first sequence.

One of block cover sequences listed in the following table may be applied to the first sequence on a subblock basis, Block cover sequence (hexadecimal format)

| (FFT, number of antennas)\Segment ID | 0 | 1 | 2 |
|---|---|---|---|
| (512,1) | 00 | 00 | 00 |
| (512,2) | 22 | 22 | 37 |
| (512,4) | 09 | 01 | 07 |
| (512,8) | 00 | 00 | 00 |
| (1024,1) | 0FFF | 555A | 000F |
| (1024,2) | 7373 | 3030 | 0000 |
| (1024,4) | 3333 | 2D2D | 2727 |
| (1024,8) | 0F0F | 0404 | 0606 |
| (2048,1) | 0F0FFF00 | 00000FF0 | 0F000FFF |
| (2048,2) | 7F55AA42 | 4438180C | 3A5A26D9 |
| (2048,4) | 1A13813E | 03284BF0 | 391A8D37 |
| (2048,8) | 0D0EF8FA | 0C0BFC59 | 03000656 |

In the above table, a block cover sequence converted to a binary sequence $\{0, 1\}$ is mapped to $\{+1, -1\}$.

Transmission power of the first sequence may be boosted using one of boosting levels listed in the following table, Boosting Level

| Ant\FFT | 512 | 1024 | 2048 |
|---|---|---|---|
| 1 | 1.87 | 1.75 | 1.69 |
| 2 | 2.51 | 2.33 | 2.42 |
| 4 | 4.38 | 3.56 | 3.50 |
| 8 | 8.67 | 6.25 | 4.95 |

The first sequence may be transmitted through a plurality of antennas. In this case, the first sequence may be interleaved across the plurality of antennas on a block basis.

In another aspect of the present invention, a transmitter for transmitting a sequence in a wireless communication system includes a memory for storing at least part of sequences included in Table 11, Table 12, and Table 13, a constellation mapper for modulating a first sequence selected from the memory to a complex sequence according to a type of the first sequence, a subcarrier mapper for mapping the complex sequence to a plurality of subcarriers in an OFDMA symbol, and an RF module for transmitting the OFDMA symbol to a receiver.

In another aspect of the present invention, a method for detecting a sequence at a receiver in a wireless communication system includes receiving from a transmitter a sequence mapped to a plurality of subcarriers in an OFDMA symbol, correlating a first sequence with the received sequence, and detecting the received sequence based on a correlation. The first sequence is at least one of sequences included in Table 11, Table 12 and Table 13.

For the correlation operation, preliminary computations may be performed on combinations between real and imaginary parts of the received sequence and real and imaginary parts of the at least one first sequence. Correlations between the received sequence and the at least one first sequence and between the received sequence and a complex conjugate sequence of the first sequence may be obtained by combining a plurality of preliminary correlations.

The first sequence may be an SA-Preamble used for downlink synchronization. The SA-Preamble may be mapped to subcarriers by the following equation, $$SAPreambleCarrierSet_n = n + 3 \cdot k + 40 \cdot \frac{N_{SAP}}{144} + \left\lfloor \frac{2 \cdot k}{N_{SAP}} \right\rfloor$$

where n denotes an index of an SA-Preamble carrier set, indicating a segment Identifier (ID) ranging from 0 to 2, $N_{SAP}$ denotes a length of the SA-Preamble, and k is an integer ranging from 0 to $N_{SAP}-1$.

The method may further include acquiring a cell ID from the received sequence.

In a further aspect of the present invention, a receiver for detecting a sequence in a wireless communication system includes an RF module for receiving from a transmitter a sequence mapped to a plurality of subcarriers in an OFDMA symbol, a memory for storing at least part of sequences included in Table 1, Table 2 and Table 3, and a processor for correlating at least one first sequence stored in the memory with the received sequence and detecting the received sequence based on a correlation.

The processor may acquire a cell ID from the received sequence.

The receiver may further include a buffer for temporarily storing a real part of a sequence and a buffer for temporarily storing an imaginary part of the sequence.

The receiver may further include a first buffer for temporarily storing a real part of the received sequence, a second buffer for temporarily storing an imaginary part of the received sequence, a third buffer for temporarily storing a real part of the at least one first sequence, and a fourth buffer for temporarily storing an imaginary part of the at least one first sequence.

It is to be understood that both the foregoing general description and the following detailed description of the present invention are exemplary and explanatory and are intended to provide further explanation of the invention as claimed.

Advantageous Effects

As is apparent from the above description, the embodiments of the present invention have the following effects.

Sequences can be provided for use in channels, signals, etc.

In addition, sequences having excellent correlation properties and low PAPRs or CMs can be provided.

The number of available sequences can be maximized.

Further, a memory size requirement for storing sequences can be reduced and a receiver can detect or estimate sequences with low complexity.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

DESCRIPTION OF DRAWINGS

The accompanying drawings, which are included to provide a further understanding of the invention and are incorporated in and constitute a part of this application, illustrate embodiments of the invention and together with the description serve to explain the principle of the invention. In the drawings:

FIG. 8 illustrates a radio frame structure in an IEEE 802.16m system.

FIG. 16 illustrates exemplary ranging channel structures in the IEEE 802.16m system.

MODE FOR INVENTION

Figure 1:
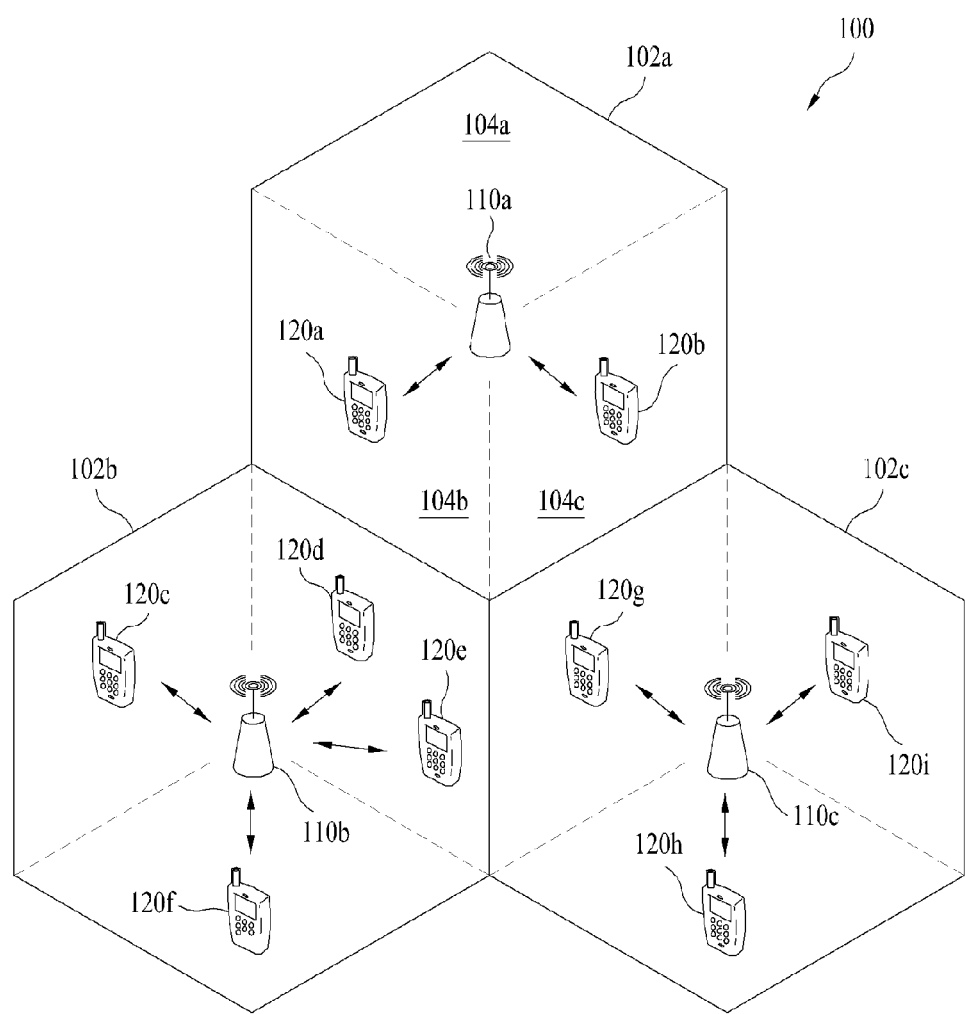
FIG. 1 illustrates an exemplary wireless communication system.
Figure 2:
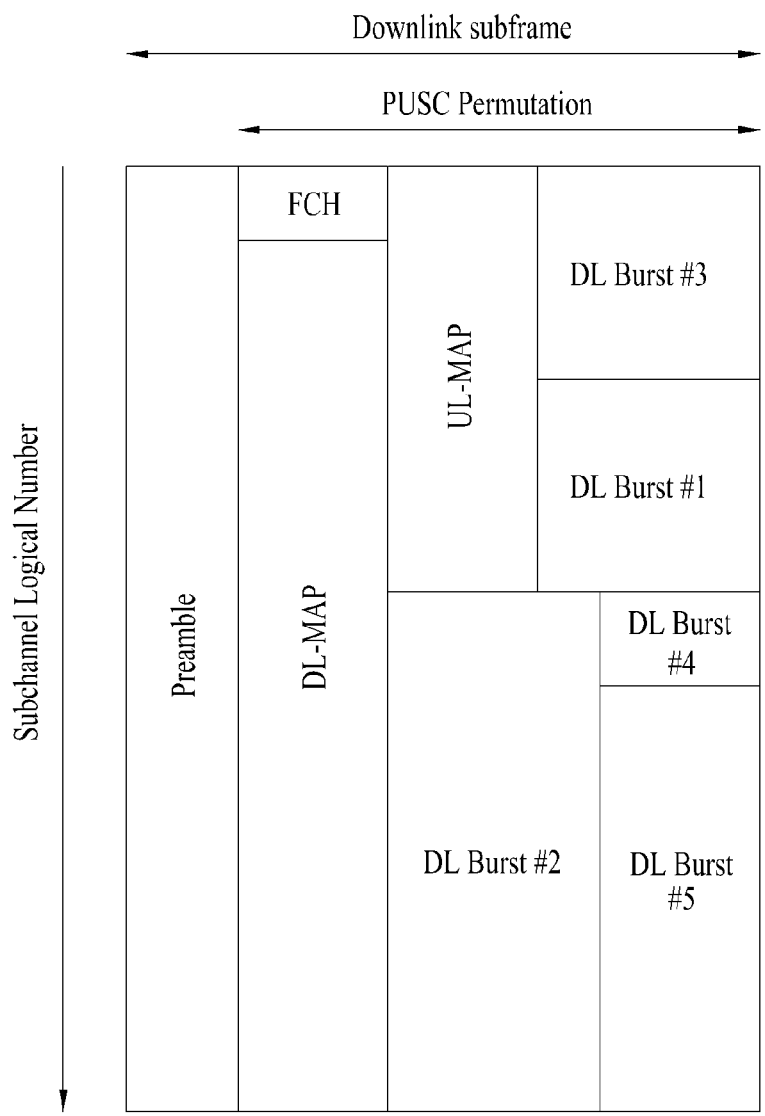
FIG. 2 illustrates a downlink subframe structure in an Institute of Electrical and Electronics Engineers (IEEE) 802.16e system.

The above and other objects, features and other advantages of the present invention will be more clearly understood from the following detailed description taken in conjunction with the accompanying drawings. Reference will now be made in detail to the preferred embodiments of the present invention, examples of which are illustrated in the accompanying drawings. Embodiments of the present invention are examples to which the technical features of the present invention are applied. While the present invention is described in the context of an Institute of Electrical and Electronics Engineers (IEEE) 802.16 system by way of example, it is also applicable to a variety of wireless communication systems including a $3^{rd}$ Generation Partnership Project (3GPP) system.

In wireless communication systems, sequences are used as follows. The followings are mere examples and thus sequences are available to many other channels and signals.

Downlink (DL) Sync Channel

The DL sync channel is used for acquisition of downlink time synchronization and frequency synchronization and for cell search. Specifically, synchronization is acquired and a physical cell Identifier (ID) is detected, by correlating sequences with a sequence received on the DL sync channel. For the purpose of cell ID detection, the existence of as many sequences as possible is favorable in terms of cell planning.

According to systems, the DL sync channel is called different names. For example, the DL sync channel is called a Synchronization Signal (SS) in 3GPP Long Term Evolution (LTE), a preamble in IEEE 802.16e, and an advanced preamble in IEEE 802.16m.

Since a Mobile Station (MS) serves as a receiver, the complexity of the receiver is a very significant issue.

Uplink (UL) Sync Channel

The UL sync channel is used for acquisition of uplink time synchronization and frequency synchronization, access for network registration, a scheduling request, a bandwidth request, etc. A sequence transmitted on the UL sync channel is regarded as an opportunity. A Base Station (BS) may identify an opportunity in which an MS has transmitted a signal by detecting the sequence. The BS may also track timing or estimate a residual frequency offset by use of the detected sequence. Since less collision occurs with more opportunities, the existence of many sequences is favorable. In terms of cell planning, it is also preferable to generate as many sequences as possible.

The UL sync channel is also called a Random Access CHannel (RACH) in 3GPP LTE, and a ranging channel in IEEE 802.16e/m.

In relation to the UL sync channel, the receiver complexity is a consideration.

DL/UL Reference Signal

If a transmitter transmits a signal after coherent modulation (e.g. Phase Shift Keying (PSK), Quadrature Amplitude Modulation (QAM), etc.), a receiver should estimate a fading channel that the signal has experienced and compensate for the fading channel, for signal demodulation. In general, to help the receiver with the fading channel estimation, the transmitter transmits a Reference Signal (RS) along with the signal. The RS is also used for the receiver to measure the channel quality of its serving cell or another cell. The RS may also serve the purpose of timing/frequency tracking. In addition, an MS may synchronize its timing using an RS, when it wakes up from sleep mode. In this manner, the RS may serve many purposes. The RS is generally transmitted using a sequence and as more sequences are available, it is better in terms of cell planning.

An RS is called as it is in 3GPP LTE and a pilot signal in IEEE 802.16e/m.

The receiver complexity is to be considered in relation to the DL/UL RS.

DL/UL Control Channel

Control information may be transmitted using a sequence on a control channel. For example, a Channel Quality Indicator (CQI) or an ACKnowledgement/Negative ACKnowledgement (ACK/NACK) may be transmitted as a sequence. More information can be transmitted with more sequences.

In relation to the DL/UL control channel, the receiver complexity needs to be considered.

Scrambling

Scrambling has many usages. For example, scrambling may be used for randomization or PAPR (or CM) reduction. A signal can be scrambled by multiplying it by a sequence, element by element. Also, a signal can be scrambled by adding the signal to a sequence, element by element and then modulo-operating the sum. Scrambling is not limited to a specific channel. In terms of cell planning, it is better to have many available sequences.

The receiver complexity needs to be considered in relation to scrambling.

User Multiplexing or Channel Multiplexing

Sequences may be used in multiplexing a plurality of users in one channel by Code Division Multiplexing (CDM). Sequences may also be used in multiplexing channels by CDM. A multiplexing capability is related to the number of available sequences.

In relation to user multiplexing or channel multiplexing, the receiver complexity is an issue to be considered.

Midamble

A midamble is an area allocated for a common pilot in a frame. A midamble sequence may be used for channel estimation, Multiple Input Multiple Output (MIMO) channel estimation, CQI estimation, etc.

In relation to the midamble, the receiver complexity is to be considered.

The following embodiments of the present invention are applicable simply to all of the above-described channels (e.g. pilot, control channel, UL sync channel, etc.). Accordingly, unless stated otherwise, the embodiments of the present invention will be described, centering on a DL sync channel (e.g. a preamble, a Synchronization CHannel (SCH), etc.), for the convenience' sake of description.

Embodiment 1

Sequence Generation

Preferably, sequences satisfy the following conditions for a DL sync channel:
A. Low PAPR (or CM): for channel boosting to extend coverage;
B. Low complexity: for saving battery power by reducing the computation volume of correlation at an MS;
C. Small memory size: for reducing a memory size required for storing sequences; and
D. Low correlation properties
  Low cross-correlation: for reducing false alarm during cell ID detection and for distinguishing an intended cell component from a neighbor cell component during channel estimation
  Low differential cross-correlation: a cross-correlation property regarding non-coherent detection on frequency-selective fading channels, when a sequence is transmitted in a wide band.
  Low auto-correlation side peak in frequency domain: for compensating for an integer frequency offset.
  Low differential auto-correlation side peak in frequency domain: for compensating for an integer frequency offset by differential auto-correlation, for frequency-domain implementation.
  Low cross-correlation in time domain: cross-correlation in the frequency domain is equivalent to cross-correlation in the time domain. Therefore, low cross-correlation in the time domain amounts to low cross-correlation in the frequency domain.
  Low auto-correlation side peak in time domain: important for detection of accurate symbol timing. When timing synchronization is acquired by cross-correlation with a known sequence, a non-periodic auto-correlation property is significant (e.g. a 3GPP family). On the other hand, if coarse timing synchronization based on waveform characteristics (e.g. a repetition structure) is followed by fine timing synchronization during a Cyclic Prefix (CP) duration after cell ID detection, a periodic auto-correlation property in the time domain is significant (e.g. IEEE 802.16e/m, IEEE 802.20, etc.). For a sequence having a flat spectrum in the frequency domain, a periodic auto-correlation side peak in the time domain is zero (i.e. a delta function). Hence, this property may not be examined for a sequence having a frequency flat amplitude.

Figure 4:
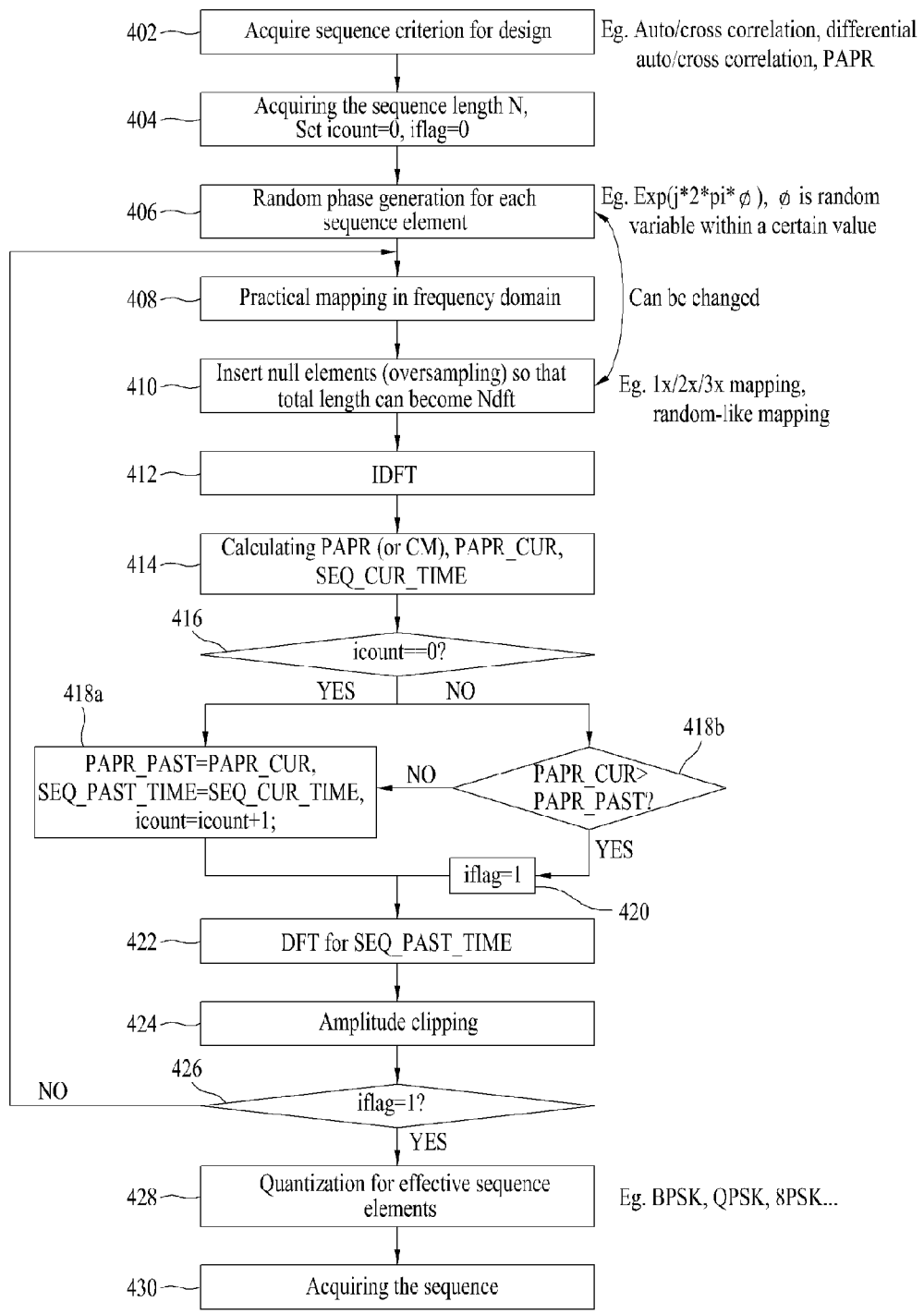
FIG. 4 is a flowchart illustrating a method for generating sequences having Peak-to-Average Power Ratios (PAPRs) or Cubic Metrics (CMs) and excellent basic properties in terms of auto-correlation, cross-correlation, differential auto-correlation, and differential cross-correlation according to an embodiment of the present invention.

FIG. 4 is a flowchart illustrating a method for generating sequences having low PAPRs or CMs and excellent basic properties in terms of auto-correlation, cross-correlation, differential auto-correlation, and differential cross-correlation according to an embodiment of the present invention. The sequence generation largely involves three steps.

Step 1: sequences with low PAPRs are selected from among randomly generated sequences. First, a sequence generation criterion is set according to an intended purpose in step 402. In steps 404 and 406, a sequence of length N is generated in such a manner that each element of the sequence has a constant amplitude and a random phase. The random phase may be created using a random variable having a uniform or Gaussian distribution, as is known in the art. Considering a channel that will carry the sequence, the sequence of length N is mapped to subcarriers in the frequency domain in step 408. For example, the sequence may be mapped to consecutive or distributed subcarriers. Specifically, the sequence is inserted at an interval of two subcarriers (2× mapping) or three subcarriers (3× mapping). Besides, the sequence may be mapped to subcarriers on a small block basis. Or the sequence may be mapped to subcarriers in a random-like manner. Then null subcarriers are inserted into the sequence, taking into account of oversampling or guard subcarriers, so that the sequence is of length Ndft in step 410. The sequence mapped to the subcarriers is converted to a time signal by Ndft-point Inverse Discrete Fourier Transform (IDFT) in step 412 and the PAPR (or CM) of the time signal is calculated in step 414. If the PAPR is smaller than the PAPR of a previous iteration, the iteration continues by Discrete Fourier Transform (DFT) in steps 416, 418a, 418b, 422, 424 and 426. On the contrary, if the PAPR is larger than the PAPR of the previous iteration, the loop (steps 416, 418a, 418b, 422, 424 and 426) is terminated. Then the sequence resulting from the DFT is quantized according to its type (e.g. a BPSK type, a QPSK type, an 8PSK type, a poly-phase type, etc.) and thus a final sequence is acquired in steps 428 and 430. For example, the sequence resulting from the DFT may be quantized according to its type as follows.
  BPSK type sequence: +1, −1
  QPSK type sequence: +1, −1, +j, −j
  Poly-phase type sequence:

$$e^{j\phi} = \frac{a_I + ja_Q}{\sqrt{a_I^2 + a_Q^2}}$$

While the BPSK-type sequence and the QPSK-type sequence require the same volume of computation, the QPSK-type sequence (2 bits per element) requires twice as large a memory size as the BPSK-type sequence (1 bit per element).

Step 2: A sequence set satisfying PAPR<PAPR_THRESHOLD (or CM<CM_THRESHOLD) is selected from sequences generated in Step 1. PAPR_THRESHOLD or CM_THRESHOLD is a maximum allowed value for a channel that will deliver the sequences.

Step 3: A sequence set is finally selected from the sequence set selected in Step 2, which satisfies CORR<CORR_THRESHOLD. CORR_THRESHOLD may be an auto-/cross-correlation value and/or a differential auto-/cross-correlation value optimized for the channel. Steps 2 and 3 may be reversed in order. A sequence set may be additionally selected by applying a criterion different from the criteria used in Steps 2 and 3.

Embodiment 2

Sequence Extension by Reverse Operation

While this embodiment is applicable irrespective of time-domain or frequency-domain sequences, the following description is made in the context of frequency-domain sequences, for the convenience' sake. Given M sequences of length N, an $n^{th}$ element of an $m^{th}$ sequence (m=0, 1, ..., M−1) is denoted by $a^m(n)$. M sequences described in [Equation 1] may be extended to 2×M sequences described in [Equation 2] by a reverse operation.

$\{a^m(n)\}$ $m=0,1,\ldots,M-1$ $n=0,1,\ldots,N-1$ [Equation 1]

$\{a_{ext\_rev}^m(n)\}=\{a^m(n); \text{rev}(a^m(n))\}$ $m=0,1,\ldots,M-1$ $n=0,1,\ldots,N-1$ [Equation 2]

where the reverse operation rev(.) may be defined as $$a^{m_1}(n) = rev(a^{m_0}(n)) = a^{m_0}(N-1-n),$$
$$n = 0, 1, \ldots, N-1$$

[Equation 3]

The reverse operation-based sequence extension offers the following benefits.

If original complex sequences are random enough, sequences reverse to the original complex sequences and sets of the reverse sequences are also random enough. Optimization may be further performed by selecting reverse complex sequences having good characteristics.

The original complex sequences and their reverse complex sequences are identical in PAPR (or CM) properties. That is, if the original complex sequences have good PAPR (or CM) properties, their reverse complex sequences have also the same level of PAPR (or CM) properties.

There is no need for securing a memory size for storing the reverse complex sequences. This means that the memory size requirement can be reduced to a half.

Embodiment 3

Sequence Extension by Complex Conjugation

While this embodiment is applicable irrespective of time-domain or frequency-domain sequences, the following description is made in the context of frequency-domain sequences, for convenience' sake. Given M sequences of length N, an $n^{th}$ element of an $m^{th}$ sequence (m=0, 1, ..., M−1) is denoted by $a^m(n)$. M sequences described in [Equation 4] may be extended to 2×M sequences described in [Equation 5] by complex conjugation.

$$\{a^m(n)\}$$
$$m=0,1,\ldots,M-1$$
$$n=0,1,\ldots,N-1 \quad \text{[Equation 4]}$$

$$\{a_{ext\_conj}^m(n)\}=\{a^m(n); (a^m(n))^*\}$$
$$m=0,1,\ldots,M-1$$
$$n=0,1,\ldots,N-1 \quad \text{[Equation 5]}$$

where the complex conjugation (.)* may be defined as conversion from a complex signal (a+jb) to a complex signal (a−jb) and conversion from the complex signal (a−jb) to the complex signal (a+jb).

The complex conjugation-based sequence extension offers the following benefits.

If original complex sequences are random enough, their complex conjugates and sets of the complex conjugates are also random enough. Optimization may be further performed by selecting complex conjugates having good characteristics.

The original complex sequences and their complex conjugates are identical in PAPR (or CM) properties. That is, if the original complex sequences have good PAPR (or CM) properties, their complex conjugates have also the same level of PAPR (or CM) properties.

The cross-correlations of an original sequence and its complex conjugate with respect to a received signal can be calculated by one computation. In general, there are M hypotheses for M sequences, thus requiring M cross-correlation computations. Specifically, M×N complex additions are required to calculate cross-correlations for M hypotheses of M QPSK-type sequences. However, in the case where M sequences are extended to 2×M sequences by complex conjugation, the amount of information is doubled but M×N complex additions are needed, that is, the required computation volume is the same, which will be described later in more detail with reference to FIG. 6.

The complex conjugates do not need an additional memory size. That is, the required memory size may be reduced to a half.

Table 2 below compares conventional sequences with extended sequences according to an embodiment of the present invention, in terms of computation complexity and memory size requirement. It is assumed herein that a total of M sequences are available to a transmitter and a receiver and each of the M sequences is of length N.

TABLE 2

| | BPSK type | QPSK type | Proposed QPSK type (conjugate and reverse) |
|---|---|---|---|
| Number of real-value multiplications | 0 | 0 | 0 |
| Number of real-value additions | M(2N − 2) | M(2N − 2) | M(2N − 2)/2 |
| Normalized complexity to BPSK type (%) | 100% | 100% | 50% |
| Required memory size for M-set [in Bytes] | $\lceil \frac{M \cdot N}{8} \rceil$ | $\lceil \frac{2 \cdot M \cdot N}{8} \rceil$ | $\lceil \frac{2 \cdot M \cdot N}{8} \rceil / 4$ |
| Normalized memory size to BPSK type (%) | 100% | 200% | 50% |

Figure 5:
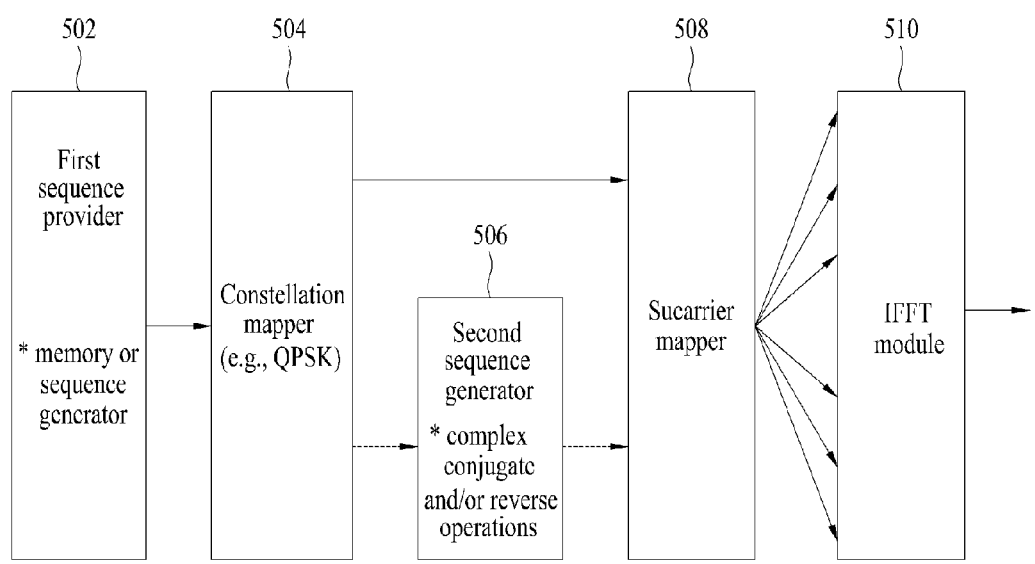
FIG. 5 is a block diagram of a transmitter for extending sequences by complex conjugation according to an embodiment of the present invention.

FIG. 5 is a block diagram of a transmitter for extending sequences by complex conjugation according to an embodiment of the present invention. For uplink transmission, a transmitter may be part of an MS and a receiver may be part of a BS.

Referring to FIG. 5, a first sequence provider 502 outputs a first sequence (hereinafter, referred to as a base sequence) to a constellation mapper 504 according to an inner setting. Depending on implementation, the base sequence may be selected from a set of pre-stored sequences in a memory, or generated from a sequence generator using a predetermined parameter. The constellation mapper 504 sequentially maps the received bit stream to complex values according to the type of the sequence. The sequence type may be an n-PSK type, an n-QAM type, a poly-phase type, etc. Here, n is an integer equal to or larger than 0. More specifically, the sequence type may be a QPSK type, an 8-PSK type, a 16-QAM type, a 64-QAM type, a poly-phase type, or the like. Especially, the QPSK type is preferable because it requires the same volume of computation as the BPSK type. For example, if the base sequence is a QPSK-type hexadecimal sequence, the constellation mapper 504 may sequentially map a hexadecimal sequence $W_i^{(p)}$ to two QPSK symbols $w_{2i}^{(p)}$ and $w_{2i+1}^{(p)}$, as expressed in [Equation 16].

$$w_{2i}^{(p)} = \exp\left(j\frac{\pi}{2}(2 \cdot a_{i,0}^{(p)} + a_{i,1}^{(p)})\right)$$
$$w_{2i+1}^{(p)} = \exp\left(j\frac{\pi}{2}(2 \cdot a_{i,2}^{(p)} + a_{i,3}^{(p)})\right)$$

[Equation 16]

where $W_i^{(p)}=2^3 \cdot a_{i,0}^{(p)}+2^2 \cdot a_{i,1}^{(p)}+2^1 \cdot a_{i,2}^{(p)}+2^0 \cdot a_{i,3}^{(p)}$. According to [Equation 16], binary numbers 00, 01, 10 and 11 are converted to 1, j, −1 and −j, respectively.

The constellation mapper 504 outputs the modulated complex values of the base sequence to a second sequence generator 506 and/or a subcarrier mapper 508. When the base sequence is to be transmitted, the constellation mapper 504 may output the complex values of the base sequence to the subcarrier mapper 508. On the other hand, if a second sequence (hereinafter, referred to as an extended sequence)

extended from the base sequence is to be transmitted, the constellation mapper 504 may output the complex values of the base sequence to the second sequence generator 506. Also, the constellation mapper 504 may output the QPSK symbols of the base sequence to the second sequence generator 506 irrespective of whether the base sequence is to be transmitted or not. That is, both the base sequence and the extended sequence may be generated and then one of the sequences is selected for transmission to a receiver.

The second sequence generator 504 may generate an extended sequence by subjecting the complex values of the base sequence to complex conjugation and/or a reverse operation. If there is no need for generating an extended sequence, the transmitter may not be provided with the second sequence generator 504. If M base sequences are available to the transmitter, the number of available sequences is increased up to 4×M by complex conjugation and the reverse operation. Let an $n^{th}$ element of an $M^{th}$ sequence (m=0, 1, ..., M−1) be denoted by $a^m(n)$. With the use of complex conjugation and the reverse operation, M base sequences expressed as [Equation 7] may be extended to 4×M sequences as described in [Equation 8].

$$\{a^m(n)\} \qquad \text{[Equation 7]}$$
$$m = 0, 1, \ldots, M-1$$
$$n = 0, 1, \ldots, N-1$$

$$\{a_{ext\_hybrid}(n)\} = \{a^m(n); (a^m(n))^*; rev(a^m(n)); (rev(a^m(n)))^*\} = \qquad \text{[Equation 8]}$$
$$\{a^m(n); (a^m(n))^*; rev(a^m(n)); rev((a^m(n))^*)\}$$
$$m = 0, 1, \ldots, M-1$$
$$n = 0, 1, \ldots, N-1$$

where the complex conjugation $(.)^*$ and the reverse operation $rev(.)$ have been defined before.

The subcarrier mapper 508 maps the complex values received from the constellation mapper 504 to subcarriers in the frequency domain. The complex values may be mapped to consecutive or distributed subcarriers, taking into account a channel that will carry the sequence. Then an Inverse Fast Fourier Transform (IFFT) module 510 converts the sequence mapped to the subcarriers to a time signal. The time signal is added with a CP and processed by digital-to-analog conversion, frequency upconversion, and power amplification, prior to transmission to the receiver.

Figure 6:
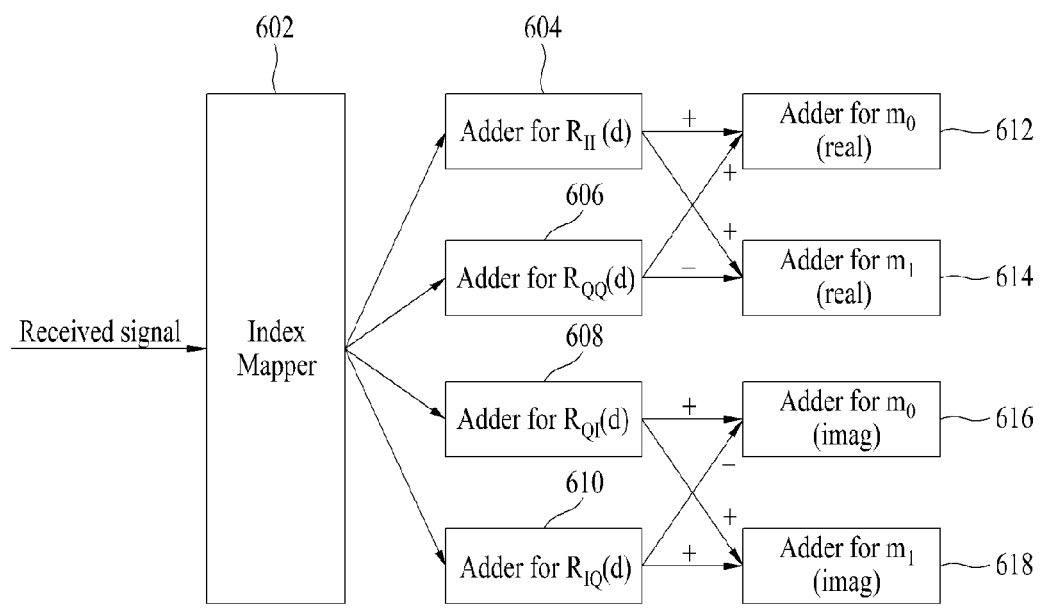
FIG. 6 is a block diagram of a receiver for detecting sequences according to an embodiment of the present invention.
Figure 7A:
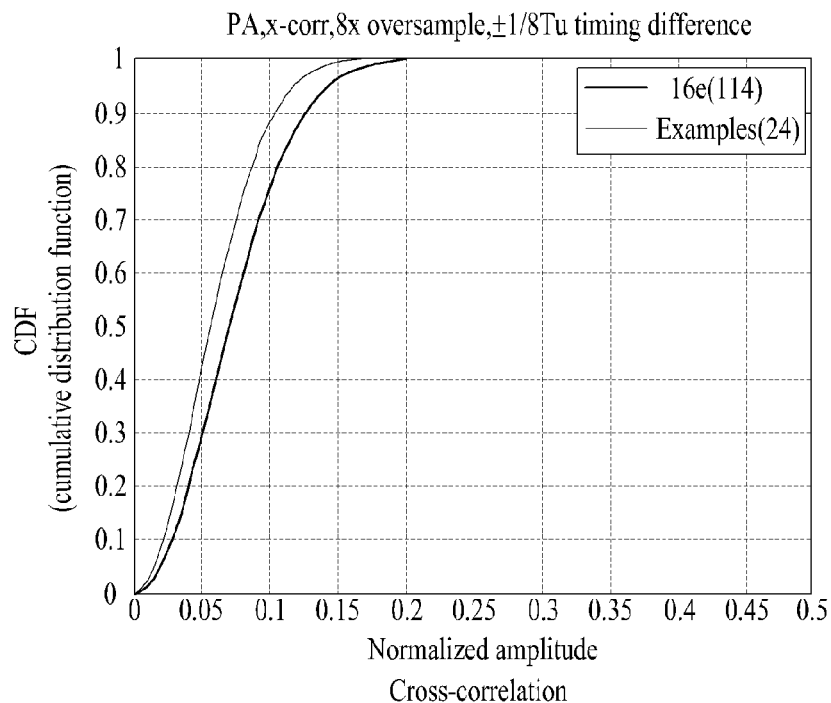
FIGS. 7A to 7E are graphs illustrating properties of sequences generated according to an embodiment of the present invention.
Figure 7B:
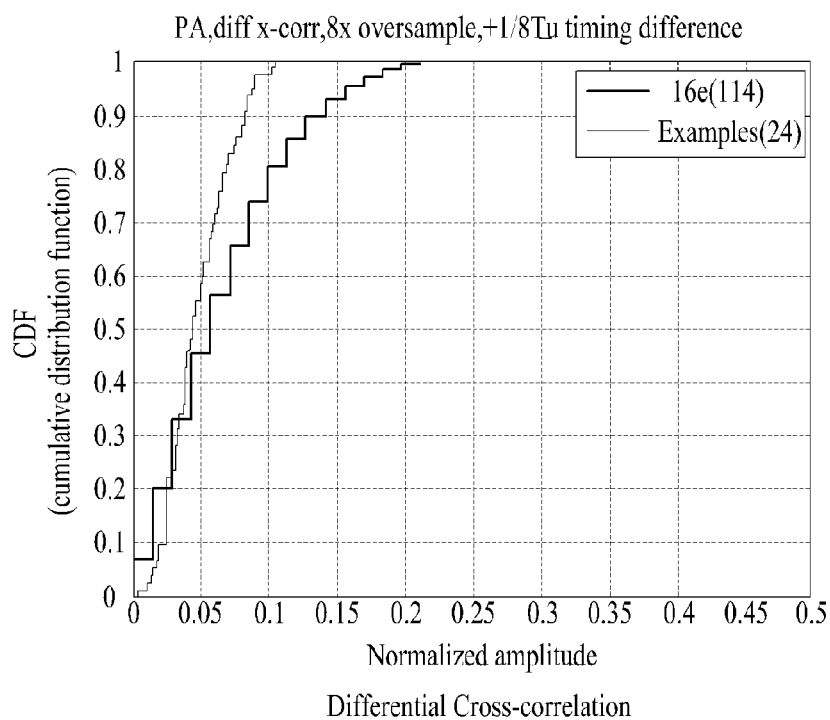
Figure 7C:
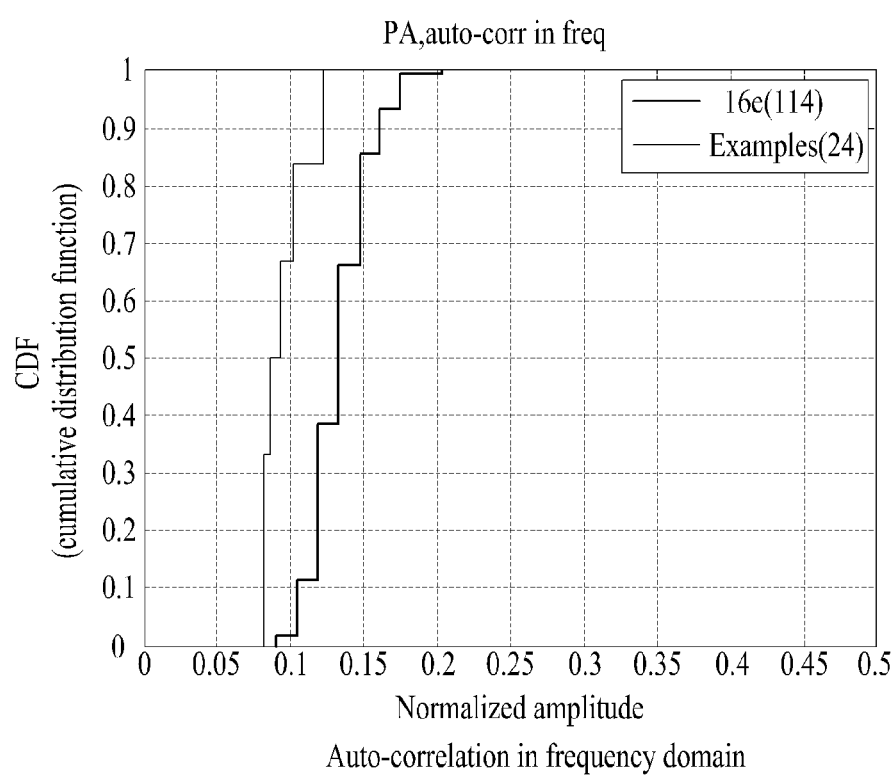
Figure 7D:
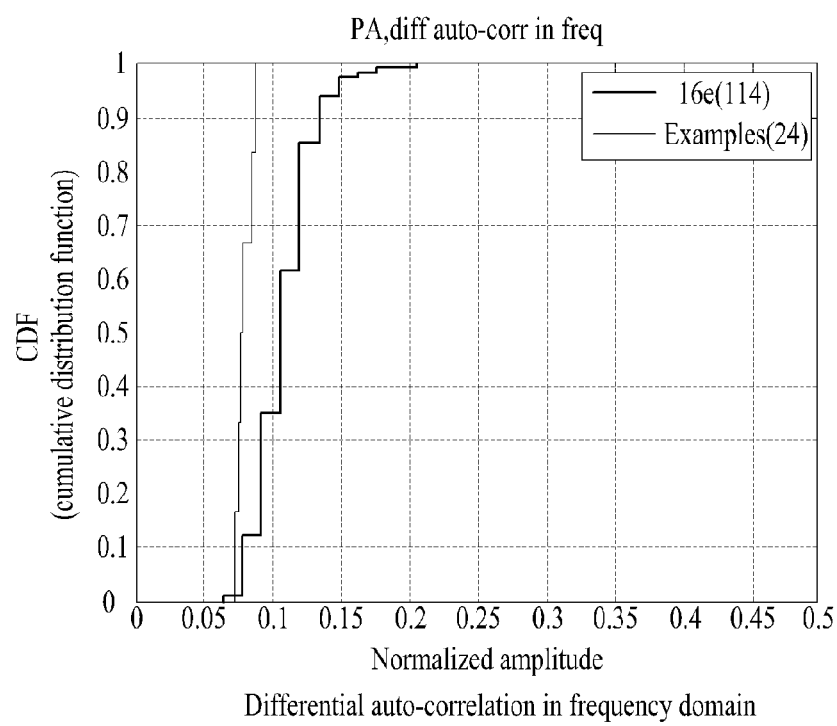
Figure 7E:
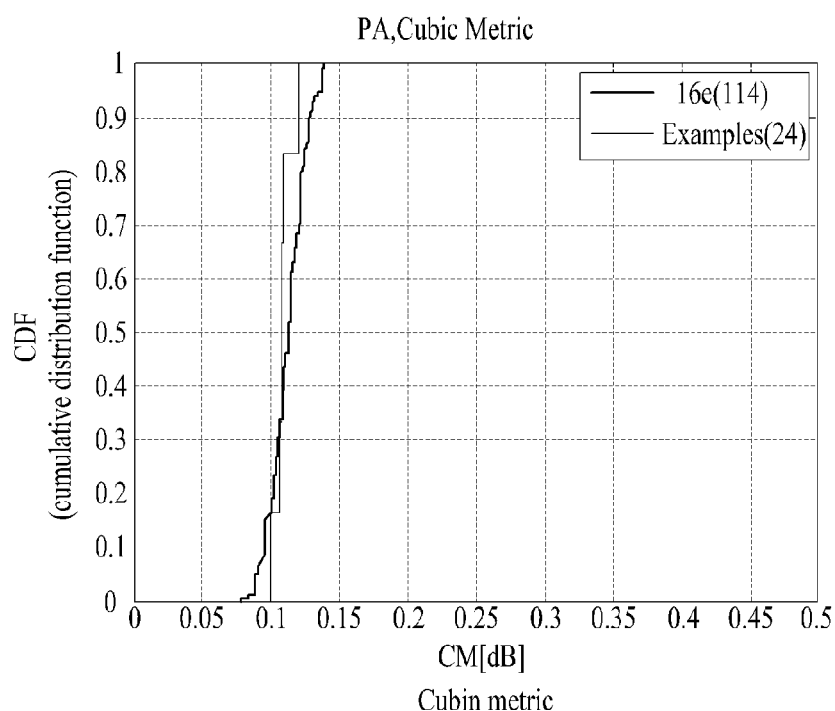

FIG. 6 is a block diagram of a receiver for detecting a sequence according to an embodiment of the present invention. For uplink transmission, a receiver may be part of a BS, whereas for downlink transmission, a receiver may be part of an MS.

Referring to FIG. 6, an index mapper 602 distributes a received signal to first adders 604, 606, 608 and 610. The received signal may be expressed as $$r(n) = r_I(n) + jr_Q(n) \qquad \text{[Equation 9]}$$

where the subscript I represents an in-phase component, and the subscript Q represents a quadrature-phase component. Hereinbelow, the subscripts I and Q are used in the same meanings as above.

The first adders 604, 606, 608 and 610 perform preliminary computations required for calculating the correlation of each base sequence $m_0$ selected from among total base sequences and the correlation of its extended sequence $m_1$. The base sequence $m_0$ and its extended sequence $m_1$ may be expressed as $m_0^{th}$ sequence: $a^{m_0}(n) = a_I^{m_0}(n) + ja_Q^{m_0}(n)$ $m_1^{th}$ sequence: $a^{m_1}(n) = a_I^{m_1}(n) + ja_Q^{m_1}(n)$ $$a^{m_j}(n) = (a^{m_0}(n))^* \qquad \text{[Equation 10]}$$

For example, the first adders 604, 606, 608 and 610 may carry out preliminary computations required for calculating correlations by [Equation 11].

$$R_{II}(d) = \frac{1}{N} \sum_{n=0}^{N-1} (r_I(n+d) a_I^{m_0}(n)) \qquad \text{[Equation 11]}$$

$$R_{QQ}(d) = \frac{1}{N} \sum_{n=0}^{N-1} (r_Q(n+d) a_Q^{m_0}(n))$$

$$I_{QI}(d) = \frac{1}{N} \sum_{n=0}^{N-1} (r_Q(n+d) a_I^{m_0}(n))$$

$$I_{IQ}(d) = \frac{1}{N} \sum_{n=0}^{N-1} (r_I(n+d) a_Q^{m_0}(n))$$

where d represents a delay. Hereinbelow, d denotes the same.

Referring to [Equation 10], the preliminary computations required for calculating the correlations of the base sequence $m_0$ and the extended sequence $m_1$ may be performed using only the base sequence $m_0$.

The first adders 604, 606, 608 and 610 output the preliminary computation values to second adders 612, 614, 616 and 618. The second adders 612, 614, 616 and 618 calculate final correlations by appropriately combining the preliminary computation values. Specifically, the two second adders 612 and 616 calculate the real and imaginary values of the correlation of the base sequence $m_0$ and the other two second adders 614 and 618 calculate the real and imaginary values of the correlation of the extended sequence $m_1$. The relationship between the first adders 604, 606, 608 and 610 and the second adders 612, 164, 616 and 618 may be described with reference to [Equation 12] and [Equation 13].

[Equation 12] describes the cross-correlation between the received signal and the base sequence $m_0$.

$$R^{m_0}(d) = \frac{1}{N} \sum_{n=0}^{N-1} r(n+d) \cdot (a^{m_0}(n))^* \qquad \text{[Equation 12]}$$

$$= \frac{1}{N} \sum_{n=0}^{N-1} [(r_I(n+d) a_I^{m_0}(n) + r_Q(n+d) a_Q^{m_0}(n)) +$$

$$j(r_Q(n+d) a_I^{m_0}(n) - r_I(n+d) a_Q^{m_0}(n))]$$

$$= (R_{II}(d) + R_{QQ}(d)) + j(I_{QI}(d) - I_{IQ}(d))$$

The components of the final expression of [Equation 12] are the outputs of the first adders 604, 606, 608 and 610 and the real and imaginary parts are the outputs of the second adders 612 and 616.

[Equation 13] describes the cross-correlation between the received signal and the extended sequence $m_1$.

$$R^{m_1}(d) = \frac{1}{N} \sum_{n=0}^{N-1} r(n+d) \cdot (a^{m_1}(n))^* \qquad \text{[Equation 13]}$$

$$= \frac{1}{N} \sum_{n=0}^{N-1} r(n+d) \cdot a^{m_0}(n)$$

$$= \frac{1}{N} \sum_{n=0}^{N-1} ((r_I(n+d) a_I^{m_0}(n) - r_Q(n+d) a_Q^{m_0}(n)) +$$

$$j(r_Q(n+d) a_I^{m_0}(n) + r_I(n+d) a_Q^{m_0}(n)))$$

$$= (R_{II}(d) - R_{QQ}(d)) + j(I_{QI}(d) + I_{IQ}(d))$$

The components of the final expression of [Equation 13] are the outputs of the first adders 604, 606, 608 and 610 and the real and imaginary parts are the outputs of the second adders 614 and 618.

The blocks illustrated in FIG. 6 may be used for calculating differential correlations with respect to a received signal. The function of each block has been described above in detail and thus the following description is made of calculation of differential correlations by equations.

A differential received signal may be expressed as $$(r(n))' = (r_I(n))' + j(r_Q(n))'$$

$$(r(n))' = (r(n))^* \cdot r(n+1), n=0,1,\ldots,N-2 \quad \text{[Equation 14]}$$

A differential base sequence $m_0$ and a differential extended sequence $m_1$ are expressed as $m^0$th sequence: $(a^{m_0}(n))' = (a_I^{m_0}(n))' + j(a_Q^{m_0}(n))'$ $(a^{m_0}(n))' = (a^{m_0}(n))^* \cdot a^{m_0}(n+1), n=0,1,\ldots,N-2$ $m^1$th sequence: $(a^{m_1}(n))' = (a_I^{m_0}(n))' + j(a_Q^{m_1}(n))'$ $(a^{m_1}(n))' = (a^{m_1}(n))^* \cdot a^{m_1}(n+1), \text{ i } n=0,1,\ldots,N-2 \quad \text{[Equation 15]}$ The first adders 604, 606, 608 and 610 may perform preliminary computations by [Equation 16], for calculation of correlations.

$$(R_{II}(d))' = \frac{1}{N-1} \sum_{n=0}^{N-2} ((r_I(n+d))'(a_I^{m_0}(n))') \quad \text{[Equation 16]}$$

$$(R_{QQ}(d))' = \frac{1}{N-1} \sum_{n=0}^{N-2} ((r_Q(n+d))'(a_Q^{m_0}(n))')$$

$$(I_{QI}(d))' = \frac{1}{N-1} \sum_{n=0}^{N-2} ((r_Q(n+d))'(a_I^{m_0}(n))')$$

$$(I_{IQ}(d))' = \frac{1}{N-1} \sum_{n=0}^{N-2} ((r_I(n+d))'(a_Q^{m_0}(n))')$$

The first adders 604, 606, 608 and 610 output the preliminary computation values to the second adders 612, 614, 616 and 618. The relationship between the first adders 604, 606, 608 and 610 and the second adders 612, 164, 616 and 618 may be described with reference to [Equation 17] and [Equation 18].

[Equation 17] describes the differential correlation between the received signal and the base sequence $m_0$.

$$(R^{m_0}(d))' = \frac{1}{N-1} \sum_{n=0}^{N-2} (r(n+d))' \cdot ((a^{m_0}(n))')^* \quad \text{[Equation 17]}$$

$$= \frac{1}{N-1} \sum_{n=0}^{N-2} [((r_I(n+d))'(a_I^{m_0}(n))' + (r_Q(n+d))'$$

$$(a_Q^{m_0}(n))') + j((r_Q(n+d))'(a_I^{m_0}(n))' -$$

$$(r_I(n+d))'(a_Q^{m_0}(n))')]$$

$$= ((R_{II}(d))' + (R_{QQ}(d))') + j((I_{QI}(d))' - (I_{IQ}(d))')$$

The components of the final expression of [Equation 17] are the outputs of the first adders 604, 606, 608 and 610 and the real and imaginary parts are the outputs of the second adders 612 and 616.

[Equation 18] describes the differential correlation between the received signal and the extended sequence $m_1$.

$$(R^{m_1}(d))' = \frac{1}{N-1} \sum_{n=0}^{N-2} (r(n+d))' \cdot ((a^{m_1}(n))')^* \quad \text{[Equation 18]}$$

$$\frac{1}{N-1} \sum_{n=0}^{N-2} (r(n+d))' \cdot (a^{m_0}(n))'$$

$$= \frac{1}{N-1} \sum_{n=0}^{N-2} [((r_I(n+d))'(a_I^{m_0}(n))' -$$

$$(r_Q(n+d))'(a_Q^{m_0}(n))') + j((r_Q(n+d))'(a_I^{m_0}(n))' +$$

$$(r_I(n+d))'(a_Q^{m_0}(n))')]$$

$$= ((R_{II}(d))' - (R_{QQ}(d))') + j((I_{QI}(d))' + (I_{IQ}(d))')$$

The components of the final expression of [Equation 18] are the outputs of the first adders 604, 606, 608 and 610 and the real and imaginary parts are the outputs of the second adders 614 and 618.

In accordance with the sequence detection method illustrated in FIG. 6, the correlations (or differential correlations) of the base sequence $m_0$ and its extended sequence $m_1$ can be calculated by one computation. While FIG. 6 has been described in the context of a sequence extended by complex conjugation, it is a mere exemplary application and the sequence detection method illustrated in FIG. 6 is readily applied to calculation of the correlation of an extended sequence created by a reverse operation. For example, the index mapper 602 may distribute a received signal on which the reverse operation has been performed to the first adders 604, 606, 608 and 610. In another example, the first adders 604, 606, 608 and 610 may perform preliminary computations using a base sequence on which the reverse operation has been performed.

Simulation: Analysis of Properties of Base Sequences and their Extended Sequences Table 3 below lists six base sequences generated according to an embodiment of the present invention. The base sequences have indexed with 0 to 5 (p denotes an index) and are expressed in a hexadecimal format.

A modulated sequence mapped to subcarriers are obtained by converting a hexadecimal sequence $W_i^{(p)}$ to two QPSK symbols $w_{2i}^{(p)}$ and $w_{2i+1}^{(p)}$. Here, i is an integer ranging from 0 to 107. [Equation 19] describes an example of modulating the base sequence $W_i^{(p)}$ to two QPSK symbols.

$$w_{2i}^{(p)} = \exp\left(j\frac{\pi}{2}(2 \cdot a_{i,0}^{(p)} + a_{i,1}^{(p)})\right) \quad \text{[Equation 19]}$$

$$w_{2i+1}^{(p)} = \exp\left(j\frac{\pi}{2}(2 \cdot a_{i,2}^{(p)} + a_{i,3}^{(p)})\right)$$

where $W_i^{(p)} = 2^3 \cdot a_{i,0}^{(p)} + 2^2 \cdot a_{i,1}^{(p)} + 2^1 \cdot a_{i,2}^{(p)} + 2^0 \cdot a_{i,3}^{(p)}$. According to the above equation, binary values 00, 01, 10 and 11 are converted respectively to 1, j, −1 and −j. However, this is a mere exemplary application and thus the base sequence $W_i^{(p)}$ may be converted to QPSK symbols by any other similar equation.

TABLE 3

| p | Sequence to modulate, $W_i^{(p)}$ (in hexadecimal format) |
|---|---|
| 0 | 0CCF02E8216E980A50A62D0FCDC9A88BCF078AC6EAF8DD70A8D5E0EEE33E3 60458EAF42EA89C35271F8413615F74E50FFC6DB1084EF8 |
| 1 | 21C3C0B6A4A1653023111E274F8AFD4D88481B116B8D0B54673CE50D4E9AA 67BAC6DB6EA8E72180A204F5A7D6104A37E94CC35AD7007 |
| 2 | 0D684E2D0E360F81AEECE43EA204DA893D8B550C64667B58B7065F56C5BB8 D369211F38A992707E298C375451437FF32ABC9DB1C4878 |
| 3 | 3F89C5F1E37F6D634DCEB42D0374CE82D0C81C41382FE890B468B4EA816FC 63F322EAA367EB9063D478724756641EBF8114AFB4C1AA7 |
| 4 | 056320CC0B9AE2C5A4190BB1622B3A0F4FA23F41A2F2F79BC854CFCCC6534 3FE9739F7EB5E308A179349162E2502114259BE77CC312C |
| 5 | 14422F9715FF0AD00C1F2FE0197BCA5E8B0944422D7382B5ABA3BF00DDCDF 6572C77E13F93462E31F4901374093A677561F4AFE4B9E4 |

The six base sequences listed in Table 3 may be extended to 24 sequences by complex conjugation and the reverse operation. 18 extended sequences except the base sequences are indicated by indexes (p) 6 to 23, expressed as $$w_k^{(p)} = \begin{cases} (w_k^{(p-6)})^* & \text{for } 6 \le p < 12, \\ w_{215-k}^{(p-12)} & \text{for } 12 \le p < 18, \\ (w_{215-k}^{(p-18)})^* & \text{for } 18 \le p < 24, \end{cases}$$ [Equation 20]

where k is an integer ranging from 0 to 215.

The properties of the 24 sequences generated by use of Table 3 and [Equation 20] were measured in 512-FFT mode, and conventional 114 preamble sequences used in the IEEE 802.16e system were used as a comparison group (refer to IEEEStd 802.16E-2005, Table 309b).

To investigate the sequence properties, cross-correlations, differential cross-correlations, auto-correlations, differential auto-correlations, and CM values were measured (refer to [Equation 9] to [Equation 18]). The measurements are illustrated in FIGS. 7A to 7E, and Table 4, Table 5, and Table 6.

TABLE 4

| | Cross-correlation | | Differential cross-correlation | |
|---|---|---|---|---|
| | 802.16e (114) | Examples (24) | 802.16e (114) | Examples (24) |
| Min | 0.000 | 0.000 | 0.000 | 0.005 |
| Max | 0.303 | 0.250 | 0.239 | 0.105 |
| Mean | 0.074 | 0.060 | 0.065 | 0.048 |
| Median | 0.070 | 0.056 | 0.056 | 0.043 |
| std. dev. | 0.039 | 0.032 | 0.049 | 0.023 |

TABLE 5

| | Auto-correlation | | Differential auto-correlation | |
|---|---|---|---|---|
| | 802.16e (114) | Examples (24) | 802.16e (114) | Examples (24) |
| Min | 0.091 | 0.083 | 0.127 | 0.144 |
| Max | 0.203 | 0.124 | 0.408 | 0.173 |
| Mean | 0.134 | 0.096 | 0.216 | 0.157 |
| Median | 0.133 | 0.091 | 0.211 | 0.153 |
| std. dev. | 0.020 | 0.015 | 0.044 | 0.011 |

TABLE 6

| | Cubic Metric | |
|---|---|---|
| | 802.16e (114) | Examples (24) |
| Min | 0.790 | 0.994 |
| Max | 1.389 | 1.205 |

TABLE 6-continued

| | Cubic Metric | |
|---|---|---|
| | 802.16e (114) | Examples (24) |
| Mean | 1.128 | 1.085 |
| Median | 1.139 | 1.077 |
| std. dev. | 0.131 | 0.063 |

Referring to FIGS. 7A to 7E, Table 4, Table 5 and Table 6, it is noted that both the base sequences and the extended sequences that are obtained by performing complex conjugation and the reverse operation on the base sequences have excellent properties, when they are evaluated according to the criteria described in Embodiment 1.

Application Example

Signal Transmission Using Base Sequence and its Extended Sequence

A description will be made of an example of applying sequences generated according to an embodiment of the present invention to a DL sync channel and a ranging channel, with the appreciation that the sequences are also applicable to transmission of many other channels and signals. For example, the sequences according to the embodiment of the present invention may be used for time/frequency synchronization, channel estimation (RS or pilot), control channels (e.g. CQI, ACK/NACK, etc.), scrambling, CDM, midamble, received signal measurement (e.g. Received Signal Strength Indication (RSSI), Signal to Noise ratio (SNR), Signal to Interference and Noise Ratio (SINR), etc.). While the application example is described in the context of IEEE 802.16m, it may be used for any other communication system using sequences (e.g. the 3GPP system).

FIG. 8 illustrates a radio frame structure in the IEEE 802.16m system. The radio frame structure is applicable to Frequency Division Duplex (FDD), Half-Frequency Division Duplex (H-FDD), Time Division Duplex (TDD), etc.

Referring to FIG. 8, the radio frame structure includes 20-ms superframes SU0 to SU3 supporting a 5-MHz, 8.75-MHz, 10-MHz or 20-MHz bandwidth. Each superframe is divided into four equally sized 5-ms frames F0 to F3, starting with a SuperFrame Header (SFH). Each frame includes eight subframes SF0 to SF7, each carrying a DL sync channel. Each subframe is allocated for downlink or uplink transmission. There are three types of subframes according to CPs. Specifically, a subframe may include 5, 6 or 7 OFDMA symbols. Each OFDMA symbol is divided into a CP and a useful symbol. The CP is generally a copy of the last part of the useful symbol, attached before the useful symbol. Therefore, the phase is continuous between the CP and the useful symbol. The length of the CP may be set but not limited to ⅛ or ⅙ of the length of the useful symbol. Table 7 illustrates some OFDMA parameters defined for the IEEE 802.16m system.

TABLE 7

| Nomial Channel Bandwidth (MHz) | 5 | 7 | 8.75 | 10 | 20 |
|---|---|---|---|---|---|
| Over-sampling Factor | 28/25 | 8/7 | 8/7 | 28/25 | 28/25 |
| Sampling Frequency, $F_s$ (MHz) | 5.6 | 8 | 10 | 11.2 | 22.4 |
| FFT Size, $N_{FFT}$ | 512 | 1024 | 1024 | 1024 | 2048 |
| Sub-Carrier Spacing, $\Delta f$ (kHz) | 10.937500 | 7.812500 | 9.765625 | 10.937500 | 10.937500 |
| Useful Symbol Time, $T_b$ (us) | 91.429 | 128 | 102.4 | 91.429 | 91.429 |

Figure 9:
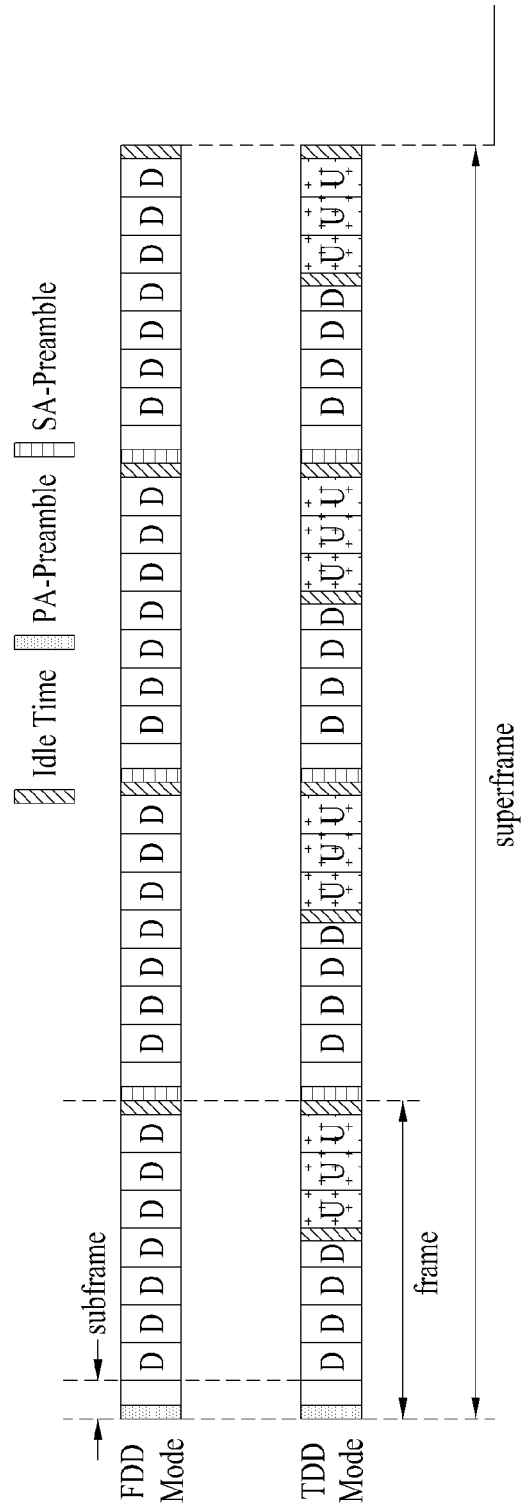
FIG. 9 illustrates an exemplary transmission of synchronization channels in the IEEE 802.16m system.

FIG. 9 illustrates an exemplary transmission of a synchronization channel in the IEEE 802.16m system. This embodiment is based on the assumption of IEEE 802.16m only mode.

Referring to FIG. 9, one superframe SU1, SU2, SU3 or SU4 carries four Synchronization Channels (SCHs) in the IEEE 802.16m system. There are two types of DL SCHs, Primary SCH (P-SCH) and Secondary SCH (S-SCH) in the IEEE 802.16m system. The P-SCH and the S-SCH carry a Primary Advanced Preamble (PA-Preamble) and a Secondary Advanced Preamble (SA-Preamble), respectively. In both FDD mode and TDD mode, each DL SCH may be transmitted in the first OFDMA symbol of a frame. The PA-Preamble is usually used for acquisition of time/frequency synchronization, a partial cell ID, and some information such as system information, whereas the SA-Preamble is generally used for acquiring a final physical cell ID. The SA-Preamble may also be used for measuring an RSSI. The PA-Preamble is delivered in the first frame F0 and the SA-Preamble is delivered in the second, third and fourth frames F1, F2 and F03.

Figure 10:
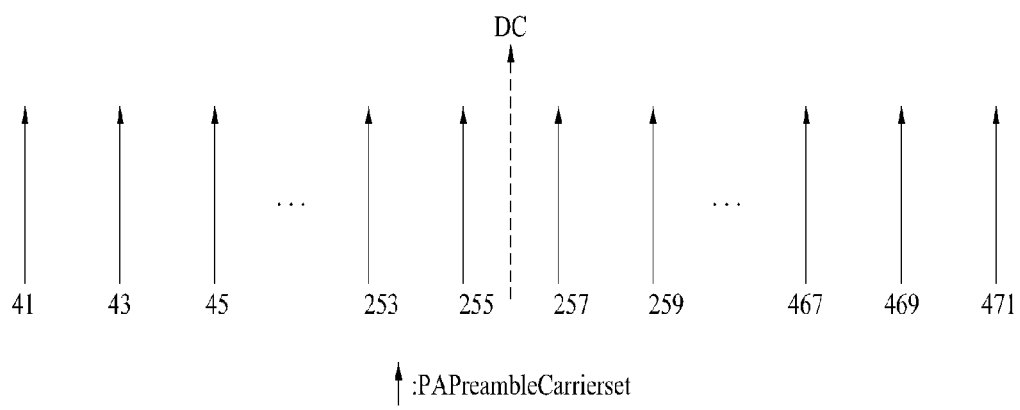
FIG. 10 illustrates subcarriers to which a Primary Advanced Preamble (PA-Preamble) is mapped.

FIG. 10 illustrates subcarriers to which a PA-preamble is mapped.

Referring to FIG. 10, the PA-Preamble is of length 216 regardless of an FFT size. The PA-Preamble is inserted at an interval of two subcarriers, with 0s filled at the other subcarriers. For example, the PA-Preamble may be inserted at subcarriers 41, 43, . . . , 469 and 471. The PA-Preamble may carry information about a BS type, a system bandwidth, etc. If subcarrier 256 is reserved for Direct Current (DC), the allocation of subcarriers for the sequence may be determined by PAPreambleCarrierSet=2×k+41         [Equation 21]

where k is an integer ranging from 0 to 215.

For example, a QPSK-type sequence of length 216 illustrated in Table 3 may be used for a PA-Preamble. For the convenience's sake, Table 8 lists the six base sequences again.

Figure 11:
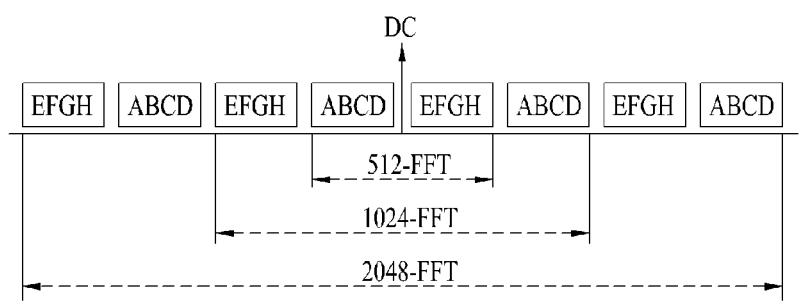
FIG. 11 illustrates an exemplary mapping of Secondary Advanced Preambles (SA-Preambles) to frequency areas.

Referring to FIG. 11, the length of the SA-Preamble may vary with an FFT size. For example, the lengths of the SA-Preamble may be 144, 288, and 576 for 512-FFT, 1024-FFT and 2048-FFT, respectively. If subcarrier 256, subcarrier 512 and subcarrier 1024 are reserved as DC components for the 512-FFT, 1024-FFT and 2048-FFT, respectively, allocation of subcarriers for an SA-Preamble may be determined by $$SAPreambleCarrierSet_n = n + 3 \cdot k + 40 \cdot \frac{N_{SAP}}{144} + \left\lfloor \frac{2 \cdot k}{N_{SAP}} \right\rfloor \quad \text{[Equation 22]}$$

where n represents the index of an SA-Preamble carrier set, ranging from 0 to 2, indicating a segment ID, $N_{SAP}$ represents the length of the SA-Preamble, and k is an integer ranging from 0 to $N_{SAP-1}$.

Each cell has a cell ID (IDcell) ranging from 0 to 767. The cell ID is defined by a segment index and an index per segment. The cell ID may be determined by IDcell=256×n+Idx         [Equation 23]

where n represents the index of the SA-Preamble carrier set, ranging form 0 to 2, indicating a segment ID, and Idx is an integer from 0 to 255.

For the 512-FFT, an SA-Preamble of length 144 is divided into eight subblocks, namely A, B, C, D, E, F, G and H. The length of each subblock is 18. For each segment ID, different sequence subblocks are defined. In the IEEE 802.16m system, known SA-Preambles are hexadecimal numbers of the BPSK type. 18 LSBs of a hexadecimal sequence for each subblock are used to represent binary sequences. A binary sequence {0, 1} is mapped to real values {+1, −1}, respectively. SA-Preambles defined for the IEEE 802.16m system will be described later in detail. In the 512-FFT, the subblocks A, B, C, D, E, F, G and H are sequentially modulated and mapped to an SA-Preamble subcarrier set corresponding to a

TABLE 8

| p | Sequence to modulate, $W_i^{(p)}$ (in hexadecimal format) |
|---|---|
| 0 | 0CCF02E8216E980A50A62D0FCDC9A88BCF078AC6EAF8DD70A8D5E0EEE33E360458E AF42EA89C35271F8413615F74E50FFC6DB1084EF8 |
| 1 | 21C3C0B6A4A1653023111E274F8AFD4D88481B116B8D0B54673CE50D4E9AA67BAC6 DB6EA8E72180A204F5A7D6104A37E94CC35AD7007 |
| 2 | 0D684E2D0E360F81AEECE43EA204DA893D8B550C64667B58B7065F56C5BB8D36921 1F38A992707E298C375451437FF32ABC9DB1C4878 |
| 3 | 3F89C5F1E37F6D634DCEB42D0374CE82D0C81C41382FE890B468B4EA816FC63F322 EAA367EB9063D478724756641EBF8114AFB4C1AA7 |
| 4 | 056320CC0B9AE2C5A4190BB1622B3A0F4FA23F41A2F2F79BC854CFCCC65343FE973 9F7EB5E308A179349162E2502114259BE77CC312C |
| 5 | 14422F9715FF0AD00C1F2FE0197BCA5E8B0944422D7382B5ABA3BF00DDCDF6572C7 7E13F93462E31F4901374093A677561F4AFE4B9E4 |

Figure 3:
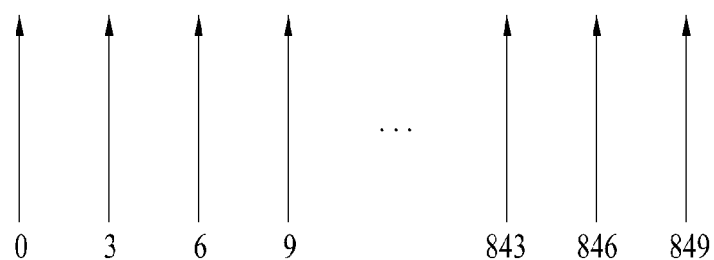
FIG. 3 illustrates subcarriers to which a preamble is mapped in 1024-Fast Fourier Transform (FFT) mode (a 10 MHz-bandwidth) in the IEEE 802.16e system.

The description made with reference to FIG. 3 may be referred to for details of sequence conversion and extension of sequences by complex conjugation and/or a reverse operation. It can be concluded that a BS may transmit a total of 24 PA-Preambles based on the six base sequences listed in Table 8.

FIG. 11 illustrates an exemplary mapping of SA-Preambles to frequency areas.

segment ID. For a higher FFT size, the basic subblocks A, B, C, D, E, F, G and H are repeated in the same order. For example, for 1024-FFT, subblocks E, F, G, H, A, B, C, D, E, F, G, H, A, B, C and D are sequentially modulated and then mapped to an SA-Preamble subcarrier set corresponding to a segment ID.

A circular shift may be applied to three consecutive subcarriers after subcarrier mapping according to [Equation 22].

Figure 12:
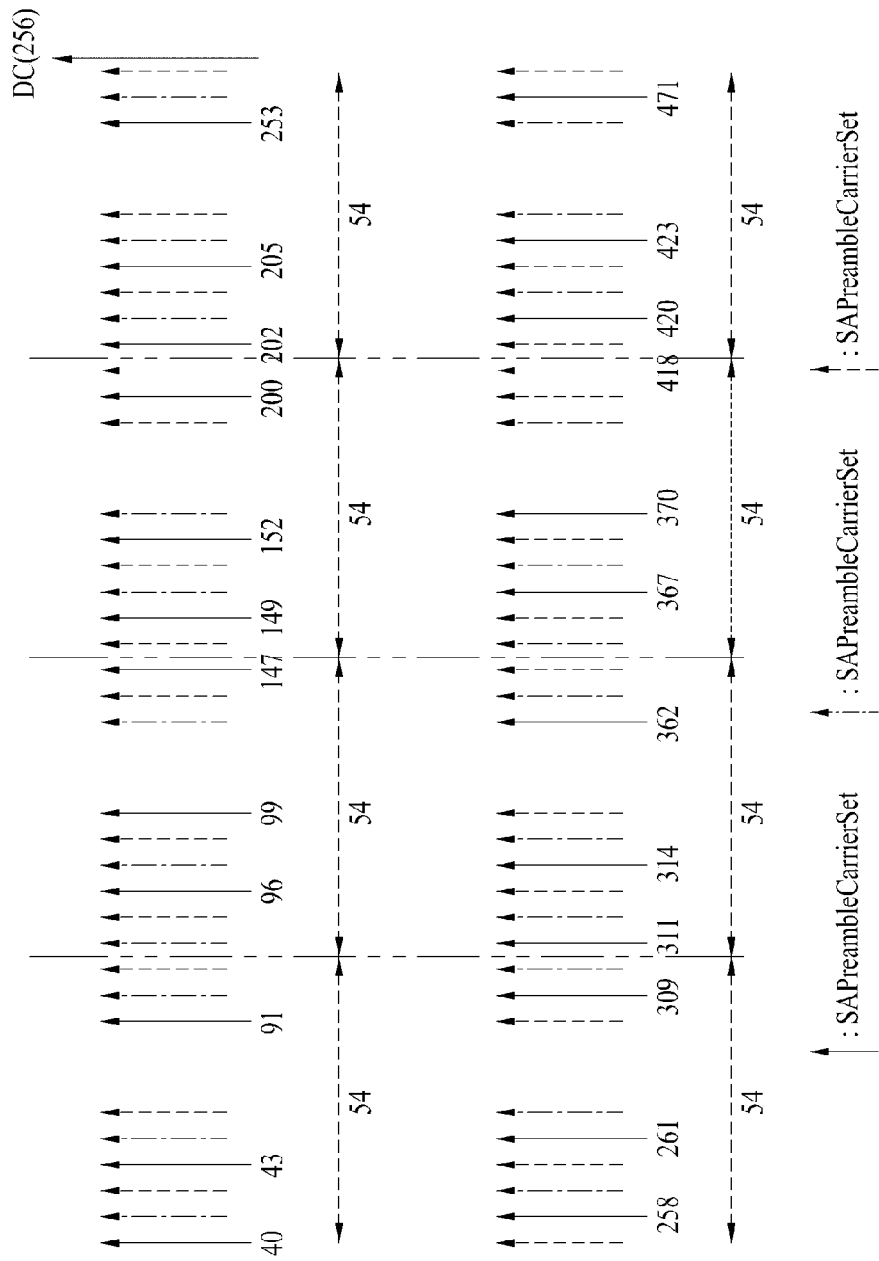
FIG. 12 illustrates an exemplary SA-Preamble structure for 512-FFT.

Each subblock has the same offset and the circular shift pattern [2, 1, 0, ..., 2, 1, 0, ..., 2, 1, 0, 2, 1, 0, DC, 1, 0, 2, 1, 0, 2, ..., 1, 0, 2, ..., 1, 0, 2] is used for each subblock. Herein, the circular shift includes a right circular shift. For a 512-FFT size, each of the subblocks A, B, C, D, E, F, G and H may experience the right circular shift (0, 2, 1, 0, 1, 0, 2, 1). FIG. 12 illustrates an exemplary SA-Preamble structure for 512-FFT.

Figure 13:
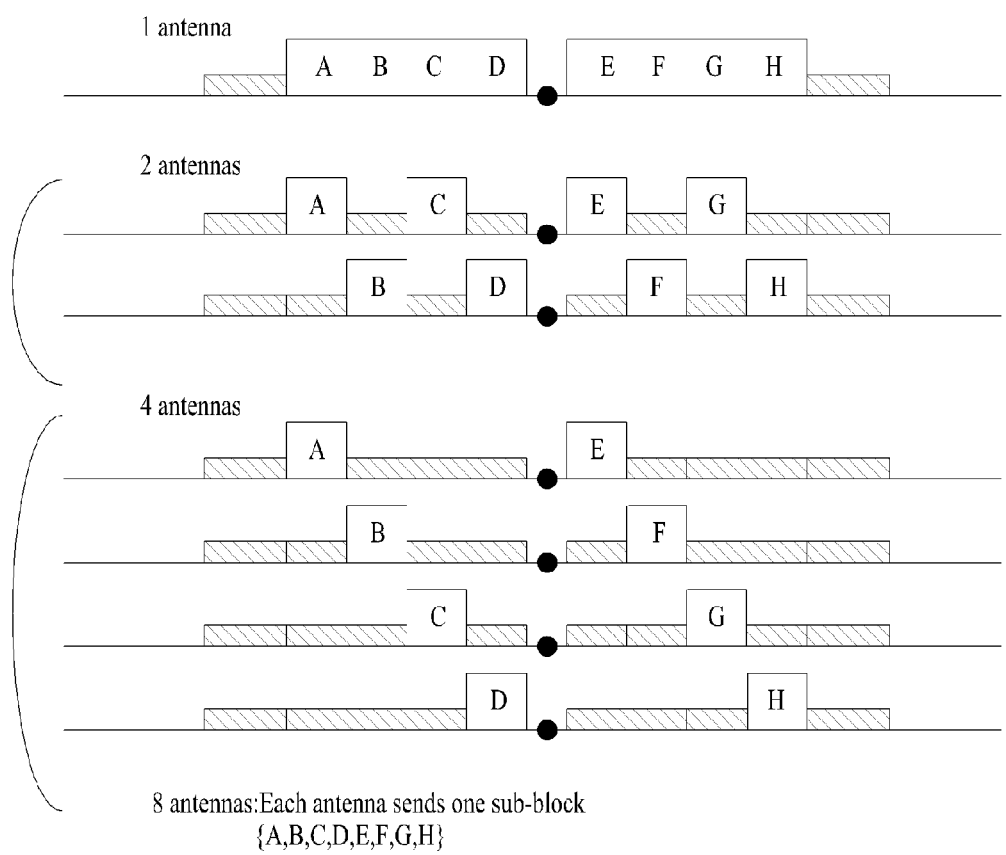
FIGS. 13, 14 and 15 illustrate exemplary SA-preamble structures in multi-antenna systems.
Figure 14:
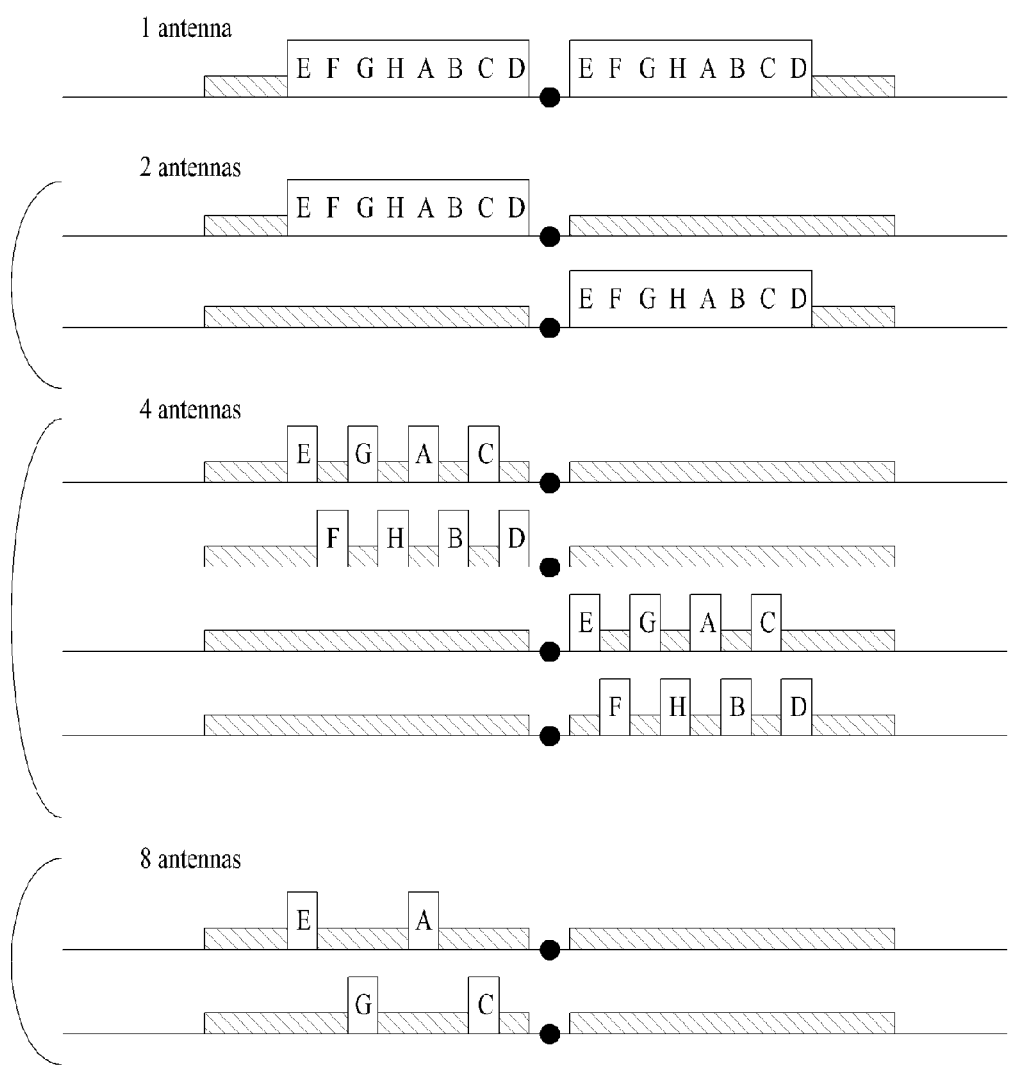
Figure 15:
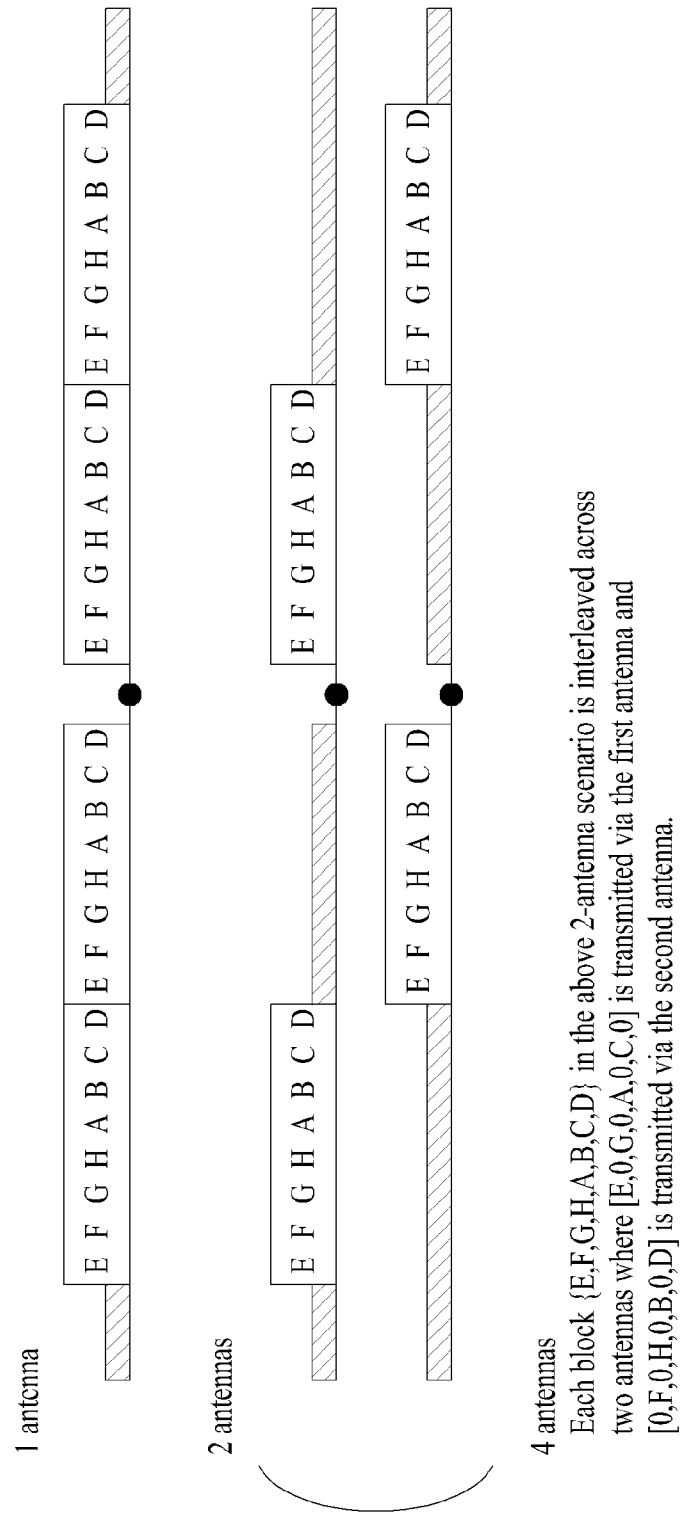

FIGS. 13, 14 and 15 illustrate exemplary SA-Preamble structures in multi-antenna systems. The SA-Preamble structures are designed for 512-FFT, 1024-FFT and 2048-FFT, respectively.

Referring to FIGS. 13, 14 and 15, an SA-Preamble may be interleaved on a plurality of antennas. The SA-Preamble interleaving is not limited to any specific method. For example, when a multi-antenna system has $2^n$ transmission antennas, the SA-Preamble may be interleaved as described in Table 9. For the convenience' sake, eight consecutive subblocks {E, F, G, H, A, B, C, D} are collectively referred to as a block and reference characters are defined as follows.

$N_t$: the number of transmission antennas
$N_b$: the total number of blocks
$N_s$: the total number of subblocks ($8 \times N_b$)
$N_{bt}$: the number of blocks per antenna ($N_b/N_t$)
$N_{st}$: the number of subblocks per antenna ($N_s/N_t$)

TABLE 9

If ($N_{bt} >= 1$)
Distribute consecutive blocks across the $N_t$ antennas
For a given antenna, a block is repeated with period $N_t$
Block position for antenna (t + 1) is t + p×$N_t$, where t = 0, 1, 2, ..., $N_t$ − 1, p = 0, 1, 2, ..., $N_{bt}$ − 1
Else If ($N_{st}$ = 4)
Interleave the 8 subblocks {E, F, G, H, A, B, C, D} across two consecutive antennas
Block [E, 0, G, 0, A, 0, C, 0] is allocated to antenna i at block position, floor (i/2)
Block [0, F, 0, H, 0, B, 0, D] is allocated to antenna i + 1 at block position, floor (i + 1/2), where i = 0, 2, 4, ..., $N_t$.
Else If ($N_{st}$ = 2)
Interleave the 8 subblocks {E, F, G, H, A, B, C, D} across four consecutive antennas TABLE 9-continued Block [E, 0, 0, 0, A, 0, 0, 0] is allocated to antenna i at block position, floor (i/4)
Block [0, 0, G, 0, 0, 0, C, 0] is allocated to antenna i + 1 at block position, floor ((i + 1)/4)
Block [0, F, 0, 0, 0, B, 0, 0] is allocated to antenna i + 2 at block position, floor ((i + 2)/4)
Block [0, 0, 0, H, 0, 0, 0, D] is allocated to antenna i + 3 at block position, floor ((i + 3)/4), where i = 0, 4, 8, ..., $N_t$.
Else
Interleave the 8 subblocks {E, F, G, H, A, B, C, D} across four consecutive antennas
Block [E, 0, 0, 0, 0, 0, 0, 0] is allocated to antenna i at block position, floor (i/8)
Block [0, F, 0, 0, 0, 0, 0, 0] is allocated to antenna i + 1 at block position, floor ((i + 1)/8)
Block [0, 0, G, 0, 0, 0, 0, 0] is allocated to antenna i + 2 at block position, floor ((i + 2)/8)
Block [0, 0, 0, H, 0, 0, 0, 0] is allocated to antenna i + 3 at block position, floor ((i + 3)/8),
Block [0, 0, 0, 0, A, 0, 0] is allocated to antenna i + 4 at block position, floor ((i + 4)/8)
Block [0, 0, 0, 0, 0, B, 0, 0] is allocated to antenna i + 5 at block position, floor ((i + 5)/8)
Block [0, 0, 0, 0, 0, 0, C, 0] is allocated to antenna i + 6 at block position, floor ((i + 6)/8)
Block [0, 0, 0, 0, 0, 0, 0, D] is allocated to antenna i + 7 at block position, floor ((i + 7)/8), where i = 0, 8, ..., $N_t$.

In each frame containing an SA-Preamble, the transmission structures may be rotated across the transmission antennas. For example, in a 512-FFT system with four transmission antennas, subblocks [A, 0, 0, 0, E, 0, 0, 0] are transmitted through a first antenna and subblocks [0, 0, 0, D, 0, 0, 0, H] are transmitted through a fourth antenna, in an $f^{th}$ frame containing an SA-Preamble. Then in an $(f+1)^{th}$ frame containing an SA-Preamble, subblocks [0, 0, 0, D, 0, 0, 0, H] may be transmitted through the first antenna and subblocks [A, 0, 0, 0, E, 0, 0, 0] may be transmitted through the fourth antenna.

Known BPSK-Type SA-Preambles

Table 10 tabulates known SA-Preambles for the IEEE 802.16m system. In Table 10, 256 BPSK-type sequences defined for segment 0 are illustrated. For sequences for segment 1 and segment 2, refer to Table 658 and Table 659 in IEEE 802.16m-09/0010r2. The 18 LSBs of each subblock are used to represent binary sequences. Binary values {0, 1} are mapped to real values {+1, −1}, respectively.

TABLE 10

Table 657 - SA Preamble for n = 0 (Segment 0)

| | blk | | | | | | | |
|---|---|---|---|---|---|---|---|---|
| Idx | A | B | C | D | E | F | G | H |
| 0 | 2A1FA | 3DE76 | 2CCA0 | 15722 | 2A509 | 0E904 | 0C5D5 | 10774 |
| 1 | 23836 | 378C2 | 3BFDA | 1A401 | 27FBD | 1FA0E | 02DA2 | 03949 |
| 2 | 211B7 | 2855B | 25BCD | 17F09 | 32910 | 090FB | 07C8C | 0CC20 |
| 3 | 3836C | 22AD2 | 349DB | 183CA | 3B2CA | 09CE3 | 12C6C | 12282 |
| 4 | 26F2D | 3DFF6 | 315B1 | 1234E | 2A0AF | 1BEAD | 0CE1A | 03B36 |
| 5 | 3D1C3 | 23AFF | 22B8B | 1A9DE | 3E5A3 | 08235 | 1B7AF | 136AD |
| 6 | 30709 | 2FA42 | 31CBD | 0F424 | 3E570 | 1D9A8 | 008AA | 0F9D3 |
| 7 | 38E39 | 33279 | 2FF20 | 08825 | 3EBCB | 1DCCD | 15D61 | 0DECF |
| 8 | 21779 | 264CB | 3230D | 0AE06 | 35140 | 1CA03 | 0E570 | 059BE |
| 9 | 270A8 | 2ADE1 | 3B6B7 | 1A629 | 29B35 | 0C99D | 0AC04 | 03C08 |
| 10 | 30F40 | 3363F | 361F3 | 00A13 | 36A99 | 1CC91 | 0F8CB | 1EDD2 |
| 11 | 28A18 | 2F6B4 | 20AE4 | 0BA1C | 25EA6 | 063B1 | 1C5F4 | 1B85B |
| 12 | 26821 | 3A5B3 | 3EE12 | 08B45 | 3C594 | 016FD | 02A94 | 054F7 |
| 13 | 3AC52 | 33B19 | 3H9C6 | 1609E | 2EB43 | 065DC | 08E91 | 0B952 |
| 14 | 32B67 | 298C0 | 20ED5 | 1A699 | 343F1 | 1D965 | 17927 | 07EF0 |
| 15 | 3AC4D | 35BBC | 29713 | 06420 | 28132 | 0B1D1 | 16A5B | 176B1 |
| 16 | 28B79 | 22EA0 | 341E6 | 088EF | 23052 | 1944A | 1452F | 0176D |
| 17 | 3F8D6 | 2E09 | 3791E | 1762C | 3E8DA | 13B94 | 0D4DB | 15807 |
| 18 | 2080F | 2E4D0 | 291F6 | 153B4 | 368A2 | 1AD5C | 161AD | 06C1E |
| 19 | 27DC1 | 21FEA | 2B540 | 1F1BF | 3C773 | 05585 | 11644 | 1A59A |
| 20 | 34CAB | 2FE84 | 3E702 | 02C06 | 3AEEC | 0F583 | 0CD57 | 04AD1 |
| 21 | 24991 | 3CF91 | 2AEE1 | 0D6EB | 32F0D | 07E07 | 1BB88 | 0D321 |

TABLE 10-continued

Table 657 - SA Preamble for n = 0 (Segment 0)

| Idx | A | B | C | D | E | F | G | H |
|---|---|---|---|---|---|---|---|---|
| 22 | 30822 | 398DC | 2F478 | 04B4D | 3361B | 156BE | 0D5AC | 11E4F |
| 23 | 3C355 | 36EEE | 35068 | 085B0 | 2FCBB | 0855E | 1466C | 050CB |
| 24 | 3ECC3 | 2A52B | 3DFCC | 03ADF | 2DF1D | 05C43 | 05A8A | 19D9F |
| 25 | 2FF61 | 2B725 | 37F3E | 14092 | 3E129 | 16F47 | 0E8CC | 1E8B8 |
| 26 | 235C9 | 275AC | 22420 | 175DB | 2118A | 06177 | 0FB7A | 00DF4 |
| 27 | 299F2 | 3D5DF | 34668 | 12631 | 20E22 | 1BC59 | 049E8 | 1209C |
| 28 | 2F3F4 | 34251 | 36429 | 0B0CF | 2CCE6 | 109F4 | 0BA71 | 1D846 |
| 29 | 32816 | 25786 | 259F6 | 0CD01 | 3BA6A | 1FC99 | 1DB12 | 1FED3 |
| 30 | 3DF50 | 3EE78 | 2B708 | 19594 | 371DB | 03C88 | 0794A | 07B3C |
| 31 | 3D053 | 3DF2C | 273CC | 165F6 | 2C436 | 09ED4 | 0C879 | 13571 |
| 32 | 3960E | 26F45 | 33FBE | 068B6 | 3C521 | 106C6 | 09C50 | 11A56 |
| 33 | 2B95B | 385EE | 3B804 | 03545 | 29D2E | 01B2E | 02F70 | 1C65A |
| 34 | 3CC0F | 201B2 | 28467 | 1D38A | 258A4 | 0C37A | 0F145 | 04C70 |
| 35 | 383EC | 3A316 | 24A63 | 190FA | 3AE63 | 0918B | 1FE42 | 1DDD7 |
| 36 | 2C261 | 228F1 | 28B79 | 0D393 | 2DB97 | 1B131 | 105E9 | 1438A |
| 37 | 2497F | 292F3 | 2C371 | 12C8E | 20A1D | 14110 | 1A04F | 0B028 |
| 38 | 372E6 | 304B6 | 2F16A | 188E6 | 3688E | 1D23F | 0490A | 1041F |
| 39 | 34FFB | 38DCD | 25577 | 19DEF | 251E4 | 00C71 | 01E27 | 15622 |
| 40 | 3D6FA | 305DF | 2AC73 | 1C8D6 | 3E5CA | 00717 | 0851C | 109B2 |
| 41 | 362C1 | 2723E | 27046 | 134A2 | 3FCC3 | 0D635 | 0394C | 02EE9 |
| 42 | 348E8 | 3972D | 3D001 | 1315A | 35EAE | 1702C | 11E63 | 0F600 |
| 43 | 2C7BB | 2F28F | 2015D | 09325 | 24EE9 | 1F67B | 1F377 | 1611E |
| 44 | 2B3BE | 27DA5 | 36FDF | 0DD50 | 39C46 | 00D4E | 1E49C | 067C4 |
| 45 | 2614D | 340BC | 2B4F8 | 16369 | 31213 | 13F3F | 0A130 | 1ECA1 |
| 46 | 26417 | 21306 | 33D64 | 130EF | 39BC4 | 1751D | 08580 | 13160 |
| 47 | 3F902 | 2A37D | 361C8 | 19A54 | 3DB69 | 0C335 | 1171F | 0F022 |
| 48 | 3AB24 | 3D551 | 3C977 | 1360A | 3F0BC | 021CF | 14382 | 02E59 |
| 49 | 35E1E | 26090 | 35738 | 158AF | 3D8C2 | 1FAD3 | 01313 | 0868B |
| 50 | 3AC9F | 315BF | 263B8 | 1C684 | 385D9 | 17DB0 | 0FDDD | 1D8FF |
| 51 | 2F482 | 3AC19 | 34498 | 0E65B | 3D719 | 14DE7 | 17762 | 14F4D |
| 52 | 2E248 | 348C5 | 35A9A | 0D76F | 3708E | 1346E | 1F653 | 1F281 |
| 53 | 2CFA2 | 28F3F | 3A58F | 15E30 | 3B0E7 | 1F67E | 0187C | 112E8 |
| 54 | 3DB3B | 3D41B | 3AC0A | 0C7C3 | 2E71F | 1946D | 1C64B | 06E3C |
| 55 | 2C726 | 36DE4 | 252BF | 1061D | 25194 | 0FB2B | 09B51 | 16744 |
| 56 | 229F2 | 32990 | 358C3 | 1BB30 | 2F008 | 0D0A2 | 051D3 | 17530 |
| 57 | 235C2 | 2EC63 | 2C3F8 | 16217 | 2183A | 14406 | 0B8C8 | 10E19 |
| 58 | 25552 | 341AF | 20810 | 073A1 | 2E1FB | 1D58C | 0F35C | 0320E |
| 59 | 39B09 | 209E8 | 35261 | 1D675 | 3A0DE | 0A8A1 | 1EFF9 | 01F98 |
| 60 | 20A28 | 3792C | 3F334 | 045D2 | 3D786 | 1A95C | 08CB0 | 18DA1 |
| 61 | 29FE5 | 3E383 | 22DDB | 14256 | 37B29 | 00FB1 | 10420 | 018A1 |
| 62 | 3F05B | 30317 | 24779 | 1BB7B | 269BC | 0C785 | 04A86 | 118AA |
| 63 | 3739A | 373CC | 2C605 | 138A5 | 22112 | 00ABC | 134D5 | 0FABE |
| 64 | 339EC | 3DA7E | 2256C | 10CFF | 2593D | 0DE36 | 032EC | 1E199 |
| 65 | 3B3AD | 264C2 | 3BDE5 | 11FDE | 38AA1 | 1D1EF | 1821E | 0EE3E |
| 66 | 3D528 | 38958 | 23331 | 0E8B9 | 26FCE | 127B8 | 0DA80 | 1DCF8 |
| 67 | 3DA17 | 2AB6D | 26ECE | 0401A | 3FBD8 | 17692 | 1E7F2 | 05FF2 |
| 68 | 21ED1 | 2F966 | 316F9 | 071F2 | 3ACF4 | 025A9 | 047E4 | 01DDC |
| 69 | 2904C | 3C712 | 2C41E | 06801 | 2F9F2 | 076BA | 112C6 | 09E1C |
| 70 | 2726A | 2F4B0 | 25E3D | 15DE6 | 308B1 | 0D7FB | 1196C | 0BD53 |
| 71 | 289FD | 3495C | 2C772 | 0D1C6 | 2D855 | 1BA59 | 01297 | 00B23 |
| 72 | 2E936 | 37553 | 31EE9 | 1E026 | 27D7F | 134DE | 146D7 | 1FBB6 |
| 73 | 37A24 | 36101 | 34473 | 07695 | 2D6C2 | 1C05F | 06FFB | 1443E |
| 74 | 3D1AF | 29853 | 36B2C | 0C23D | 2B5BF | 0647F | 12084 | 09C1D |
| 75 | 2964F | 30824 | 236A0 | 11F14 | 3EF38 | 0342E | 1F876 | 16A2F |
| 76 | 351F8 | 32CA8 | 33583 | 141DC | 26533 | 06DA9 | 0BD59 | 000BA |
| 77 | 22160 | 2FDEA | 33446 | 17661 | 23FA3 | 0D7FE | 16C48 | 052E6 |
| 78 | 36995 | 36A68 | 336BB | 0CE56 | 3FE11 | 12FFA | 0BB3F | 1B8E3 |
| 79 | 318E2 | 3E532 | 2FDA4 | 09CAE | 3C3EF | 0B3A7 | 0E451 | 0CA29 |
| 80 | 207EB | 36723 | 2F1F5 | 0CCC9 | 3984A | 0C153 | 1D629 | 1745B |
| 81 | 3FE13 | 2CF97 | 2CA31 | 1B457 | 2BD86 | 06B5D | 04999 | 066EC |
| 82 | 3F9A3 | 22F77 | 3AB11 | 057AD | 3E5EF | 13D13 | 1F378 | 03B3F |
| 83 | 2510E | 248A3 | 341C6 | 06A43 | 27BC8 | 0842E | 0C4A2 | 1413C |
| 84 | 33B40 | 3EE48 | 28FF9 | 11ADD | 3D7BC | 0DD6F | 10961 | 15406 |
| 85 | 3459E | 3FC42 | 38114 | 166CA | 34C25 | 01779 | 107E5 | 008E9 |
| 86 | 36C4F | 309D7 | 390A8 | 18A58 | 24FD3 | 047F0 | 00AAD | 132EF |
| 87 | 39717 | 25556 | 28121 | 1266C | 3BCB4 | 0C94B | 16BD4 | 17B46 |
| 88 | 39AE3 | 37836 | 3D134 | 0E4C2 | 2FF8F | 15803 | 1B9B2 | 0E48E |
| 89 | 20F58 | 30F56 | 37826 | 0DBE9 | 25172 | 01A01 | 09AF7 | 0CF5D |
| 90 | 364B3 | 2B0CA | 2BE32 | 1AAE4 | 29D7D | 05D93 | 1B9D3 | 021FD |
| 91 | 35084 | 3E213 | 32EDB | 0F527 | 20813 | 09A6A | 1878A | 15683 |
| 92 | 379C8 | 288ED | 36C85 | 18C8D | 31498 | 1C7B3 | 1E2E4 | 06ADF |
| 93 | 22008 | 2CA3B | 2B613 | 1D1E8 | 23142 | 1D141 | 1F1E3 | 1C8D1 |
| 94 | 20DFD | 36D64 | 337D3 | 15C09 | 29B5A | 1C75C | 1FB06 | 0E75B |
| 95 | 31671 | 231B5 | 26127 | 0A0E4 | 35797 | 00D1A | 12AB4 | 187B8 |

TABLE 10-continued

Table 657 - SA Preamble for n = 0 (Segment 0)

| Idx | blk A | B | C | D | E | F | G | H |
|---|---|---|---|---|---|---|---|---|
| 96 | 3EBB7 | 23D69 | 3D1F2 | 0EEFD | 3AD47 | 1CC65 | 1C95B | 03C78 |
| 97 | 25945 | 34B15 | 33E30 | 1127A | 3B938 | 06A62 | 02D0D | 1CB49 |
| 98 | 366BE | 208F6 | 2DE7E | 0713F | 32D7A | 1A0EC | 06639 | 05F7F |
| 99 | 31FF8 | 3A9D6 | 39DB2 | 1A1D9 | 3880C | 011FE | 1BE69 | 1F792 |
| 100 | 22535 | 3A2E2 | 298F0 | 0FE41 | 3E139 | 05858 | 101CA | 1BC4D |
| 101 | 3DDA5 | 23D87 | 32161 | 12156 | 2CA14 | 1F4E9 | 003D1 | 134CD |
| 102 | 23F0D | 231E8 | 316AD | 147BF | 21671 | 0AB19 | 141D3 | 130BA |
| 103 | 3546F | 251B4 | 33661 | 1B440 | 3827E | 13FE7 | 0EAA5 | 1BCD6 |
| 104 | 39B3E | 33A87 | 300B5 | 09DC0 | 2AC29 | 051E6 | 06706 | 179AA |
| 105 | 372F2 | 3441D | 34450 | 19F2C | 22FF3 | 10C03 | 1A97E | 16089 |
| 106 | 31287 | 394BD | 329C7 | 0678B | 2DE2E | 0A8AF | 1FD93 | 194E2 |
| 107 | 2AEC7 | 23388 | 293E7 | 0798F | 27C06 | 0435B | 1E169 | 11A0A |
| 108 | 226E7 | 32E65 | 207B2 | 1DE2E | 26B3D | 178F7 | 15E56 | 16907 |
| 109 | 32A75 | 23B1C | 35792 | 0FF8F | 333D4 | 13399 | 0CD11 | 11C0D |
| 110 | 21E53 | 3BF69 | 217F9 | 1E4CC | 2FD44 | 0D3B4 | 08C04 | 17CFD |
| 111 | 364A7 | 249A0 | 3273F | 0B996 | 2FEBC | 1ACEF | 01EAB | 0EDF3 |
| 112 | 34831 | 340E1 | 3C372 | 08432 | 253F5 | 1993C | 0CA57 | 15BA3 |
| 113 | 3A7B8 | 2CFE0 | 31B37 | 0532D | 2BD66 | 0B638 | 10C4F | 02BA6 |
| 114 | 2CC36 | 33D15 | 354D3 | 0DCB9 | 34160 | 0E6A4 | 0A530 | 15AB7 |
| 115 | 36CD9 | 2B6B2 | 308A5 | 10C14 | 37DA2 | 14091 | 16635 | 09FC0 |
| 116 | 26390 | 3C089 | 20E90 | 198A0 | 3CF5A | 0DA14 | 0B79E | 00A81 |
| 117 | 35B16 | 2F4ED | 329B7 | 0BABD | 24957 | 071F8 | 1720B | 00A51 |
| 118 | 21AEA | 3CB09 | 3F850 | 1143F | 26F6B | 0B730 | 0A483 | 1C7B3 |
| 119 | 33300 | 2CDF0 | 23BE0 | 17190 | 33840 | 03912 | 1E470 | 07506 |
| 120 | 2CECA | 2B8EE | 227DA | 1F9B9 | 3BE06 | 0F0C1 | 085D7 | 088DF |
| 121 | 336A9 | 26C46 | 2A381 | 05AC3 | 3B3EF | 1635F | 02603 | 09A59 |
| 122 | 372BF | 25ABE | 3E1A1 | 02EBE | 2797C | 13647 | 14F10 | 056E9 |
| 123 | 2507B | 269DD | 393C9 | 14BC2 | 276FD | 082A9 | 1E301 | 02204 |
| 124 | 2DAD4 | 233C2 | 24AE7 | 1A63E | 3A4CD | 19D27 | 00F38 | 1E632 |
| 125 | 3D94C | 341EB | 33B63 | 1E63F | 20D60 | 0AA11 | 17730 | 040EC |
| 126 | 314B1 | 21EEE | 3A722 | 0D99D | 2ADB6 | 1C749 | 0C11E | 0300F |
| 127 | 306CB | 2D856 | 2B3E9 | 18998 | 3DCA7 | 00440 | 032D4 | 0AB14 |
| 128 | 2176F | 2526A | 2B8B8 | 03B7A | 27F98 | 0C00A | 15BC6 | 10BC4 |
| 129 | 3502C | 3381D | 30162 | 0A91C | 3723C | 0BA48 | 13991 | 10007 |
| 130 | 205A9 | 20E77 | 236F0 | 1208E | 333DB | 1FD1D | 0F663 | 1A2CD |
| 131 | 29EFE | 3165B | 391FC | 18A82 | 24FA5 | 13B49 | 0EA6A | 1E7C5 |
| 132 | 3BC8F | 35058 | 2B040 | 03175 | 21D63 | 080FD | 10564 | 1943B |
| 133 | 33856 | 31A6D | 37FA5 | 10D6A | 2778B | 13BA8 | 17FCD | 07D78 |
| 134 | 2462C | 3126A | 3DE29 | 0EFCE | 2CE17 | 1F670 | 00A16 | 09992 |
| 135 | 31358 | 3A006 | 3D6C9 | 09C3F | 2E42D | 0757F | 07DE5 | 13F2A |
| 136 | 26FDC | 25BF0 | 22AC3 | 0D92D | 2CB72 | 17AF7 | 1761B | 13F44 |
| 137 | 39282 | 3E781 | 2807B | 055FE | 316E0 | 16070 | 125E6 | 1595E |
| 138 | 237D2 | 2FB31 | 3DFD9 | 03B7C | 28F55 | 09601 | 09A26 | 1210C |
| 139 | 3A13B | 330D3 | 2C606 | 033B0 | 293B9 | 1D684 | 173DD | 18858 |
| 140 | 27825 | 3A0FF | 288D0 | 16B7E | 31A53 | 1358C | 03259 | 07CA5 |
| 141 | 246FE | 35C69 | 32A82 | 14D6A | 3CAFC | 03A11 | 19D90 | 037DC |
| 142 | 37170 | 2C096 | 22EB9 | 088D9 | 3F0AC | 116D0 | 0AA84 | 07AAC |
| 143 | 31081 | 30C8F | 38264 | 0AF24 | 24325 | 15FE1 | 026C7 | 04115 |
| 144 | 234A3 | 28DB6 | 3A4CD | 0545C | 35272 | 19CBD | 07F1F | 009B7 |
| 145 | 21F32 | 3677D | 35CFB | 1D63F | 293B0 | 1244F | 00CDF | 0D3CB |
| 146 | 30318 | 2EDED | 2F09A | 15C54 | 329CC | 0B24E | 0D93A | 0BC81 |
| 147 | 201CB | 2DBD1 | 3E4A5 | 0E7A3 | 2C50A | 0A4BC | 15412 | 182CC |
| 148 | 26E83 | 3E68F | 3D675 | 031A9 | 2EDD8 | 1AA4F | 02443 | 16BD9 |
| 149 | 38C83 | 3892F | 3E237 | 10FC3 | 26F2E | 1FADD | 19F56 | 191B2 |
| 150 | 2181D | 26EFC | 240B6 | 1224B | 3BD01 | 0AB64 | 080DA | 1BEAE |
| 151 | 39273 | 26387 | 3BF09 | 1AF9D | 37D3D | 1A42A | 09DE7 | 05D2C |
| 152 | 3ECE9 | 380EB | 2DD42 | 0F762 | 3D03E | 1A53C | 0687D | 002A2 |
| 153 | 2ABB7 | 2FC33 | 234C2 | 1E30C | 2DE4E | 0DF46 | 1B022 | 0F06E |
| 154 | 33D0E | 2861C | 2F481 | 0D8E2 | 3B345 | 18AFF | 142B3 | 13ECD |
| 155 | 2A691 | 39F50 | 3907C | 18306 | 2999E | 0826F | 0F5C2 | 1C1E8 |
| 156 | 3F10D | 2E86C | 35EAF | 0C23D | 30BBF | 1C939 | 142A2 | 1D1AE |
| 157 | 30888 | 334D8 | 2F54E | 095C0 | 22591 | 0A2A9 | 03575 | 07E27 |
| 158 | 2C05B | 3A3A2 | 2B9E1 | 043FD | 26767 | 0B509 | 152FC | 05B3A |
| 159 | 3F536 | 363C2 | 39C31 | 0A348 | 3EC9C | 074E0 | 1E6C9 | 0A359 |
| 160 | 34212 | 2B602 | 25538 | 1D949 | 3110B | 09D01 | 17649 | 030E5 |
| 161 | 27DA4 | 25283 | 33CB0 | 00F26 | 2F77A | 0428B | 19C1F | 03A2B |
| 162 | 29516 | 294A8 | 34D82 | 03B87 | 27025 | 03C98 | 13676 | 043DD |
| 163 | 212A3 | 2BEB5 | 3A929 | 0EEB0 | 3C43E | 18D49 | 013EE | 07B2A |
| 164 | 327A2 | 265B8 | 3E069 | 0615E | 23B65 | 085AA | 077FC | 18161 |
| 165 | 26BC6 | 2D590 | 3213C | 16691 | 20E7E | 13460 | 1E439 | 079FB |
| 166 | 353C0 | 26830 | 305A3 | 057BC | 394DA | 192E4 | 0F382 | 0867E |
| 167 | 293AB | 20EF0 | 22707 | 0816D | 216A4 | 07B67 | 09B67 | 01B88 |
| 168 | 29915 | 2DEB9 | 3CE98 | 14D96 | 26F9B | 15D4A | 00853 | 1DE0C |
| 169 | 36E40 | 3C7E1 | 3DE6B | 0D335 | 39671 | 06EBA | 18B85 | 07A81 |

TABLE 10-continued

Table 657 - SA Preamble for n = 0 (Segment 0)

| | blk | | | | | | | |
|---|---|---|---|---|---|---|---|---|
| Idx | A | B | C | D | E | F | G | H |
| 170 | 36DBA | 218AC | 26D28 | 1BC51 | 37AF3 | 1635F | 1B82C | 0061A |
| 171 | 33C22 | 3F96A | 33645 | 05F3B | 2AF82 | 16800 | 1630A | 10F03 |
| 172 | 3EEEF | 318D9 | 276E1 | 03FCD | 34D35 | 05272 | 1B329 | 1D755 |
| 173 | 3D442 | 37142 | 3B3DC | 1C93E | 32C36 | 0DA72 | 05EE5 | 1D8BB |
| 174 | 34B1B | 2A7A5 | 2AA15 | 0CB44 | 3D239 | 08C8D | 130BA | 0BF9A |
| 175 | 3E04B | 3FF31 | 2B8B6 | 14832 | 2D5BA | 01588 | 1F533 | 1FCF6 |
| 176 | 35613 | 2E44A | 36AE7 | 186C8 | 2450D | 00BAA | 05F60 | 03973 |
| 177 | 2D44C | 3C74B | 21D8B | 08900 | 21DB9 | 129AB | 1C563 | 100D6 |
| 178 | 31176 | 2D23F | 27D5C | 11F23 | 23B1C | 0803B | 18D88 | 0EB94 |
| 179 | 3A4F7 | 3DC0C | 3D797 | 0E67A | 3281F | 09BC7 | 03BF5 | 0F8B6 |
| 180 | 21F13 | 2DB72 | 2B9AD | 10C4E | 39523 | 1F841 | 07D9A | 04F1B |
| 181 | 26639 | 3613F | 296F1 | 0B3F3 | 344F5 | 18059 | 175ED | 0E5DE |
| 182 | 3E770 | 2B61B | 211C1 | 1AB8C | 2BC76 | 1449F | 09942 | 0F505 |
| 183 | 3548A | 39519 | 3BC29 | 059E9 | 2AEDE | 12581 | 0B2D0 | 0DC32 |
| 184 | 3177E | 23D07 | 2440D | 17B42 | 200DA | 0C89E | 16386 | 0B4D2 |
| 185 | 201A7 | 2797D | 2A402 | 18C40 | 39516 | 042F6 | 1C339 | 0287C |
| 186 | 37ED0 | 20BC2 | 20E2B | 137F4 | 21262 | 19E9F | 0A112 | 0C910 |
| 187 | 24EBC | 2B01A | 39C23 | 0A029 | 26819 | 02519 | 1694F | 088A8 |
| 188 | 2EAED | 3AFD0 | 364CB | 1518B | 2B3D2 | 1CA75 | 14337 | 1B365 |
| 189 | 2808C | 3BAFC | 2CDC2 | 0BFE2 | 20C06 | 193A3 | 1233B | 14A7A |
| 190 | 36EF7 | 37D4A | 28F07 | 18BB0 | 2862F | 09A95 | 0D154 | 1E3E6 |
| 191 | 33D1A | 2C6B7 | 341BB | 0CF28 | 2F438 | 154C3 | 0A2C7 | 15A5B |
| 192 | 3F426 | 30FD5 | 2C7CE | 07C50 | 2D1A0 | 06569 | 04B31 | 05FD0 |
| 193 | 303D5 | 27A8A | 356D3 | 0FEF6 | 363EA | 08562 | 0ED7A | 175B4 |
| 194 | 3EC32 | 398EC | 2CC89 | 0C404 | 3907C | 1B759 | 1A587 | 03175 |
| 195 | 39F93 | 30E4C | 35A26 | 07AF9 | 3797B | 0EB5E | 1AFF5 | 1A672 |
| 196 | 2BAD0 | 2EEA0 | 21BBA | 1B7CA | 32264 | 0F0B9 | 131FA | 0E97E |
| 197 | 38127 | 31582 | 36BBE | 1FE4F | 25DF2 | 07EA9 | 0565A | 1698D |
| 198 | 3DC73 | 25F38 | 33B0F | 04B20 | 3B4BE | 0F73D | 1D9DB | 1029C |
| 199 | 33FB6 | 2F281 | 3EB2E | 0D90A | 37AB9 | 1579A | 1994A | 1EFC4 |
| 200 | 3C0F6 | 3566A | 3DFD7 | 14834 | 22577 | 04383 | 034D3 | 1D63E |
| 201 | 32C8E | 39FE9 | 25309 | 0E783 | 22ED6 | 14413 | 182D0 | 1D94D |
| 202 | 36BA4 | 278F4 | 3E3FB | 049F4 | 34B51 | 10EB3 | 0AF98 | 1A3BE |
| 203 | 23E59 | 3AC99 | 221F4 | 0BC4F | 31DD7 | 07190 | 01735 | 0CF52 |
| 204 | 227C2 | 2BED6 | 30C21 | 1CC8D | 317EF | 16B4C | 1629F | 16DC8 |
| 205 | 300C3 | 28EAF | 2A68F | 0E941 | 2C3DD | 163A5 | 09BD6 | 05CCA |
| 206 | 21159 | 3D839 | 2365D | 0856C | 20C00 | 1AFEC | 0674B | 0AF29 |
| 207 | 2DF8E | 36078 | 3C37B | 1F5B8 | 32D1A | 1D705 | 02B88 | 13BF3 |
| 208 | 3A2EB | 3CA5E | 277CB | 19169 | 37018 | 1221E | 17283 | 06BFE |
| 209 | 3663E | 38132 | 3DDC6 | 0620F | 331D3 | 1AD84 | 0B417 | 0A02A |
| 210 | 3883A | 3448E | 221A9 | 0EB88 | 3D9BD | 0B119 | 1F0DD | 18264 |
| 211 | 296BE | 28C22 | 309D2 | 0E577 | 384E5 | 0F074 | 04077 | 06E5D |
| 212 | 39B37 | 36C83 | 3E5D5 | 10C02 | 3E880 | 18FE2 | 03D7A | 1E433 |
| 213 | 392BC | 282EA | 237CF | 08F89 | 35EBE | 04733 | 0F765 | 0A2F5 |
| 214 | 2D434 | 3254C | 2E816 | 1F529 | 20AD8 | 111DD | 0B23A | 0CEF0 |
| 215 | 27A5B | 3630B | 2FAD9 | 1DB40 | 2B485 | 1D5F4 | 0D95E | 0CFEC |
| 216 | 30B51 | 39851 | 2A1E3 | 0A6DB | 28299 | 18837 | 06E57 | 10018 |
| 217 | 31FBC | 2E171 | 3DD23 | 18189 | 29A2A | 1F5BE | 1027B | 05C6B |
| 218 | 3B7EE | 3B4AA | 3A6D1 | 1063A | 25E5F | 17B00 | 01626 | 0FA77 |
| 219 | 2EB6B | 27CA2 | 2A739 | 108DF | 2BC9F | 0DC9D | 18257 | 0E2C3 |
| 220 | 305AC | 221B1 | 37F7F | 0777C | 20BE4 | 12BB5 | 12E57 | 0794D |
| 221 | 32ED1 | 2E012 | 3C456 | 08DCC | 28693 | 17865 | 11892 | 1F6D4 |
| 222 | 33A3E | 3EF38 | 29619 | 12828 | 2F785 | 0D1D9 | 02A7C | 19C4B |
| 223 | 277CA | 2BAC3 | 20F0B | 0E3CF | 3E30B | 17CF2 | 0C66F | 0670D |
| 224 | 38EB9 | 2027C | 3D0AF | 19FAD | 2D3DE | 0FEE5 | 1C843 | 08902 |
| 225 | 21C7F | 2029B | 3BED4 | 1E1DE | 36F6C | 0DD85 | 165A7 | 13637 |
| 226 | 2A986 | 3EEAF | 2E182 | 164AE | 26B0E | 0FE0F | 1A485 | 0EB33 |
| 227 | 38177 | 2A44F | 2B222 | 0CD6D | 32C15 | 06B95 | 14D30 | 00E7A |
| 228 | 263A7 | 2F3E6 | 25C44 | 0D315 | 2C3AD | 02353 | 13F61 | 16CB3 |
| 229 | 2A956 | 36F67 | 21791 | 14004 | 222FC | 1C91B | 02ACD | 1DB09 |
| 230 | 2683E | 3C516 | 290C7 | 18FFB | 3AFE5 | 0C2F0 | 1CE5E | 19B14 |
| 231 | 3FC36 | 39DA0 | 3AA4B | 1243F | 34FBB | 09428 | 1BD4A | 01927 |
| 232 | 23B36 | 3BA46 | 3D433 | 126CA | 2F152 | 116C0 | 1E5B8 | 0424D |
| 233 | 36725 | 3CD2B | 24DD6 | 1AE63 | 321E3 | 1B63C | 11D51 | 1F7D6 |
| 234 | 2D676 | 2F5D9 | 20324 | 11DD6 | 385F5 | 102D3 | 1D57A | 0B0FE |
| 235 | 3BAE9 | 36BC6 | 3E739 | 1BC41 | 31F1C | 1FA27 | 12283 | 15721 |
| 236 | 25694 | 38D83 | 32268 | 14404 | 22C82 | 02B1F | 14CB4 | 083D2 |
| 237 | 3E56B | 23886 | 3EA38 | 0E52B | 222A9 | 1B3E9 | 0F81E | 1D9FD |
| 238 | 30C8D | 363DC | 2AC53 | 12A7A | 3AE50 | 11773 | 10491 | 05FE3 |
| 239 | 256BC | 2DE49 | 20E69 | 10B0F | 34A04 | 00655 | 12081 | 02A03 |
| 240 | 32289 | 33BC0 | 2553F | 1DB8B | 2C5C6 | 006BA | 13963 | 0A787 |
| 241 | 2802D | 336F6 | 2071B | 1721B | 23280 | 06D85 | 1C75C | 18167 |
| 242 | 3AE04 | 212E6 | 29BF9 | 09B13 | 307AF | 187AE | 04EAF | 00B52 |
| 243 | 22A6D | 2BBB4 | 36270 | 12ACD | 32C83 | 1CA49 | 0E821 | 0961A |

TABLE 10-continued

Table 657 - SA Preamble for n = 0 (Segment 0)

| | | | | blk | | | | |
|---|---|---|---|---|---|---|---|---|
| Idx | A | B | C | D | E | F | G | H |
| 244 | 228D5 | 2CF29 | 27DDF | 12B25 | 3E57F | 1172C | 033D8 | 04713 |
| 245 | 23A41 | 354F3 | 30484 | 18145 | 3B17E | 1EB32 | 0DBD5 | 0BF01 |
| 246 | 294CB | 26FD8 | 3B034 | 1463D | 3073F | 01A3D | 0AFCE | 17661 |
| 247 | 319D3 | 2352A | 2430D | 099C7 | 3F840 | 07E20 | 138EC | 0AA70 |
| 248 | 3DBE9 | 39A18 | 358A1 | 16567 | 3E3F4 | 0580C | 051CD | 0C072 |
| 249 | 2A925 | 314AF | 205D4 | 02BE1 | 23C2D | 0D41C | 11E20 | 116C2 |
| 250 | 247D0 | 25515 | 2C6C9 | 14805 | 2BF9E | 10CDB | 1E2EB | 130FE |
| 251 | 390A5 | 2C3BC | 3CE8E | 04720 | 28D78 | 04B30 | 08FF7 | 01079 |
| 252 | 29329 | 3F13E | 30A30 | 010EB | 263A8 | 1A23A | 0178B | 1D231 |
| 253 | 3B888 | 37156 | 2C7D2 | 10C79 | 3FF07 | 0E112 | 06A42 | 08313 |
| 254 | 3D8F4 | 3F7F2 | 24F25 | 1651C | 24A73 | 09BBA | 064D3 | 0EAE1 |
| 255 | 2A685 | 3DFFB | 22546 | 194CC | 3DEE3 | 05C53 | 115B6 | 1A57E |

QPSK-Type SA-Preambles According to Embodiment of the Present Invention

Table 11, Table 12 and Table 13 each illustrate 128 base sequences generated according to an embodiment of the present invention. Each base sequence is identified by index q and expressed in a hexadecimal format. The sequences listed in Table 11, Table 12 and Table 13 are for segment 0, segment 1 and segment 2, respectively. In Table 11, Table 12 and Table 13, blk denotes the subblocks of each sequence, (A, B, C, D, E, F, G, H).

A modulated sequence is obtained by converting a hexadecimal sequence $X_i^{(q)}$ (X=A, B, C, D, E, F, G, H) to two QPSK symbols, $v_{2i}^{(q)}$ and $v_{2i+1}^{(q)}$. Here, i is an integer from 0 to 8 and q is an integer from 0 to 127. [Equation 24] describes an example of converting the hexadecimal sequence $X_i^{(q)}$ to two QPSK symbols.

$$v_{2i}^{(q)} = \exp\left(j\frac{\pi}{2}(2 \cdot b_{i,0}^{(q)} + b_{i,1}^{(q)})\right)$$

$$v_{2i+1}^{(q)} = \exp\left(j\frac{\pi}{2}(2 \cdot b_{i,2}^{(q)} + b_{i,3}^{(q)})\right)$$

[Equation 24]

where $X_i^{(q)}=2^3 \cdot b_{i,0}^{(q)}+2^2 \cdot b_{i,1}^{(q)}+2^1 \cdot b_{i,2}^{(q)}+2^0 \cdot b_{i,3}^{(q)}$. According to the above equation, binary values 00, 01, 10 and 11 are converted respectively to 1, j, −1 and −j. However, this is a mere exemplary application and thus the hexadecimal sequence $X_i^{(q)}$ may be converted to QPSK symbols by any other similar equation.

For example, when q=0, the sequence of subblock A is given as 314C8648F and its modulated QPSK signal is [+1 −j +1 +j +j +1 −j +1 −1 +1 +j −1 +j +1 −1 +1 −j −j].

The 128 sequences illustrated in each of Table 12, Table 13 and Table 14 may be doubled in number by complex conjugation. That is, additional 128 sequences may be generated by complex conjugation of the 128 sequences. The additional sequences may be indexed with 128 to 255. [Equation 25] describes an extended sequence generated from a base sequence by complex conjugation.

$$v_k^{(q)}=(v_k^{(q-128)})^* \text{ for } 128 \leq q < 256$$

[Equation 25]

where k is an integer from 0 to $N_{SAP}-1$, $N_{SAP}$ denotes the length of an SA-Preamble, and the complex conjugation(.)* may be defined as conversion between complex signals (a−jb) and (a+jb).

In addition, the 128 sequences illustrated in each of Table 12, Table 13 and Table 14 may be doubled in number by a reverse operation. That is, additional 128 sequences may be generated by performing the reverse operation on the 128 sequences. The additional sequences may be indexed with 128 to 255. The use of both complex conjugation and the reverse operation may lead to production of 384 additional sequences which may be indexed with 128 to 511.

TABLE 11 n = 0: (Segment 0)

| | | | | blk | | | | |
|---|---|---|---|---|---|---|---|---|
| q | A | B | C | D | E | F | G | H |
| 0 | 314C8648F | 18BC23543 | 06361E654 | 27C552A2D | 3A7C69A77 | 011B29374 | 277D31A46 | 14B032757 |
| 1 | 281E84559 | 1A0CDDF7E | 2473A5D5B | 2C6439AB8 | 1CA9304C1 | 0AC3BECD0 | 34122C7F5 | 25362F596 |
| 2 | 00538AC77 | 38F9CBBC6 | 04DBCCB40 | 33CDC6E42 | 181114BE4 | 0766079FA | 2DD2F5450 | 13E0508B2 |
| 3 | 3BE4056D1 | 2C7953467 | 0E5F0DE66 | 03C9B2E7D | 1857FD2E3 | 15A276D4F | 210F282AF | 27CE61310 |
| 4 | 3DBAAE31E | 254AE8A85 | 168B63A64 | 05FDF74FB | 3948B6856 | 33656C528 | 1799C9BA1 | 004E0B673 |
| 5 | 177CE8FBC | 21CEE7F09 | 397CD6551 | 01D4A1A10 | 1730F9049 | 067D89EA9 | 3AC141077 | 3D7AD6888 |
| 6 | 3B78215A1 | 17F921D66 | 385006FDC | 011432C9D | 24ED16EA6 | 0A54922F1 | 02067E65D | 0FEC2128D |
| 7 | 01FF4E172 | 2A704C742 | 3A58705E1 | 3F3F66CD2 | 07CA4C462 | 1854C8AA3 | 03F576092 | 06A989824 |
| 8 | 1A5B7278E | 1630D0D82 | 3001EF613 | 34CCF51A1 | 2120C250A | 06893FA2D | 156073692 | 07178CFA7 |
| 9 | 032E31906 | 2DD318EAA | 1DE55B14D | 0EF4B6FB3 | 27DED0610 | 1BC8440D3 | 0ED86BF8D | 14FAFDE2C |
| 10 | 174725FFD | 0D2FB1732 | 124470F56 | 292D9912B | 1571408A7 | 227197AE9 | 2430BC576 | 0B67304E0 |
| 11 | 1F1DCD669 | 293DD1701 | 0C34F1B84 | 28496EE51 | 3DC41327F | 071C06523 | 28E1657B6 | 02588EFDA |
| 12 | 22E4AA041 | 3810362F1 | 1955F1DE7 | 0D6D2F8BE | 11F31358E | 3EB27BB12 | 1F4E60111 | 119BDA927 |
| 13 | 14300B522 | 152E6D482 | 168DF6E43 | 0740B7AE0 | 14FE7DCDD | 0FA092626 | 23697615A | 1F1331EB8 |
| 14 | 12C65ED00 | 317643CD7 | 2C637A415 | 15E3E5185 | 0F5CBB9E0 | 23290B156 | 26F37EFE8 | 1AA174793 |
| 15 | 1DD6453F0 | 032C4BD39 | 082659BD5 | 320C5E691 | 224E555B2 | 3A9615A8D | 1BED03424 | 28E6A9CED |
| 16 | 068AE7EE9 | 16F724910 | 3803DD9BD | 2A31A2FFB | 010BF5237 | 33CB067E6 | 0280C28B7 | 184417B94 |
| 17 | 1D651280A | 2C7BCF443 | 17324EFB0 | 236E5C411 | 381215183 | 2F076E64E | 0A6F2EE74 | 3DA4196B7 |
| 18 | 27341650F | 1B520099C | 09AC91114 | 000A5F48B | 30AB4B9B6 | 2D0DB0DE6 | 1CF57978A | 2D424406B |

TABLE 11-continued n = 0: (Segment 0)

| | blk | | | | | | | |
|---|---|---|---|---|---|---|---|---|
| q | A | B | C | D | E | F | G | H |
| 19 | 3A01E2FB2 | 0DF5B257B | 019D1C63A | 0EA7DCDDB | 242D96605 | 2DA675F15 | 1DEC54193 | 3B6341C16 |
| 20 | 2DDFAEB05 | 21D0A1700 | 0FA09BB78 | 17DA7F8BB | 06E883B3F | 02E6B929B | 2C1C413B4 | 030E46DD1 |
| 21 | 1B625E3F9 | 0F708F756 | 00CD97B18 | 3F036B4DF | 2CF08C3E5 | 213A5A681 | 14A298D91 | 3D2ED63BC |
| 22 | 2DA48D5A9 | 0C085BD17 | 01903428A | 3DF2A30D9 | 29061309A | 16F7DC40E | 2AF88A583 | 27C1DA5E9 |
| 23 | 30DBAC784 | 20C3B4C56 | 0F1538CB7 | 0DDE7E1BE | 2C312903B | 0FF21E6C2 | 032C15DE3 | 26C9A6BA4 |
| 24 | 3188E8100 | 385FEFE2D | 3967B56C7 | 3F62D246B | 1826A755E | 2CDA895EA | 2FAB77825 | 1B525FF88 |
| 25 | 339467175 | 2DE49506B | 27B7282A9 | 0254470A3 | 3374310AF | 2DF20FD64 | 3848A6806 | 11C183E49 |
| 26 | 02AFA38DC | 0F2AFDDF4 | 1A05650E2 | 061439F88 | 11C275BE0 | 30C41DEC9 | 119E070E9 | 1E76542C1 |
| 27 | 1B364E155 | 086FF808C | 29F1BA9DC | 0A830C788 | 2E70D0B3A | 34EA776B1 | 3D13615C0 | 15FC708D4 |
| 28 | 38ECFC198 | 07034E9B3 | 2340F86B3 | 07562464C | 22823E455 | 1F68D29E9 | 257BB66C6 | 1083992F1 |
| 29 | 375C4F5AB | 3C0F5A212 | 0EA21BC30 | 13E8A26F2 | 17C039773 | 283AD6662 | 1F63AB833 | 2DE933CAF |
| 30 | 2B773E3C5 | 3849BBE6C | 1CAD2E5AB | 0405FA1DE | 1B27B4269 | 3B3BF258F | 300E77286 | 39599C4B1 |
| 31 | 1E878F0BE | 0AE5267EC | 376F42154 | 1CD517CC2 | 302781C47 | 123FEC7E0 | 16664D3D8 | 24B871A55 |
| 32 | 20E200C0A | 1C94D2FF1 | 213F8F01B | 369A536E0 | 161588399 | 29389C7FC | 259855CAC | 06025DCE2 |
| 33 | 28D2E001C | 3C51C3727 | 106F37D0E | 1FB0EFDD1 | 2CD9D33C3 | 1EA190527 | 0BB5A6F9E | 074867D50 |
| 34 | 08EFC44B5 | 1B484EABE | 05FEB2DE2 | 211AF91B5 | 0CF52B1E1 | 002B5C978 | 11D6E5138 | 0D402BDD2 |
| 35 | 337C618F4 | 0A4C31DDA | 1D93003D6 | 006D7D088 | 348043A6D | 325E05758 | 2C53EEEB8 | 15ED8E614 |
| 36 | 38375C2FF | 18C78FD02 | 30C11EF53 | 3916581DD | 1B75263FF | 2D8FDD6A9 | 00C4E8482 | 1D201F96A |
| 37 | 2E10B0D05 | 2EF203893 | 2491D95F1 | 34D995B51 | 32214BDF5 | 21F5B9F3 | 3E74AC66E | 1B813A999 |
| 38 | 153E7269D | 2391C7BFC | 1ADD3A595 | 0EFD3086E | 00AD88A8E | 0D8B007CA | 0F22C5F9D | 010E86385 |
| 39 | 3B58C7BFF | 0BA76496E | 3AD0B7BBF | 1D6D10FB3 | 3A607BEFC | 28F122A95 | 057950727 | 179449CB7 |
| 40 | 37AC5194A | 390BD9C00 | 3A48C0461 | 12FBCE4C6 | 2A8DD4171 | 10E9F1E34 | 251F5D167 | 1124E96B1 |
| 41 | 0FEF20C67 | 31EC9EA3F | 275B31143 | 22DA4F02B | 352C0F648 | 21FF5B9F3 | 3E5BC2372 | 0A1AE08FE |
| 42 | 080EDC49B | 17AD7F7BA | 390775B3C | 1380B00DA | 2477FF17C | 2E6D9E5AF | 05381F2DD | 26143CC17 |
| 43 | 2DB485795 | 1B3252799 | 39AD0211C | 3AAE31B76 | 30532A187 | 1C8EA5F5A | 2EA6E4D6B | 30570A2E4 |
| 44 | 11BB4F78A | 12CCE1428 | 2C67EEF99 | 20E3F841A | 20CFCD5F2 | 1618A7B94 | 111FF6092 | 2ED034E06 |
| 45 | 1C66335E5 | 0CA9B9BD2 | 3213028AE | 15542DD28 | 290F7DAE2 | 2137F02D5 | 17DF9445D | 24F162FFB |
| 46 | 360FB966B | 17D878955 | 1C1D67093 | 065B84F3A | 1A1D955E3 | 24C73C11E | 270EA9EB2 | 114DCA02C |
| 47 | 002CE84DD | 0616DD253 | 3EB188345 | 1FF852926 | 37E160F00 | 040DF51EC | 1857A33BA | 230FD8A0D |
| 48 | 233C0A71F | 22E428104 | 0325F8170 | 39566B188 | 32DA16A4A | 039FDF1DC | 27A3E946C | 0D69F26D9 |
| 49 | 0583F9F73 | 378380CB6 | 059D8A960 | 3E3442C7F | 026138ADB | 25F370F1E | 09D3EB2CC | 2D37D50C0 |
| 50 | 08DF9CC66 | 2C2E7AA8F | 3CB241ED2 | 03216B4D2 | 39736B451 | 25F6F113F | 08FD2AC3C | 1974574FD |
| 51 | 3D1FF6041 | 2CE2AB97F | 01A734F3B | 1DCF9F3C5 | 268D595CA | 1FBD2A8B8 | 0F1449F86 | 370C352FD |
| 52 | 123218E40 | 3AA057589 | 20F73A16F | 26E3BCA5F | 3A7330DC6 | 12C659384 | 39D99FF1B | 276DFC540 |
| 53 | 185AEDEA4 | 0418B3643 | 382F7700A | 3FC35ED60 | 07BA2F838 | 1BC840C93 | 2469A41EC | 0CE7B4CB0 |
| 54 | 2E194E2BF | 3302A0B28 | 1836001EE | 154A4738A | 36A3BBD72 | 23CCD0EB1 | 044B3A13B | 2B50C8057 |
| 55 | 0B76405D3 | 231AAA728 | 0EE05E9B6 | 0093A21F2 | 2065A01D0 | 1F2B810D4 | 1082F3A73 | 1DAFEA492 |
| 56 | 07AD23A3A | 2091957F1 | 3B9D8CBF0 | 21E4160BE | 1BFB25224 | 3D9085D16 | 03076DD39 | 1DBCF8D03 |
| 57 | 226D70EBF | 3ED15246C | 364130C46 | 22F6D4AA3 | 3FCC9A71B | 3B9283111 | 0484F0E58 | 14574BD47 |
| 58 | 3F49B0987 | 305231FA6 | 0CF4F6788 | 3B9296AED | 2346190C5 | 3365711F4 | 078900D4A | 352686E95 |
| 59 | 1D62AC9A4 | 104EDD1F5 | 1B0E77300 | 1CED8E7F0 | 388E8002C | 1FE6199F4 | 02239CB15 | 1FE5D49A2 |
| 60 | 21314C269 | 28600D12A | 22E4F1BAA | 044E211B1 | 0DECFE1B4 | 3E5B208CC | 1CFC91293 | 21E7A906B |
| 61 | 02C029E33 | 1BA88BE4D | 3742AE82F | 21EF0810F | 17D23F465 | 240446FB5 | 17CCE51D9 | 2C0B0E252 |
| 62 | 16F9D2976 | 10185ECE6 | 2821673FD | 02674271C | 3A8A75B7C | 22C6A080F | 2216004E5 | 0E8605674 |
| 63 | 06E4CB337 | 32A31755D | 062BE7F99 | 1417A922D | 2271C07E5 | 24D6111FA | 3F2639C75 | 0CE2BB3A0 |
| 64 | 18D139446 | 2426B2EA8 | 352F18410 | 1133C535E | 10CC1A28F | 1A8B54749 | 22A54A6F4 | 2F1920F40 |
| 65 | 22443017D | 2265A18F5 | 14E1DAE70 | 11AC6EA79 | 31A740502 | 3B14311E7 | 3AA31686D | 26A3A961C |
| 66 | 2018F4CA9 | 3A0129A26 | 39BDA332E | 1941B7B49 | 03BBCE0D8 | 20E65BD62 | 2EA4A6EE6 | 3B095CCB3 |
| 67 | 0CC97E07D | 11371E5FF | 31DFF2F50 | 17D46E889 | 352B75BEA | 1F1529893 | 21E6F4950 | 1BD034D98 |
| 68 | 275B00B72 | 125F0FE20 | 0FB6DE016 | 0C2E8C780 | 3026E5719 | 119910F5F | 3B647515B | 1D49FED6F |
| 69 | 250616E04 | 0882F53BF | 11518A028 | 3E9C4149D | 09F72A7FB | 0CC6F4F74 | 2838C3FD1 | 08E87689B |
| 70 | 212957CC2 | 03DD3475B | 044836A0B | 2463B52C0 | 0342FB4B0 | 34AD95E9B | 2936E2045 | 3B0592D99 |
| 71 | 2922BD856 | 22E06C30C | 390070AED | 09D6DC54F | 3485FA515 | 064D60376 | 07E8288B3 | 3DD3141BF |
| 72 | 29CB07995 | 007EE4B8B | 16E787603 | 07C219E93 | 1031B93DD | 23DEFF60B | 30F1D7F67 | 0EFE02882 |
| 73 | 11F3A0A2F | 38C598A57 | 3FE72D35B | 1F655E0D1 | 0B3AC0D92 | 3430DDB1A | 3BAADBF42 | 02D6124C0 |
| 74 | 05FC8085D | 345A5C470 | 07DAAE1E9 | 0D7150B88 | 25D2A5B10 | 16F8E5021 | 3240EFC71 | 0F0F5922D |
| 75 | 399F32F6E | 2EEB17A8E | 0D61665D0 | 2138EE96F | 3F8119063 | 01B5048F7 | 27075153D | 265DF8280 |
| 76 | 3962CC581 | 2337D2983 | 286FD7BBA | 185126E0E | 1F95AD927 | 0F7EBC374 | 1E3A4B6FF | 20CA9B9BD |
| 77 | 1C85C13AF | 290C37167 | 1FDD26E8F | 0C38736B8 | 0174DB972 | 0A921E3CC | 097557C9D | 09452C1E6 |
| 78 | 2D48D6C00 | 2D9BC8DFE | 10FF1E128 | 25C96BA85 | 0FB071B8E | 0F09B3C9C | 1A3E11441 | 38EDDA03D |
| 79 | 396B88B2F | 2FA7F4BDB | 30D098CAD | 0D54D12CB | 1D0823F55 | 2DC53B9AA | 11BCF7438 | 33F6EC091 |
| 80 | 21E03CD65 | 1A2FE5B92 | 2851F8445 | 0251E386C | 1468950D8 | 1A8B39748 | 001B42236 | 26CD82DA5 |
| 81 | 2CEA1E6BB | 006C97E74 | 00C2B887D | 23461AF95 | 0E9CB2BD2 | 0B0EA3022 | 1FB56A7A3 | 25A7FA625 |
| 82 | 208FC2A1F | 381C5733A | 03F11D7E3 | 07ED6A7B7 | 1FEC85E09 | 3D61E0440 | 356F4B1C3 | 3756E5042 |
| 83 | 2061E47F0 | 22EAA0AD3 | 24796BB65 | 03C59BA4B | 32A75E105 | 22155381B | 23E5F041C | 155D2D7F9 |
| 84 | 381AFFB73 | 212B5E400 | 1F1FE108E | 04BF2C90D | 3C1A949D9 | 2854A9B45 | 001B09322 | 3A9372CC1 |
| 85 | 058B23433 | 0904C6684 | 158CADB9E | 11BA4B978 | 1854368F4 | 1919ECEA7 | 147F1FD34 | 2E228AA3C |
| 86 | 34857F3DB | 2CB44F7BF | 111A065D3 | 1BEAB392E | 27F081ED8 | 3E67D1186 | 0F6265AC5 | 27716FAF9 |
| 87 | 38EBB8BF1 | 32ED6E78F | 32ED6E78F | 2188282AA | 00D49B758 | 1765BA752 | 2B50AFDCC | 068C82450 |
| 88 | 234F0B406 | 02FB239CD | 15AD61139 | 2250A5A05 | 1CD8117E0 | 0D849163F | 268C7A5A6 | 22A802020 |
| 89 | 2D0FE8D16 | 0C14E3771 | 07DE5320C | 0640C2762 | 1CBD9FF4E | 37A91986D | 2024DA401 | 164D4A84C |
| 90 | 3225B4D60 | 3013B75F2 | 2A77AE5C5 | 2C25377EE | 03C8DF835 | 346E80FCB | 116B79FA5 | 356D2B604 |
| 91 | 0D55231FD | 247907F31 | 0CFA0B049 | 36D069A95 | 10D4CDE71 | 1A32544D7 | 38336885F | 173ECC08D |
| 92 | 207420EAC | 26FCFE182 | 3FE7B31C6 | 15B320E13 | 187AA34A8 | 1B52253BF | 1FA16669D | 3725A81A5 |

TABLE 11-continued n = 0: (Segment 0)

| q | blk | | | | | | | |
|---|---|---|---|---|---|---|---|---|
| | A | B | C | D | E | F | G | H |
| 93 | 3C9C7404A | 092B77FEB | 3B9865B46 | 349456F61 | 39B7C6A66 | 3075EC990 | 01BE637DF | 330897B17 |
| 94 | 1CA4C048D | 2B4D50621 | 2BF917627 | 3EA2CC5E1 | 33EC0A1E3 | 05FE0F747 | 349553D72 | 396077301 |
| 95 | 04CEC1C82 | 1F828DD00 | 30122C790 | 1AD8A7895 | 1CE0912C0 | 298382F37 | 2D4D33F06 | 001364B36 |
| 96 | 37F8BB035 | 2F0897994 | 333F5F096 | 0F28AB363 | 20036829F | 338017E2D | 3A5A05D76 | 0CC02E5E0 |
| 97 | 02FD351E6 | 03E316288 | 2FCAEB4F8 | 1C5A80CE3 | 3D3AC3FDD | 3E456746D | 119A5381F | 1581C894E |
| 98 | 1623B3D0F | 103224DB0 | 0FB936BC8 | 2EED7F082 | 26C91513A | 2F12E4C31 | 290F3AEF2 | 392CBFF67 |
| 99 | 02F75DE8F | 2E61A834D | 02A692866 | 1F21044A3 | 2D7881A95 | 18651EE05 | 11FE3D308 | 39EED56DA |
| 100 | 3A858659E | 2F7A87BE0 | 135FD561D | 27B3B651A | 05E131CB9 | 0D5865123 | 2CD6991E5 | 3EE6DF705 |
| 101 | 3F3B247E1 | 32D02B245 | 16B98A593 | 1E4CCFF18 | 0C4A9D285 | 06D519FE2 | 023A336CD | 1B20E999E |
| 102 | 3A9E8B49B | 239656AD1 | 3396D1C51 | 06F4DCF40 | 15D819D3F | 2A3061144 | 20BD2A33E | 2FFB139CD |
| 103 | 38622F3AF | 24BF9BB7F | 1D2729010 | 15877B93A | 00376BD2F | 0FF064887 | 3505CFD9B | 354C366B6 |
| 104 | 2A0AB7033 | 1AFA65DE1 | 1198D0AD6 | 38E80C86A | 2769BD541 | 3BB26F3D4 | 39154881C | 0E7DD6B6B |
| 105 | 1B0DE4333 | 27FE0F6D1 | 0F00B2888 | 0BDA322FF | 2759B5A4F | 0543A2D27 | 0C36DD1E5 | 04E9A262D |
| 106 | 1C7E636BF | 000E9C271 | 2B44F4F30 | 28255BF77 | 1CC4D69CE | 03F4C57B2 | 3E926D59B | 00AA39BDB |
| 107 | 1FDE98AE0 | 0CD076B07 | 171124FB5 | 33F098288 | 1E0B3043E | 39731D117 | 3E7ABC2C8 | 19CC50279 |
| 108 | 28EE855ED | 2A704C371 | 03288F4B0 | 3C83E26C2 | 0A905148B | 18C66BB94 | 1BCC32537 | 10D71AB44 |
| 109 | 26238A065 | 0FBD7BCDD | 02507CF76 | 059F69484 | 3FE0D6F77 | 2466A50DB | 3C07A75B2 | 2DC0F099E |
| 110 | 3CDCD6CBE | 1446783DA | 1626C83F9 | 2FD4C4DF3 | 13A59A2D1 | 2C903D2A3 | 0FD37F076 | 0B1039EDD |
| 111 | 043B07DD7 | 28D9C2155 | 2CCEF57A8 | 34254C1B7 | 09B933B2F | 1FA410127 | 10BD5E9E6 | 010EC6389 |
| 112 | 345E8FCAC | 226BD7EFA | 27341A51C | 23854F031 | 04C297212 | 044DED8E8 | 319B3BFB8 | 37DBBBF57 |
| 113 | 16FBEFA72 | 1B5EF9484 | 2DEE7A5BF | 097695C12 | 08AEAD5E8 | 3DA7C1327 | 2B81F3E2D | 31AFBED32 |
| 114 | 3484086B1 | 2DFA56B9E | 226E8AFE5 | 285F45484 | 3E69AC8E1 | 1CB33645F | 2DE53BC30 | 2F6ED567E |
| 115 | 1117B5E7D | 122A4D471 | 1AC936544 | 267010D71 | 10428CA47 | 24B72A000 | 2E27FE185 | 1E62C1403 |
| 116 | 0B3161E37 | 038C3DC98 | 100793647 | 1A95D8D36 | 399668787 | 06C0D4922 | 25F48AA58 | 2DFFF1789 |
| 117 | 04FEF7231 | 381910B63 | 298783078 | 30CE5EC1C | 29F6F299D | 3C34CA770 | 37BAAB139 | 3D2069B65 |
| 118 | 18F644052 | 2051880EC | 23ADBF949 | 04237280A | 18304E663 | 287364EFF | 314698D78 | 149A21E51 |
| 119 | 39E14BBCB | 1DBDA9EF4 | 3ECCAD8D3 | 1BA3EF99D | 26D85CEBF | 270547292 | 0FB3C7826 | 0131E73D6 |
| 120 | 2DD6F3F93 | 0FC282088 | 14A143DDD | 0AB840813 | 0B973037C | 29535C9AB | 0DF8DA2AC | 271CBC095 |
| 121 | 1C1D063F9 | 3F4EF6DCC | 00128D932 | 145E31F97 | 0B21590D1 | 38F1602D8 | 3AC2EBB74 | 2320957C5 |
| 122 | 3383C846F | 12128F29B | 19985CE7D | 2834CBBF2 | 1E1513B3D | 364DB5800 | 33EE3F46C | 01A865277 |
| 123 | 0129D260B | 238A85BA0 | 2D81AA924 | 3917048B6 | 36F857692 | 1D2F813C3 | 0505FB48B | 3DC438BC5 |
| 124 | 05E0F8BDC | 3D978C1F1 | 266F83FCA | 0E89D715A | 01821DEA4 | 12D9AE517 | 22F8EAC2C | 3C098DA58 |
| 125 | 1575D1CE9 | 26F291851 | 3A7BB6D2C | 12CC21A3A | 2975589B0 | 39CF607FF | 388ABF183 | 3D3BAAB0B |
| 126 | 101E5EC7A | 0B75BCF3B | 13ED25A86 | 35FC032B6 | 2F6209FF0 | 13C7B2041 | 1F2791466 | 3A759A6C2 |
| 127 | 1EF89091A | 11A653D2C | 223FC1F42 | 2F7B97B31 | 2CA4EE011 | 00F68767D | 10FE34682 | 018339212 |

TABLE 12 n = 1 (Segment 1):

| q | blk | | | | | | | |
|---|---|---|---|---|---|---|---|---|
| | A | B | C | D | E | F | G | H |
| 0 | 20A601017 | 10D0A84DE | 0A8C74995 | 07B9C4C42 | 23DB99BF9 | 12114A3F5 | 25341EDB0 | 362D37C00 |
| 1 | 1364F32EC | 0C4648173 | 08C12DA0C | 19BD8D33A | 3F5F0DDA6 | 24F99C596 | 026976120 | 3B40418C7 |
| 2 | 1C6548078 | 0A0D98F3C | 0AC496588 | 38CBF2572 | 22D7DA300 | 1CCEAF135 | 356CA0CCF | 093983370 |
| 3 | 03A8E3621 | 2D2042AF5 | 2AB5CC93B | 05A0B2E2E | 0B603C09E | 117AC5C94 | 2D9DEA5A0 | 0BDFF0D89 |
| 4 | 07C4F8A63 | 3E6F78118 | 32CCD25F2 | 1792A7B61 | 0A8659788 | 1F9708C04 | 086AF6E64 | 040B9CD78 |
| 5 | 2D7EE485A | 2C3347A25 | 3B98E86AF | 242706DC3 | 1CEF639AF | 2E1B0D6A9 | 3E9F78BC1 | 0FB31275F |
| 6 | 0307936D0 | 21CE15F03 | 392655B2D | 17BE2DE53 | 3718F9AB8 | 01A986D24 | 077BDA4EB | 1D670A3A6 |
| 7 | 05A10F7B7 | 31900ACE0 | 28DCA8010 | 2D927ABE5 | 370B33E05 | 31E57BCBE | 030DC5FE1 | 093FDB77B |
| 8 | 092C4FED1 | 268BF6E42 | 24576811F | 09F2DAA7F | 24EFFC8B1 | 21C205A90 | 1E7A58A84 | 048C453EB |
| 9 | 29F162A99 | 1F739A8BF | 09F684599 | 1BEC37264 | 38ED51986 | 286325300 | 344FC460A | 3907B1161 |
| 10 | 0E4616304 | 0FABDCD08 | 0F6D6BE23 | 1B0E7FEDD | 0047DE6C2 | 36742C0C6 | 2D7ABB967 | 10D5481DF |
| 11 | 32DD51790 | 237D6ACFA | 2F691197A | 16724EA58 | 149143636 | 3810C6EE1 | 3A78B3FC6 | 1B1259333 |
| 12 | 1BB0FD4D3 | 235F10A55 | 1C7302A27 | 1148B18E5 | 04F25FBC8 | 2A0A8830C | 3646DBE59 | 2F25F8C30 |
| 13 | 0FB38C45B | 069DF29E9 | 00F93771B | 3AA35746D | 2CAF48FD0 | 0A42CDD55 | 19A23CE8F | 26318A30F |
| 14 | 365FBEDAC | 27710945F | 2AA367D61 | 05A64318 | 2563F27D9 | 2D37D5C00 | 287D18FBB | 3ADB44805 |
| 15 | 3038BC77D | 2A45D29EC | 156173792 | 03EC7679E | 07577E1A4 | 1B6A94A74 | 1D26E5A94 | 0FD878D5A |
| 16 | 1F22158E4 | 3F02A1D37 | 2767EC03F | 1C8CD535A | 23DA2E5AB | 2D5F25A59 | 0971AA889 | 3E78C1846 |
| 17 | 16521E709 | 12C2DB8FE | 3A596C221 | 1562D5C27 | 1D9E1F39A | 345B96872 | 301C7894E | 2797F032D |
| 18 | 2EC951A24 | 1ED768F3F | 11217930A | 39DB44855 | 36E41B3FC | 0F6E48C44 | 36254C517 | 14493C673 |
| 19 | 3EA159E72 | 24ADE96FE | 3458C73A6 | 30674E1FB | 242109AF2 | 24DAF32B6 | 24B1EDFFE | 291CB9D15 |
| 20 | 2AD0E6696 | 04F4077D9 | 1BB279A53 | 38957605B | 379B7A6A0 | 0BAD35616 | 1285EAE51 | 37425C7FF |
| 21 | 083637980 | 34F2ED66F | 282846A88 | 19D5E40A6 | 21205942C | 27AC551E9 | 0F3F4C262 | 0505FB522 |
| 22 | 3E7D64856 | 1DB0E599E | 159120A4B | 1FC788139 | 235C454FB | 3CE5B67C8 | 339EADB32 | 0F9F7DDC1 |
| 23 | 3956371B8 | 1D67BE6E5 | 1EFCF7D53 | 041A5C363 | 2E281EB3F | 00AF8A1ED | 2DE24A56F | 1332C0793 |
| 24 | 0818C47A9 | 1F945634B | 1C5ED3403 | 1043B5BF4 | 149702D22 | 024CBB687 | 34B01FA8B | 1E9F5992F |
| 25 | 3A6618167 | 3A0007886 | 3EDB5756B | 2F2FA6FCD | 21A5252B8 | 396FFAD9D | 05347B60C | 2E0ECA200 |
| 26 | 0D45F89A1 | 3F9C2C26E | 1CBCF809E | 3CBE5FCD0 | 3D2DCF245 | 14F351A1E | 224F5B3FF | 2AA6ED34B |

TABLE 12-continued n = 1 (Segment 1):

| q | A | B | C | D | E | F | G | H |
|---|---|---|---|---|---|---|---|---|
| 27 | 3BA85ADF8 | 282005732 | 3AD7C0223 | 2E73D1800 | 23DEA3F46 | 2275280F6 | 1586270F9 | 0CEF4287B |
| 28 | 07DFE662E | 314B74F2F | 397BDDC4C | 223A8071F | 1F5BE3BB4 | 093BB1F33 | 0FCA2D129 | 21B3526A9 |
| 29 | 39FEADC12 | 0ECE1CD67 | 206228FAA | 38FCCA606 | 0C5EEE08F | 1C1BBDD4E | 1459E42ED | 11FD64ADF |
| 30 | 2735FFB20 | 2AE9B244A | 1A5AED974 | 38FCFD5CB | 20310DB81 | 1C5FC3E24 | 19FB3BA17 | 3785BE865 |
| 31 | 24FF6B7EC | 01C682673 | 19CB14113 | 2C8CD3C2A | 066725853 | 02CD0A23B | 279B54315 | 0CD571063 |
| 32 | 015E28584 | 30B497250 | 127E9B2E1 | 2C675E959 | 05F442DEE | 394AEF6E2 | 079E5C840 | 12703D619 |
| 33 | 3CE4B1266 | 35270B10F | 03549C4B3 | 3B3E6C375 | 1DBEF270E | 0042C9737 | 049522EC6 | 24961653E |
| 34 | 34176CD90 | 2B5E9EAE1 | 1C95E3C2B | 1EF541D4D | 26D1450E6 | 3B9D895AB | 1B0C84349 | 104B6B428 |
| 35 | 07A813421 | 2B39EAADC | 33553571C | 0F8046CDF | 2CF6A7F23 | 0AE3BE8C8 | 308BFF531 | 2DBC0F9E3 |
| 36 | 168276972 | 2CF41744F | 3CF2512E0 | 0F8B68ABC | 2E609F6AF | 04E03AC8C | 0F9B66F49 | 3AFE28736 |
| 37 | 03456021F | 1982574F3 | 0BB2B3F49 | 15A4A1CDE | 15487D58E | 2907C9ABB | 15C0D2D73 | 28D8CFEC3 |
| 38 | 3D3FD677C | 33AF2628F | 3D217FDCF | 30027E85F | 0A463F23B | 2F2AE8324 | 1D1E945E0 | 2EB355D28 |
| 39 | 3BCAF9076 | 3A7D2FF70 | 3C541F38B | 249BD8A94 | 287BC4833 | 141391EB7 | 05B6443D0 | 2FEACC5E7 |
| 40 | 275F118FA | 3A96B346D | 0C713CDE5 | 02F394A28 | 3EBB1D18D | 1BE7A9FDD | 223C53CA1 | 2BF040F77 |
| 41 | 1161DE4F5 | 0544F9DB7 | 230847E45 | 322AF4E17 | 26944A0B4 | 3299F1420 | 1C9405B8E | 2DBABD4CE |
| 42 | 33165C531 | 268FE9B9B | 081A914B4 | 39100772B | 27DBF03E9 | 3E3A18AB0 | 13F2D2B83 | 2CEEE5FF4 |
| 43 | 275F97006 | 0A578F2EF | 16CEE7EC8 | 38A5B0084 | 00DC9A1F5 | 1B88CFA3D | 0D8B0B8EF | 29FC4CCF2 |
| 44 | 04BBE4F2C | 1546C3988 | 237105A43 | 339042B36 | 3A5DEBE2B | 1BD09449D | 38EFF588B | 1CDD3A6C0 |
| 45 | 002E32D38 | 1E85D3125 | 3F51120D7 | 00420ED63 | 3384713AF | 1D941BD34 | 2B39EA9CF | 05B6D9E94 |
| 46 | 2B3100F7B | 335EDB2E6 | 1AC8C8EE4 | 337FF7139 | 0672D7995 | 38A54856E | 0124753F2 | 3A3560851 |
| 47 | 046207CE9 | 0FE1BC312 | 09BA5B289 | 39376EF2B | 33F826C2C | 2F6531496 | 3933B8616 | 23125B50F |
| 48 | 3E5849C45 | 01EEDB390 | 141D9A024 | 2DE07E565 | 1813D12BB | 36DB8D404 | 0E8A272AB | 3A66B71AD |
| 49 | 1A2A88A4C | 3F0C9B4DB | 266CFBDF9 | 163420CA5 | 281ABBE99 | 34771C295 | 3AC051848 | 3C53CB875 |
| 50 | 16F795184 | 3466F1FFA | 1F433B456 | 1DDF13810 | 25F58CF69 | 1DD6CFE4E | 10A236FDF | 12AE697ED |
| 51 | 1C8D17F4F | 07C43B7D1 | 1C8DAD395 | 28F6C112E | 3A336ADB3 | 0EB6889AB | 2783A6A1F | 2CDA40458 |
| 52 | 16044624E | 252AA04B2 | 11484E85C | 07F5024B7 | 286E3A67F | 2EE6BACE4 | 277F1F864 | 22F3CF57D |
| 53 | 2D1A3F4CF | 0EEB6DEC1 | 30CD76F42 | 20403D1AC | 3A72EF9D6 | 1DAAF2A39 | 03AB76CE0 | 0A2856267 |
| 54 | 0FA2A786B | 38273EDF2 | 228A45016 | 0309DF52D | 093BDAEDC | 1B11E9300 | 1DA9C5324 | 03365EB1E |
| 55 | 24DCFDC06 | 11CF909D6 | 2FF693F4C | 366338F1F | 22E641569 | 0ACA60D55 | 32D1B009E | 035472E09 |
| 56 | 17F5D6662 | 062FCF913 | 35B211035 | 21ACE73FB | 3B4148706 | 2D0CD106F | 2CAB457A4 | 103E1E49B |
| 57 | 21859E8DA | 2F1E3B3D9 | 1F1014BF2 | 062A3DEB5 | 354C0C786 | 05A8982D4 | 35A758943 | 346EBA72A |
| 58 | 00CB49E5F | 211B1034A | 3A5D2DAF1 | 21D3F3EB0 | 24B2D1150 | 1097C3685 | 2AA3671CE | 0E5DC1308 |
| 59 | 24C8401BE | 217B1F994 | 1FB9664A8 | 3D5057708 | 05A506088 | 1314842B9 | 3C8657064 | 14B1FA77F |
| 60 | 2AD698E2E | 3C129D1F6 | 2C744FF4E | 1C1C052F8 | 18C38A9FE | 252168A10 | 2EB68D098 | 3A001CBD2 |
| 61 | 2AF71324C | 2BF41D408 | 0FC498E18 | 149A1A407 | 0FDC2C4A3 | 19D00C4A1 | 0F6B0DD29 | 268CF8E86 |
| 62 | 19F4D82A5 | 342C73FD5 | 0F5AEEDE7 | 21A2A8953 | 15ADB7A49 | 11DBE038D | 0A5B6634A | 0FA382B77 |
| 63 | 0A5985778 | 35AC3032D | 35691C85D | 2829D55EE | 04A3FBD8C | 2C85BFA8E | 0F459B864 | 3E878F0BC |
| 64 | 10C785EB0 | 054D4CE18 | 1BF657A8E | 101DC64EF | 0B4E3032A | 24ECFD9C2 | 00C98BE0A | 2A1F82444 |
| 65 | 300E8B09C | 31A079FB3 | 0C41DEC5F | 216CCFE4D | 226C5A693 | 3C31A41DD | 3A019974C | 23B64EAFC |
| 66 | 249BDC80F | 0316ED79E | 1E42B5567 | 0CFF04A4B | 310678543 | 34D986980 | 1E3195429 | 280966E65 |
| 67 | 359A72B64 | 186A3999D | 065825DDF | 2D28E6000 | 10964C1E1 | 1468C970E | 34C8B606A | 33CC94DB1 |
| 68 | 370B29C05 | 12841A9E8 | 2147E7160 | 1835345EE | 06DB43F37 | 33854A725 | 065E6614C | 151E2D7B1 |
| 69 | 0EAADDB27 | 004EC6DDD | 30AA39B8B | 2AEB34AD4 | 2A13D6649 | 00EC67B83 | 1176417CE | 0E3683151 |
| 70 | 0832BA87B | 1B67515B9 | 0FD3BA781 | 1688F83CB | 370B52AD5 | 3A2CD6F3F | 3BD748546 | 37BD48546 |
| 71 | 16EA2751C | 1799D9C42 | 24055CEC9 | 226A907D4 | 133C68F80 | 22CA03BF0 | 05F723395 | 2D35008AF |
| 72 | 122A5C67D | 3E46230BC | 09F475BA9 | 15B4B6754 | 11DE75C50 | 28C17544F | 1D85FAB8D | 0D5AD9537 |
| 73 | 1C5497CD9 | 3D405F487 | 05535D737 | 06952087B | 1C4744AF4 | 3E0EF881C | 3CED3D1BB | 1D91157CE |
| 74 | 1D276153D | 14604EA77 | 1661FB979 | 3BAC5E9FB | 089F41406 | 283154122 | 2AFDCE892 | 1FD5E0810 |
| 75 | 2A620F4C2 | 0DE484180 | 2D05E6458 | 3E6D15A27 | 0A92FF0B7 | 2CBF7BF53 | 25A2F28FA | 19A10CE02 |
| 76 | 3A77B1FBE | 2B262F810 | 2BEEA0F46 | 39706BBA2 | 09257163F | 1026D5D74 | 2E2483EBF | 1D6527C1E |
| 77 | 0DC1EBA02 | 383C59C77 | 28C7ED115 | 06FED31D4 | 16F610DC3 | 000890B82 | 2FAD16A3A | 35C9AD95F |
| 78 | 3E5C1EBE2 | 3C65A7691 | 2394005B6 | 251B1BB49 | 1F42BFA23 | 0E8608C07 | 24666F55C | 11A5214DF |
| 79 | 323E882C5 | 2DBFF5E13 | 3638BC43F | 38CC5CBB5 | 1DBF783FB | 0499418C7 | 2285E5A40 | 1A61D17E7 |
| 80 | 1E508F19D | 0CF345F97 | 0E5648601 | 0A0951DF3 | 1194EE717 | 0A6C0B374 | 03C4E19EC | 06F725799 |
| 81 | 0B54F4AEF | 186A12343 | 04C4A60C6 | 27C2CC0E9 | 3973075A1 | 392C5EEB7 | 3933C99B1 | 005F98CB2 |
| 82 | 021B6635A | 3764D0696 | 20942B266 | 0155C4EDD | 3FDBF7497 | 37356D442 | 374F3DB06 | 2718357FE |
| 83 | 120DF6F80 | 0E41F376A | 03544C7B2 | 2D6795EFD | 29E8811F1 | 1B3EFD388 | 01CA4C48D | 2067E8033 |
| 84 | 07703D649 | 35221AB50 | 22141A0D7 | 268061A59 | 2D9192B05 | 3834711FF | 3A07258C0 | 36253B5AA |
| 85 | 1C4A564C1 | 26804247A | 16A4DB29D | 0BEF93C88 | 37A3EAB6C | 25547B136 | 3FC935878 | 250E3BF1C |
| 86 | 17049BB43 | 0D6426761 | 2BF3A471E | 1665820E9 | 14412A13D | 30D5744B0 | 2ECE5CAE6 | 01395189C |
| 87 | 29615B890 | 0A2C5A664 | 216DA64F4 | 3D4AA9D2C | 07B98342C | 2603F0D76 | 0574BDFA8 | 3F9B35D5D |
| 88 | 3A0414B22 | 0A8BE885E | 155C220E4 | 2D3B17AA6 | 3017E1B48 | 26508C6C8 | 3FF25EC63 | 240EFF072 |
| 89 | 2ACD81CE3 | 0468D7943 | 2A4108121 | 1F2E8E67F | 3AB446179 | 33325CA24 | 3006DD3A5 | 1A33F3A2C |
| 90 | 2B038BAF7 | 070660C4E | 30953C7B7 | 3E7375D04 | 1D6A39944 | 001BE5C8D | 199A89253 | 0A82087BB |
| 91 | 03BF7C836 | 2CBFF7C48 | 38EAB1C98 | 11C303993 | 3D748807F | 1EBD41D17 | 351085EF2 | 1C55B94D3 |
| 92 | 116E0BE61 | 17BC8C403 | 31BD1EAA2 | 1CF87C049 | 2A41CC04D | 3883EFEC1 | 3971BBBE2 | 190CAE3B7 |
| 93 | 172799BB5 | 3301DB193 | 2480B569B | 34DBEFE9C | 003287827 | 38DAEA1CB | 0B0E25BB4 | 1972B37E3 |
| 94 | 3EF1F9EF4 | 189D8C3E0 | 1941998D3 | 259838BC9 | 28E545988 | 33BFC60D8 | 3572B10F3 | 197913B6B |
| 95 | 24CF96D66 | 285347801 | 22BC70E5E | 394231BCC | 077583F4E | 0364420AF | 278FBF5CB | 3850AFC8B |
| 96 | 1B38C4A50 | 04439E0B5 | 3A7BEB18B | 3003A36CD | 329D5A2B6 | 1BB123AFA | 049C2CC94 | 0F604D1DC |
| 97 | 28D47EF33 | 24CF66B6B | 24B716FA9 | 34ED7F6BB | 186AE44B4 | 1380D0726 | 1CC51324E | 16BA74F62 |
| 98 | 04422E60A | 3424BA16C | 3FFB39DD | 1A1E658F7 | 33457317D | 14E822151 | 3EC02F279 | 28593D11D |
| 99 | 0F2DF0912 | 21BBFA838 | 32D634EBF | 2061148FD | 09A565B74 | 2BCE430B7 | 34DAAD9FA | 228ADAFE5 |
| 100 | 2D7EE0544 | 25D57B7CA | 0FADAF20D | 19B4F6444 | 3A75DF1C1 | 0AD3EDD56 | 0A4D61EEA | 28C1262A5 |

TABLE 12-continued n = 1 (Segment 1):

blk

| q | A | B | C | D | E | F | G | H |
|---|---|---|---|---|---|---|---|---|
| 101 | 1B6AEE253 | 0BFE02772 | 24AB19547 | 186A377A5 | 03089B4E8 | 128955F60 | 3A8DA9AC8 | 2931648B3 |
| 102 | 21BE0200F | 00F34B4F5 | 34FF3261B | 1A0E27AED | 0A821AEFB | 21B0BA404 | 1C6A644A4 | 1734EBB33 |
| 103 | 201FBFD73 | 0592E9D86 | 053D87C9D | 3CAFC7479 | 22F1BA3FA | 3DB25DD15 | 31D468990 | 22FF2B539 |
| 104 | 06C77404E | 18AE64252 | 3963D899A | 37179C03C | 0FD2E3D04 | 191E64DBB | 380B841FB | 368E1DEAA |
| 105 | 3A561759B | 156243DE8 | 04325D217 | 33993D0B0 | 0CEAC2109 | 002242D1B | 33C1D9F5E | 1EC4195D3 |
| 106 | 17D7A9B74 | 1F44ABA75 | 17B572FE3 | 096008B9B | 1F1E00AAE | 05489F7A1 | 17A4C131D | 1C018E923 |
| 107 | 0A4ACCEC8 | 1F294A30D | 19CAEE64E | 002787A1B | 03EB3238D | 27C10F626 | 1C9E656A0 | 3F73609F0 |
| 108 | 1E0E3C802 | 1B52D12AA | 2F4E003B7 | 23BA7A6F1 | 3CAA0998A | 32E96C916 | 168EFA1EE | 28147EE33 |
| 109 | 1CEC9799E | 215D9302B | 176BB6639 | 003D5E371 | 12FE4ADB3 | 3106B64E2 | 001D9C28E | 0F39059DC |
| 110 | 31570792D | 2260D7FEF | 1AC830374 | 118FE7C78 | 08F982159 | 23BB2B13A | 2C7944305 | 376396F3C |
| 111 | 2D340540B | 272E94D06 | 097C70995 | 0E70DDADA | 1DBD644E5 | 341A72A58 | 01CBF5334 | 2C7999AF9 |
| 112 | 3FF17764D | 0701DFAD3 | 146BDBB97 | 229D2D7F0 | 03C5DA21D | 3A5916EC7 | 2390AC01D | 197D64233 |
| 113 | 3E9759D5A | 00B237425 | 0B7E646B9 | 190CB4D16 | 2646AA1D4 | 1A373103D | 337E5EFB1 | 0199DE4A1 |
| 114 | 3FD5ADE8A | 26B843860 | 0A2D0AA7B | 3C351E07F | 1B25376AE | 05C553CDD | 1DBC3F38D | 019823A2A |
| 115 | 30FF187B4 | 112F9D7A1 | 1AE977517 | 3760AF555 | 004F86368 | 3700975C2 | 0518029DE | 032427D9B |
| 116 | 3A86D49BB | 057E649D8 | 2FDE33D7E | 31254217C | 30E05CE12 | 10BCC1CD7 | 1889C5139 | 38A163ECF |
| 117 | 2610F5174 | 02A7ACB27 | 208B84FF0 | 14609CA80 | 0F3526318 | 38EBC7384 | 287C57BAA | 279661A9C |
| 118 | 014F6D77B | 1036B3D2C | 294F1999A | 33A059187 | 26CCE0507 | 180DF3129 | 00A6CAE22 | 2AC0F23A2 |
| 119 | 347C62997 | 1912A710D | 2260C531F | 2F54BBEBB | 0A2D90305 | 1BBEE20E4 | 0AF79997E | 2376F3D0F |
| 120 | 04484EB82 | 181977944 | 1C1CC2693 | 227ECAB0F | 23F32982B | 19E2F290C | 1BA2300F8 | 0EFB06247 |
| 121 | 0EC048AD8 | 3B2168495 | 34FC02DA1 | 2C0CDEF52 | 0553CA222 | 25DFA4581 | 29CF66B6B | 0AB9C21CD |
| 122 | 2AF502148 | 3B00632F9 | 387CDC4BF | 3F8B9F716 | 19084CD65 | 0354918C7 | 39D1FD9AA | 0F5ABDB77 |
| 123 | 2C6E2557A | 3E8A19D6B | 3E6756A28 | 237E6E5BF | 24CA57004 | 1D52401AD | 0237F1D80 | 0FB2B335D |
| 124 | 228F4B540 | 07532BF5D | 101F67F52 | 29D8598EE | 0421A0E23 | 2D89C2AFF | 0963D2F3B | 24C472A63 |
| 125 | 0CF3598E8 | 196A40BD2 | 00E63B26D | 088A0BFCA | 1C78E9016 | 03835236C | 33071A836 | 3949DC586 |
| 126 | 3E815D747 | 1588D4E96 | 073C8D44A | 303281AE4 | 095D31EC8 | 1F10F69DC | 200F057D8 | 1F270128F |
| 127 | 34F9ACB6B | 384870FF1 | 257A863DE | 34B36BA0F | 3FA3D216B | 27425041B | 0E0DD0BAD | 2E95AD35D |

TABEL 13 n = 2 (Segment 2):

blk

| q | A | B | C | D | E | F | G | H |
|---|---|---|---|---|---|---|---|---|
| 0 | 13F99E8EC | 3CF776C2A | 3300A482C | 0B2BF4791 | 17BECDFE8 | 35998C6D4 | 05F8CB75C | 259B90F0B |
| 1 | 116913829 | 05188F2A4 | 2DB0A8D00 | 2F770FE4A | 185BE5E33 | 0F039A076 | 212F3F82C | 116635F29 |
| 2 | 004EE1EC6 | 18EF4FDD9 | 26C80900E | 1A63FB8A7 | 1DAA917D4 | 0E6716114 | 02690646D | 0CC94AD36 |
| 3 | 06D4FF377 | 2716E8A54 | 16A1720C8 | 08750246F | 393045CCB | 1DBCCDE43 | 114A0CAD6 | 181690377 |
| 4 | 3DC4EF347 | 1F53452FC | 01584B5D3 | 11D96034F | 1FA62568A | 11974FACA | 191BE154D | 397C9D440 |
| 5 | 05A1B6650 | 29835ADAD | 2F6DDABE4 | 0976A607B | 11BA92926 | 2456B1943 | 3E3FD608B | 095E7584B |
| 6 | 00CC66282 | 0560BE767 | 21EBAA7C6 | 2D8E9ACE3 | 198A9E285 | 05F3E73DD | 13DA751A2 | 176B75E43 |
| 7 | 03D08ADC1 | 2254606FC | 3C695D892 | 1DA9E0280 | 2CD4FF589 | 19B78A5A4 | 0CE67A7C6 | 12535A61C |
| 8 | 0984647CF | 0822BA46B | 3EB2BC076 | 212596F54 | 11CC2E64E | 120BADF9F | 0DA72CEDE | 30D0E106F |
| 9 | 083CE5726 | 1F05DA925 | 169D93EF6 | 1FCADF3D3 | 08A5CF0BC | 317C8508F | 19BDCCFE7 | 0FACE3631 |
| 10 | 27583A466 | 1CB1634D5 | 03C7849F7 | 38C6CED00 | 1161C173A | 15A645D3E | 281A7ED92 | 076ADA797 |
| 11 | 33BA1AE8F | 187F578EE | 32473D69A | 2458B703B | 267E59071 | 0F317883B | 3E7DEDBF1 | 3B9859BA7 |
| 12 | 0322609A3 | 20C4C957C | 3FD638746 | 3FB716D79 | 36BD0CF1C | 333B11B8F | 0027ED1F2 | 3E7471BF3 |
| 13 | 3529922B1 | 0ECECBE04 | 1980B9B9E | 38D60363F | 18904BCED | 108E3E5F1 | 34B95C446 | 338F51DAC |
| 14 | 21FD50527 | 0EA2F7A31 | 1E294A159 | 114734A02 | 120B90BF3 | 3F3617C92 | 0129071E2 | 106640936 |
| 15 | 2B59354BB | 275BF9761 | 39C6FF332 | 2004B3902 | 053F9DCB0 | 19D79A902 | 2B3125038 | 20649B43E |
| 16 | 03A8A7A2B | 091AE6721 | 18651FD9E | 1F5415ECD | 1B38EA62E | 07FB0F422 | 3EB58896B | 077FE4C7C |
| 17 | 06A13CB38 | 340099B18 | 2AE6D6385 | 1669631F9 | 28E51A676 | 19A023391 | 261855F39 | 3E518F0BC |
| 18 | 2A88F831B | 09D295831 | 294C468DF | 1477F0A13 | 37725C6EB | 00E7DB222 | 27D610157 | 349A8FAB6 |
| 19 | 163E1C44D | 3F98B6F4A | 1805538DD | 01EE3DB4A | 22AA1797E | 27568753E | 16090F219 | 2C9838C01 |
| 20 | 34B0543DC | 121B8EA82 | 00873B4A0 | 220FE7C05 | 2EDBEAE34 | 1104BDB93 | 0711E8C0E | 0E1C107BD |
| 21 | 226183AFF | 15643DE71 | 04A4CDCEB | 2E67FDF8A | 26D2AD640 | 25E7695F1 | 1A99778F5 | 20FE0C1A3 |
| 22 | 0F7EAC09D | 12BB72B2A | 182E44301 | 2962EB85A | 3477C1B69 | 3E3CF56F7 | 29C9D00C6 | 39788600C |
| 23 | 31084BEB5 | 1DC90E345 | 391736CC1 | 3C8292AE1 | 38A0D515C | 3977012F6 | 25D1F6055 | 36A7D3F8B |
| 24 | 229D3ABAC | 1044BA05F | 0C391B88A | 0636A90A6 | 0B14322AB | 21ADC33E4 | 2DC1A3BFE | 0D7FF6D1F |
| 25 | 33C85B393 | 37BFA31B6 | 134F872F0 | 0C5EA36E1 | 286956ED1 | 1632092FA | 382B4BB10 | 23DC3EF14 |
| 26 | 38E8B9BF6 | 0A0CE666B | 207D98054 | 23FF360AD | 121BFDA4E | 347D442FD | 242922C07 | 23C6E4115 |
| 27 | 263EA8516 | 36138BD6A | 0ED9C55E7 | 3F0937876 | 03232BC24 | 18E5FFF26 | 3530CF206 | 3981B7414 |
| 28 | 1D9AC2E79 | 051B220E9 | 3F3B09EC8 | 0D3F6C366 | 0201A7CB9 | 3D5477092 | 22185FF9F | 1C5AA5348 |
| 29 | 208D85694 | 22104E7C5 | 14BCFD3DD | 3592DF665 | 1F4EC3265 | 24358076A | 2D20A8000 | 017F2D489 |
| 30 | 36B3A9A2C | 3F8E0F162 | 13ACDCCF2 | 16951F727 | 271E73555 | 1B3EDCDE7 | 162B45352 | 1CAFA635A |
| 31 | 2D30FE705 | 3EC9BFC8D | 1B10F8349 | 34F973F31 | 1CA96A349 | 1A28B4543 | 1C5367CE6 | 2DFAB0AE7 |
| 32 | 21D93EB5A | 0E49D6211 | 3C6FCF774 | 09F44CACF | 2D8CD2BEA | 037DDAD3D | 3BBD06D1D | 39CBB996F |
| 33 | 159B1F948 | 0183E8DCD | 3A484866C | 21F8DF1A5 | 219A58193 | 2D1B3C399 | 2275F19BA | 0EFF4C612 |
| 34 | 22EB93A82 | 15047E272 | 15428D77B | 38FFC612E | 20609BE54 | 3226C8254 | 3E5568DB2 | 159284EED |

TABEL 13-continued n = 2 (Segment 2):

| | | | | blk | | | | |
|---|---|---|---|---|---|---|---|---|
| q | A | B | C | D | E | F | G | H |
| 35 | 34529707C | 2E84585F4 | 20DFFB4C5 | 28288AA00 | 10EFC1E07 | 3C4D211FC | 379087C3F | 25716A7DD |
| 36 | 20106354F | 22AEB9FD7 | 3A6BAC67D | 3126294C6 | 0FBC874AC | 2DFE5675A | 391B1DDAA | 06BAA74D8 |
| 37 | 348F831C5 | 2E44BF3C2 | 3D9F6F454 | 20746A30E | 08D183029 | 35C6BFEA7 | 2729B552B | 263BB2EBD |
| 38 | 202D7F08F | 0DBE1C144 | 132F4EC09 | 184CD9B93 | 2596F5884 | 2A55B8217 | 2BEAE02D8 | 235A19A43 |
| 39 | 2DDE3FF5F | 23932555C | 001ED92D7 | 22FCD3D60 | 2C0737593 | 0B27E62FF | 0693CFBDC | 284D5B33F |
| 40 | 1DB9AB8E9 | 2995EE0A1 | 1ACFE9892 | 0D41BCB9D | 2E3806507 | 25CCD5D60 | 3536DF04C | 0BB0A5E3B |
| 41 | 3FFD4DD82 | 3E69CC1C1 | 2BC30FB74 | 3462F70FC | 164FAE762 | 09B83F8AD | 1DF593F3C | 2DB478034 |
| 42 | 16E24E9B6 | 0A9FCFBD2 | 3A018544C | 1ED8E2855 | 0037681E4 | 05950E1F8 | 1107DA097 | 377A25C65 |
| 43 | 03C9318B8 | 0C70A7749 | 0D58708C2 | 0CA2808C4 | 219E02554 | 39315B2F2 | 2E089B00F | 302E135C7 |
| 44 | 04DC211E8 | 1DD20A505 | 21A50649F | 2CA438C04 | 39CAD66AE | 2E1BD969F | 002748760 | 069924211 |
| 45 | 2E84BCF09 | 226F5D43C | 37BE7EB10 | 07CDC854A | 06FB50D48 | 08966435B | 01BA5E5D2 | 1D34057FA |
| 46 | 2D8DFD565 | 0A30D633F | 33F93B7C6 | 0B330E9D2 | 0E659B262 | 130669024 | 19A9D5F64 | 38059132D |
| 47 | 17E4777AE | 1308F9046 | 2F7C0483E | 1859E0943 | 0982C9101 | 05453D92C | 001F53877 | 388A571AB |
| 48 | 00D29CC63 | 0A6D3BDED | 1CA44D2AF | 388C002CA | 2A3D70EF7 | 2DD3F5A6F | 39FEAF0B6 | 11DFE385F |
| 49 | 3E3A6CEC4 | 122F5E8BE | 360B96301 | 0632CF244 | 2E8985A9F | 0FD256C87 | 24949C29D4 | 26B713C90 |
| 50 | 238150687 | 3D96F7F7B | 0091E6D18 | 21802352A | 02F7A466E | 0A5BB6648 | 350DA85DB | 1C97F4544 |
| 51 | 306BA76DE | 379A88697 | 3F0DA31E1 | 0EBF48C71 | 27F8A46EB | 3F75A19F6 | 277002F97 | 275B43715 |
| 52 | 24D946CC1 | 38DF102DC | 3EFE1F5B3 | 3C316E148 | 2735B20CF | 0688E430F | 0316DC923 | 24919BEA1 |
| 53 | 0EEAF72D2 | 3C7248573 | 1087A7BD0 | 08EDA9BF6 | 2B5D97BF4 | 26733DC60 | 1190D275B | 2EC7ABD30 |
| 54 | 37C6AB63E | 2FFC9C790 | 02CAA37A7 | 1B34A3F84 | 0022CD5F6 | 3ECF891BF | 193D545E2 | 0172C674E |
| 55 | 0848A41C3 | 1D8150EE7 | 3D8A8549A | 2595F707B | 00640B276 | 2D44EBDAE | 1CAF37453 | 377EF590A |
| 56 | 16B7A5F7D | 1F5AA7998 | 382300A8B | 218916E53 | 19D00E728 | 1EDA11790 | 0BBDEF9C4 | 1DEB15796 |
| 57 | 3EFB3368D | 392AA88AD | 29CF3CACD | 03F59ED8A | 1042098CA | 1721B8F3A | 2B5DE9312 | 0CB5E6F23 |
| 58 | 1A8B0FB9E | 3FBC09C8B | 3D7F3E248 | 034C9BCB5 | 1BDD89300 | 3392476C0 | 0C10AED4B | 23BECA42A |
| 59 | 0EBC749B6 | 33453C7F6 | 304735F5C | 334628143 | 1DAF6E7A9 | 11BB9C393 | 226C5E4FF | 170372039 |
| 60 | 3F9262CBC | 0693308C8 | 21B563415 | 09BDCC403 | 0112C79D4 | 2DA9F1134 | 36AA1CD7D | 3A1608BFC |
| 61 | 218AC590E | 0FACC734D | 02132C9A3 | 27087557E | 076B3ECE7 | 2EA16BA3D | 0E1D452F1 | 3F70B027A |
| 62 | 004F9DC68 | 25BE3AD9C | 2CBD3C07B | 3F9DECD71 | 3E771E15A | 11FF2F24D | 2AEA5DF67 | 1E838955D |
| 63 | 3A04BC376 | 1D19254F1 | 00F92DD2B | 3C57484F3 | 181D0973E | 319F9CEEA | 053ADEEDB | 1A3C22150 |
| 64 | 0F78BA6BC | 2DFE0E681 | 3035BD77D | 0A0FFD148 | 275F50C66 | 2246E9053 | 27B2BF3E9 | 1741894F8 |
| 65 | 1ACCD0F79 | 22F0AEA4F | 32796ADB5 | 134A4A876 | 183D989E3 | 204C4BF97 | 22300E86F | 3F18744A3 |
| 66 | 3EB6E19EF | 1B24EAB88 | 2E318F810 | 3F07B618E | 26B4C0C87 | 31CC10EA8 | 169E1B650 | 017DF88ED |
| 67 | 2BD9E8FED | 0AB104122 | 30C9D81A0 | 09EA73C7F | 141357B1D | 000A7DB48 | 1DD06FD41 | 0AFA8EF72 |
| 68 | 19CA5678F | 28A89AA43 | 1DB945917 | 262AF69C3 | 3145A4473 | 3742CBFF5 | 1BCD965E9 | 1B0E7FC84 |
| 69 | 077838B25 | 2BF7032F8 | 23DC2E014 | 028544277 | 37B411B5F | 392FF6CDC | 1D66F2BE9 | 011372DA0 |
| 70 | 39596216C | 05A651F63 | 183A6A626 | 0D1FCA203 | 0FF6F0D22 | 2FEB8364B | 05A438ED8 | 32D045F13 |
| 71 | 3711AD513 | 290B237FF | 20E2A9B26 | 0C72A0234 | 2F1ABBE93 | 19B505378 | 354ED915D | 0C359F272 |
| 72 | 1D7786BA4 | 1CCDF053A | 36828B333 | 0ED27AFB6 | 241326FC4 | 1A9C37F8B | 0A9C3C372 | 05937E898 |
| 73 | 1053B9CDB | 040B97B1D | 0D4FF481D | 23AD465A8 | 2906EBDE2 | 0C4F6C09D | 2189C5FEA | 2D90D305A |
| 74 | 39073122B | 35FEEA0A | 1B38B7A90 | 2E02AB9F7 | 219FEEA6A | 36B3B2EF8 | 39A3F4C8B | 15A42C9DD |
| 75 | 2C6326A9E | 33F7536C1 | 2A120C75F | 37030CAA0 | 3A011882C | 098C8504E | 3B92D756B | 175811CF9 |
| 76 | 38A0F736B | 2BD9E9C32 | 3B989715A | 2A646ADF4 | 2D02FE38C | 11AC7E9E6 | 3F5464862 | 0F382B0D8 |
| 77 | 26897D80C | 145B21D3E | 143F5E320 | 30549707E | 28126710C | 122CA92BE | 3AF47270C | 0B544128F |
| 78 | 00E931208 | 2E1E75EAA | 374C36E5F | 21724DFC5 | 1DFCD2028 | 1B3FF774A | 3A826A68B | 1781CDCA4 |
| 79 | 0C3D7268D | 0B7A26BF9 | 1587CE5CD | 1D04E1E60 | 36240C07D | 1AC403449 | 0417F9622 | 02B9F8BED |
| 80 | 1B569F488 | 08A3F3A46 | 377F03A18 | 2DE416045 | 1ED96E381 | 33F4F16DC | 2C8DAAE4F | 33E384AC7 |
| 81 | 13F709786 | 02A4E32CB | 14C7F849E | 09EA16987 | 06C849EA4 | 219E4B995 | 243CB7F07 | 253513BC6 |
| 82 | 09B83FDF2 | 119D60439 | 278290BFF | 2483E6F2A | 0EDEC175D | 242A669C1 | 3EB639EF0 | 31EBB4CA0 |
| 83 | 22CAEF0E4 | 0B2FCDED0 | 19BA79607 | 343F81C7B | 289AA213E | 358AC9FFA | 23956ADA1 | 00BC725E7 |
| 84 | 1186F95E3 | 2F95F4048 | 3CFBF41E2 | 1D1E4BE96 | 26B38BA65 | 2F715E590 | 2235C0029 | 2C89AF93F |
| 85 | 33437ED6C | 12F14DB69 | 2E70F5611 | 183752704 | 142BC8B34 | 3B90ECD86 | 1C11EB493 | 1022D4782 |
| 86 | 248457F60 | 05B9A28A5 | 0A2A5DD56 | 16002D9E7 | 34C87FB16 | 2E32BAOEC | 21065BD64 | 1CCE92BB0 |
| 87 | 1DCE3941A | 1D940ACE3 | 30D331B98 | 3D5A3BAB6 | 119791607 | 10FB0D788 | 2C78E9015 | 100B598E4 |
| 88 | 39C0BC811 | 1B886594E | 27AF50C73 | 2DCEA05E6 | 0805EDCA9 | 3A5989B08 | 18AD24255 | 1683B7CF2 |
| 89 | 186A3D233 | 09E8B95DA | 1ED9F3DBE | 1B19A74F8 | 356CA7443 | 316C9FBE9 | 3F8A3162A | 3A0BC11CC |
| 90 | 02F039B63 | 2F02D3E75 | 0F5B5E89E | 3D062255C | 222C6AA4E | 25DEA06FB | 39488C071 | 139318BFB |
| 91 | 27B5B6EE8 | 22154E0BD | 3FF7729F1 | 1052B1947 | 3D477BF2B | 3EDB6745A | 1B30CF849 | 030F84AF4 |
| 92 | 27B2D40BC | 01EE5E9B6 | 24B0ACF84 | 3370F65E0 | 067D8DFA9 | 1C01B9327 | 26FF8FDB5 | 3809C0CA6 |
| 93 | 11F581193 | 07B9B7A7D | 1CA56B4A3 | 3D088CC6C | 11D52C38A | 344760F0A | 3D3AA336D | 0118CBD93 |
| 94 | 096990784 | 2960D1672 | 3BFD7D847 | 2BC297EEE | 32168CF28 | 3912FFF6C | 08ED9BAB1 | 34452C6E5 |
| 95 | 02CD48DC2 | 186403849 | 24C6E1EA | 12ED5268A | 2718C00E9 | 27E8F18CF | 145913E2D | 0B09009BB |
| 96 | 06B97DD08 | 2880C9B96 | 37EB87E03 | 14C4ED01D | 17041E5DC | 347A412CB | 088CE591B | 0BE926B22 |
| 97 | 116250DF7 | 1745B4329 | 1102B7093 | 1CA549C5A | 25244AB6C | 374E0F19B | 274F76015 | 0FB738F16 |
| 98 | 12841B9E9 | 1F9C4AEEB | 1445F0C98 | 39FFB6307 | 02AB688E7 | 0FD8B499E | 28D533072 | 138F162EA |
| 99 | 22BD9525E | 2030E58C6 | 25F2CD033 | 157D93437 | 1442E92D2 | 3D6EB9DF3 | 3CA5B469D | 0588A0FAE |
| 100 | 0FDEC177D | 2606157BE | 2224E556C | 0C6F33897 | 0F830DE1B | 3C3F9C1D8 | 2AF576923 | 0D4173E27 |
| 101 | 376EF82C2 | 30E3C582E | 0A82DE29A | 1B8D454D9 | 079ACE6D9 | 2579984C6 | 392F28400 | 24CEAEDF1 |
| 102 | 1CD4AA9D2 | 1DD6F4DA5 | 3485B7150 | 105DE02F9 | 22168E0FA | 24F48AA6C | 003771A39 | 306890843 |
| 103 | 1F8303786 | 2C981AAE4 | 0819F22E9 | 0ALD88D55 | 3B4C012FD | 0214CDF52 | 19DF3BE8F | 02364E19A |
| 104 | 1364A15C0 | 16E9F9661 | 17E598810 | 2654E5A2C | 09B43C7C8 | 3A5E2AF45 | 14FC71E26 | 2B4BA69F4 |
| 105 | 12E128BEF | 19166342E | 04A1404B7 | 283D17B66 | 014836F64 | 13BE0B4B5 | 2F8583C08 | 2B19A7FB4 |
| 106 | 19F83FDE2 | 361D25170 | 36354011B | 3FF4EC74B | 1B2128FF9 | 0C849EB1B | 096B991D8 | 1CA7A74AA |
| 107 | 32E0BEF35 | 11A61714D | 34C56D40B | 0742C52FE | 00ED2F1C4 | 3997FC7B7 | 06E414374 | 180DCD64F |
| 108 | 18399ED59 | 224E6C2FF | 3450F1BB7 | 27A1CA959 | 21B5E00F8 | 13B67DAE8 | 0B14C022E | 0E41BBEE2 |

TABEL 13-continued n = 2 (Segment 2):

| q | A | B | C | D | E | F | G | H |
|---|---|---|---|---|---|---|---|---|
| 109 | 318D94D05 | 2EBB53B17 | 331C3E6F4 | 0FBCD71ED | 380FF18B8 | 3E3C75B26 | 0E0088A18 | 17553D2A2 |
| 110 | 37AC7E5D5 | 27C9EADFA | 3FC47B5E4 | 38699BB57 | 1564F8B27 | 3579C7FEB | 13401BD88 | 0DB519DE0 |
| 111 | 0FF4D6F22 | 3C84242F3 | 2DEAE40AD | 305F320A5 | 244CB97B0 | 0892DA905 | 3F09D5CB5 | 332E7DB02 |
| 112 | 31479E580 | 1B6AD13E0 | 16A1CF9E2 | 33A0A119A | 1AC8388E9 | 3D4105F37 | 226501835 | 27AF1310F |
| 113 | 1CBDAFE39 | 3E5A30C1C | 236E9A029 | 063430D97 | 0CD91A825 | 02F335D7E | 1989FE0BE | 13C4E2A20 |
| 114 | 10B393370 | 33CB79316 | 2CEB44FC0 | 236019420 | 248F95ACB | 35034B6F0 | 365691771 | 34A8FBCB6 |
| 115 | 25463FC5F | 082FC0ED2 | 038ACE1CC | 3E959B49D | 21B8C04F5 | 08633F3A0 | 3A5D18159 | 12B3EC4C7 |
| 116 | 167B32C3E | 06FF88387 | 34C3F468B | 3239005B2 | 121C913AF | 21C90CE16 | 28B54D557 | 3811CB0A9 |
| 117 | 221BD0503 | 0AF619499 | 21F8D40C1 | 1B3DA7AEE | 3FA2E3B05 | 348466C50 | 10F12A28D | 0E70B26AB |
| 118 | 1D79A57C5 | 315D2460F | 1402B8222 | 28DC66FEA | 1BCF748F9 | 2AD5D4227 | 0094D2CAD | 25EA22A58 |
| 119 | 062B39CFB | 310E8818D | 0F2D0A235 | 3F6468866 | 33F86F342 | 39CAB5BBC | 2E7D6A8BF | 3E9218162 |
| 120 | 2FCDEA0E0 | 1BDD766A4 | 2827B99BB | 0B5F04CC9 | 1C9E02A9A | 1A6675ED4 | 033497A06 | 07D4ADD44 |
| 121 | 3CD46CD9D | 311A64A85 | 24DDFE6FF | 3411C6FE5 | 0D0613CDA | 0E9276056 | 178ACC4F8 | 23DEA3CB0 |
| 122 | 2762D6A40 | 306FE3843 | 1402589C8 | 382B07654 | 160BA3DEA | 3815B54C8 | 273960105 | 2076A15E5 |
| 123 | 1C593A744 | 1562487F6 | 0C38617B4 | 2CA68266A | 071C4BF93 | 2593F0BDC | 1562436E5 | 199BEEA49 |
| 124 | 35B8C7503 | 278F57EAA | 34A804061 | 19C657A74 | 385734710 | 3FAC27628 | 0707BED4E | 32F20F45E |
| 125 | 34994C46C | 1C6B99499 | 1AF24D850 | 11AD795D3 | 19288BFE9 | 1360C1B96 | 3B5D8DBC0 | 2554E72D6 |
| 126 | 22D7095A4 | 34B70502A | 3F0CB27D2 | 04FC214E6 | 24C0B80C5 | 03D6F4DC8 | 1432A099E | 26300D70E |
| 127 | 21C33416F | 18B894695 | 3AC062614 | 3537CF601 | 00A20A8B8 | 1CD10BAF5 | 394DF1DC0 | 0925851ED |

Simulation: Properties of SA-Preambles Proposed by the Invention

The properties of the sequences listed in Table 11, Table 12 and Table 13 and the extended sequences obtained by complex conjugating the sequences according to the present invention were investigated (256 sequences per segment). As comparison groups, known 114 preamble sequences for the IEEE 802.16e system and known SA-Preamble sequences (256 sequences per segment, refer to Table 10 and IEEE 802.16m-09/0010r2, Table 658 and Table 659) were used. Cross-correlations, differential cross-correlations (Type 1), differential cross-correlations (Type 2), auto-correlations, differential auto-correlations, and boosting levels were measured. The differential cross-correlations (Type 2) were calculated according to the method described by [Equation 26]. The boosting levels are maximum values that do not lead a maximum peak value exceeding 9 dB in the time domain. For the other measurements, refer to [Equation 9] to [Equation 18].

$$R^{a,b} = \frac{1}{N-1} \sum_{n=0}^{N-2} (a_d(n))^* b_d(n)$$ [Equation 26]

where $z_d(n) = (z(n))^* z(n+1)$ and N represents a sequence length.

Table 14 to Table 19 illustrate the simulation results of the properties of the sequences proposed by the present invention (Ex,seg_0 to Ex,seg_2) and the comparison groups (16e, and 16m,seg_0 to 16m,seg_2).

TABLE 14

| | Cross-correlation | | | | | | |
|---|---|---|---|---|---|---|---|
| | 16e[a] (114) | 16m[b], seg_0 (256) | Ex[c], seg_0 (256) | 16m, seg_1 (256) | Ex, seg_1 (256) | 16m, seg_2 (256) | Ex, seg_2 (256) |
| Min | 0.000 | 0.000 | 0.000 | 0.000 | 0.000 | 0.000 | 0.000 |
| Max | 0.303 | 0.403 | 0.301 | 0.361 | 0.303 | 0.347 | 0.303 |
| Mean | 0.074 | 0.074 | 0.074 | 0.074 | 0.074 | 0.074 | 0.074 |
| Median | 0.070 | 0.069 | 0.069 | 0.069 | 0.069 | 0.069 | 0.069 |
| std. dev. | 0.039 | 0.039 | 0.039 | 0.039 | 0.039 | 0.039 | 0.039 |

[a]144 known preambles for the IEEE 802.16e system
[b]256 known BPSK-type SA-Preambles for the IEEE 802.16m system
[c]256 QPSK-type SA-Preambles according to the present invention

TABLE 15

| | Differential cross-correlation (type 1) | | | | | | |
|---|---|---|---|---|---|---|---|
| | 16e[a] (114) | 16m[b], seg_0 (256) | Ex[c], seg_0 (256) | 16m, seg_1 (256) | Ex, seg_1 (256) | 16m, seg_2 (256) | Ex, seg_2 (256) |
| Min | 0.000 | 0.000 | 0.000 | 0.000 | 0.000 | 0.000 | 0.000 |
| Max | 0.236 | 0.329 | 0.235 | 0.310 | 0.234 | 0.319 | 0.235 |
| Mean | 0.041 | 0.041 | 0.042 | 0.041 | 0.042 | 0.041 | 0.042 |

TABLE 15-continued

| | Differential cross-correlation (type 1) | | | | | | |
|---|---|---|---|---|---|---|---|
| | 16e[a] (114) | 16m[b], seg_0 (256) | Ex[c], seg_0 (256) | 16m, seg_1 (256) | Ex, seg_1 (256) | 16m, seg_2 (256) | Ex, seg_2 (256) |
| Median | 0.037 | 0.037 | 0.038 | 0.037 | 0.038 | 0.037 | 0.038 |
| std. dev. | 0.025 | 0.025 | 0.025 | 0.025 | 0.025 | 0.025 | 0.025 |

[a]144 known preambles for the IEEE 802.16e system
[b]256 known BPSK-type SA-Preambles for the IEEE 802.16m system
[c]256 QPSK-type SA-Preambles according to the present invention

TABLE 16

| | Differential cross-correlation (type 2) | | | | | | |
|---|---|---|---|---|---|---|---|
| | 16e[a] (114) | 16m[b], seg_0 (256) | Ex[c], seg_0 (256) | 16m, seg_1 (256) | Ex, seg_1 (256) | 16m, seg_2 (256) | Ex, seg_2 (256) |
| Min | 0.000 | 0.007 | 0.007 | 0.007 | 0.007 | 0.007 | 0.007 |
| Max | 0.239 | 0.315 | 0.237 | 0.301 | 0.239 | 0.315 | 0.238 |
| Mean | 0.065 | 0.067 | 0.077 | 0.067 | 0.077 | 0.067 | 0.077 |
| Median | 0.056 | 0.063 | 0.073 | 0.063 | 0.073 | 0.063 | 0.073 |
| std. dev. | 0.049 | 0.050 | 0.040 | 0.050 | 0.040 | 0.050 | 0.040 |

[a]144 known preambles for the IEEE 802.16e system
[b]256 known BPSK-type SA-Preambles for the IEEE 802.16m system
[c]256 QPSK-type SA-Preambles according to the present invention Referring to Table 14, Table 15 and Table 16, the QPSK-type SA-Preambles according to the present invention have lower maximum cross-correlations all the time than the known BPSK-type SA-Preambles of the IEEE 802.16m system.

Referring to Table 17 and Table 18, the QPSK-type SA-Preambles according to the present invention have lower maximum and mean auto-correlations all the time than the known BPSK-type SA-Preambles of the IEEE 802.16m system.

TABLE 17

| | Auto-correlation | | | | | | |
|---|---|---|---|---|---|---|---|
| | 16e[a] (114) | 16m[b], seg_0 (256) | Ex[c], seg_0 (256) | 16m, seg_1 (256) | Ex, seg_1 (256) | 16m, seg_2 (256) | Ex, seg_2 (256) |
| Min | 0.091 | 0.139 | 0.126 | 0.139 | 0.126 | 0.139 | 0.119 |
| Max | 0.203 | 0.333 | 0.250 | 0.306 | 0.237 | 0.361 | 0.264 |
| Mean | 0.134 | 0.213 | 0.178 | 0.206 | 0.173 | 0.212 | 0.177 |
| Median | 0.133 | 0.222 | 0.175 | 0.194 | 0.169 | 0.194 | 0.176 |
| std. dev. | 0.020 | 0.034 | 0.024 | 0.034 | 0.022 | 0.038 | 0.023 |

[a]144 known preambles for the IEEE 802.16e system
[b]256 known BPSK-type SA-Preambles for the IEEE 802.16m system
[c]256 QPSK-type SA-Preambles according to the present invention

TABLE 18

| | Differential auto-correlation | | | | | | |
|---|---|---|---|---|---|---|---|
| | 16e[a] (114) | 16m[b], seg_0 (256) | Ex[c], seg_0 (256) | 16m, seg_1 (256) | Ex, seg_1 (256) | 16m, seg_2 (256) | Ex, seg_2 (256) |
| Min | 0.127 | 0.133 | 0.128 | 0.133 | 0.134 | 0.119 | 0.144 |
| Max | 0.408 | 0.315 | 0.253 | 0.357 | 0.244 | 0.357 | 0.264 |
| Mean | 0.216 | 0.214 | 0.181 | 0.218 | 0.184 | 0.216 | 0.184 |
| Median | 0.211 | 0.217 | 0.179 | 0.217 | 0.183 | 0.217 | 0.183 |
| std. dev. | 0.044 | 0.035 | 0.024 | 0.039 | 0.023 | 0.036 | 0.023 |

[a]144 known preambles for the IEEE 802.16e system
[b]256 known BPSK-type SA-Preambles for the IEEE 802.16m system
[c]256 QPSK-type SA-Preambles according to the present invention

TABLE 19

SA-preamble signal boosting levels

| | Ants/FFT | 512 | 2048 |
|---|---|---|---|
| 16m[a] | 1 | 1.59 dB | 1.49 dB |
| (FSTD) | 2 | 2.18 dB | 2.09 dB |
| | 4 | 2.84 dB | 3.11 dB |
| | 8 | 3.54 dB | 4.40 dB |
| Example | 1 | 1.87 dB | 1.69 dB |
| s[b] | 2 | 2.51 dB | 2.42 dB |
| (FSTD[c]) | 4 | 4.38 dB | 3.50 dB |
| | 8 | 8.67 dB | 4.95 dB |

[a]Known BPSK-type SA-Preambles for the IEEE 802.16 m system
[b]QPSK-type SA-Preambles proposed by the present invention
[c]Frequency Switched Transmit Diversity Referring to Table 19, the QPSK-type SA-Preambles according to the present invention have higher boosting levels than the known BPSK-type SA-Preambles of the IEEE 802.16m system, in all of eight cases for 512-FFT and 2048 FFT. Especially, in the cases of 4 antennas and 8 antennas for 512-FFT, the QPSK-type SA-Preambles according to the present invention have at least twice as high boosting levels as the known BPSK-type SA-Preambles of the IEEE 802.16m system. Thus, it can be concluded that the QPSK-type SA-Preambles according to the present invention have low PAPRs than the known BPSK-type SA-Preambles of the IEEE 802.16m system.

Table 20 illustrates power boosting according to FFT sizes and numbers of antennas. The power boosting was optimized for the sequences listed in Table 11, Table 12 and Table 13. In the time domain, a maximum peak does not exceed 9 dB.

TABLE 20

| Ant\FFT | 512 | 1024 | 2048 |
|---|---|---|---|
| 1 | 1.87 | 1.75 | 1.69 |
| 2 | 2.51 | 2.33 | 2.42 |
| 4 | 4.38 | 3.56 | 3.50 |
| 8 | 8.67 | 6.25 | 4.95 |

In Table 20, in the case of a single antenna and 512-FFT, the SA-Preambles are boosted at a boosting level of 1.87. Then a boosted SA-Preamble at a $k^{th}$ subcarrier may be expressed as $c_k=1.87b_k$ where $b_k$ denotes an SA-Preamble (+1, −1, +j, −j) prior to boosting.

Table 21 illustrates block cover sequences for each sub-block in an SA-Preamble. A block cover sequence converted to binary values {0, 1} is mapped to {+1, −1}.

TABLE 21

| (FFT, number of antennas)\Segment ID | 0 | 1 | 2 |
|---|---|---|---|
| (512,1) | 00 | 00 | 00 |
| (512,2) | 22 | 22 | 37 |
| (512,4) | 09 | 01 | 07 |
| (512,8) | 00 | 00 | 00 |
| (1024,1) | 0FFF | 555A | 000F |
| (1024,2) | 7373 | 3030 | 0000 |
| (1024,4) | 3333 | 2D2D | 2727 |
| (1024,8) | 0F0F | 0404 | 0606 |
| (2048,1) | 0F0FFF00 | 00000FF0 | 0F000FFF |
| (2048,2) | 7F55AA42 | 4438180C | 3A5A26D9 |
| (2048,4) | 1A13813E | 03284BF0 | 391A8D37 |
| (2048,8) | 0D0EF8FA | 0C0BFC59 | 03000656 |

FIG. 16 illustrates exemplary ranging channel structures in the IEEE 802.16m system. A ranging procedure is used for various purposes. For example, the ranging procedure is used for uplink synchronization, uplink resource request, etc.

Referring to FIG. 16, the ranging channel includes a Ranging CP (RCP) of length $T_{RCP}$ and a Ranging Preamble (RP) of length $T_{RP}$, in the time domain. $T_{RP}$ is proportional to the reciprocal of a ranging subcarrier spacing ΔfRP. Table 22 illustrates the ranging channel structures.

TABLE 22

| Format No. | Ranging Channel Structure | $T_{RCP}$ | $T_{RP}$ | $\Delta f_{RP}$ |
|---|---|---|---|---|
| 0 | Structure 1 | $T_g + k \times T_b^{(a)}$ | $2 \times T_b$ | $\Delta f/2$ |
| 1 | Structure 3 | | | |
| 2 | Structure 2 | $m \times T_g + n \times T_b^{(b)}$ | $2 \times 2 \times T_b^{(c)}$ | |
| 3 | Structure 3 | $7 \times T_g + T_b$ | $8 \times T_b$ | $\Delta f/8$ |
| 4 | Structure 4 | $T_g$ | $T_b$ | $\Delta f$ |

In Table 22, $T_b$ denotes a useful symbol duration, $T_g$ denotes a CP duration, and ΔfRP denotes a subcarrier spacing. For details, refer to Table 7 and its description. k may be expressed as $$k=[\{[N_{sym} \cdot T_s - 2 \cdot (T_{RP}+T_g)]/3\} \cdot F_s]/N_{FFT} \quad \text{[Equation 27]}$$

where $N_{sym}$ denotes the number of OFDMA symbols in a subframe, $T_s$ denotes an OFDMA symbol duration, FS denotes a sampling frequency, and $N_{FFT}$ denotes an FFT size. m is $(N_{sym}+1)/2$, and n is $(N_{sym}-4)/2$. For details, refer to Table 7 and its description.

In ranging channel format 0, repeated RCPs and repeated RPs are used as one ranging opportunity in a subframe. Ranging channel format 2 includes one RCP and repeated RPs in a subframe, and ranging channel format 1 includes one RCP and two RPs. If ranging channel format 1 is used, there are two ranging opportunities in a subframe. Ranging channel format 4 user identification card connecting device is identical to ranging channel format 1 in structure and different from ranging channel format 1 in length. In ranging channel format 4, first to fourth RPs RP1, RP2, RP3 and RP4 correspond to first to last parts of a ranging sequence, respectively.

Figure 17:
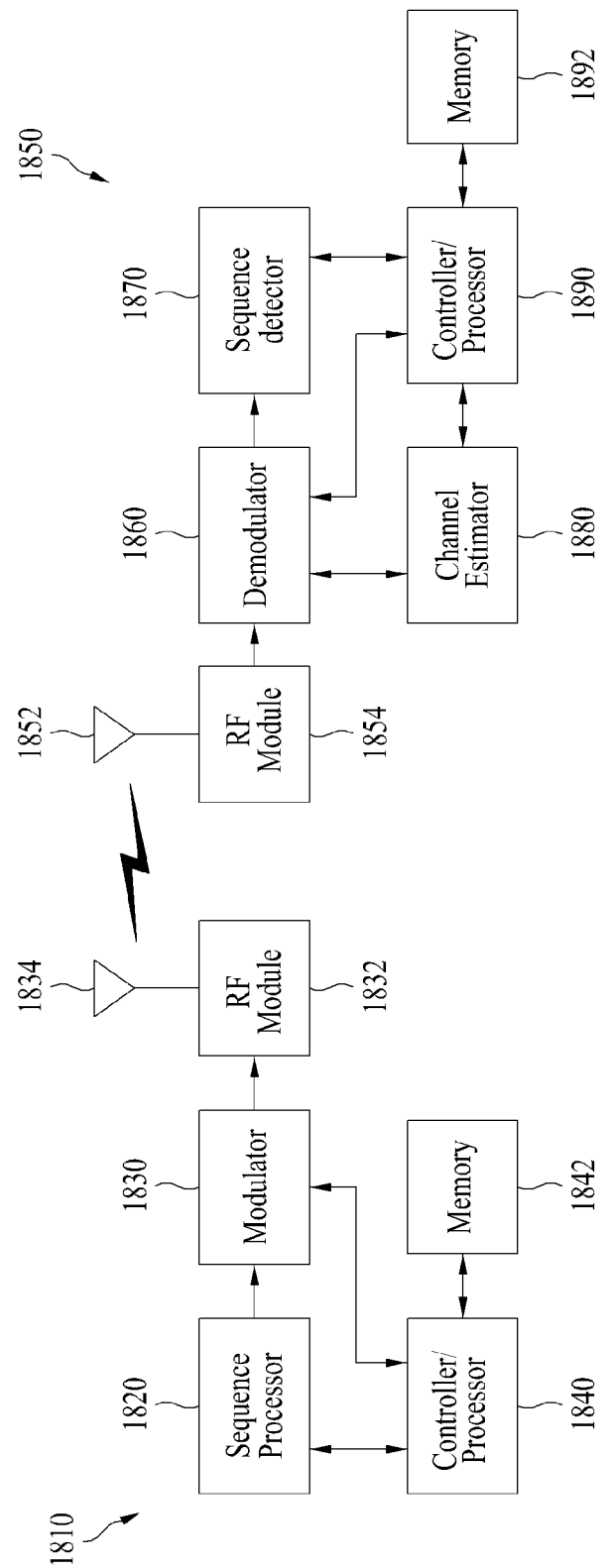
FIG. 17 is a block diagram of a transmitter and a receiver according to an embodiment of the present invention.

FIG. 17 is a block diagram of a transmitter and a receiver according to an embodiment of the present invention. A transmitter 1810 is a part of a BS and a receiver 1850 is a part of an MS on a downlink, whereas the transmitter 1810 is a part of the MS and the receiver 1805 is a part of the BS on an uplink.

Referring to FIG. 17, a sequence processor 1820 of the transmitter 1810 may perform various operations related to sequence generation, sequence selection, sequence extension, etc., or it may control other modules to perform the operations. The sequence processor 1820 may select a base sequence from a memory or generate a base sequence using a sequence generator. Also, the sequence processor 1820 may generate a new extended sequence out of the base sequence through complex conjugation and/or a reverse operation. The sequence processor 1820 may output the selected/generated/extended sequence to a modulator 1830. The modulator 1830 modulates the received sequence according to the type of the sequence by BPSK, QPSK, 8-PSK, etc. The modulator 1830 may perform complex conjugation and/or the reverse operation on the modulated sequence under the control of the sequence processor 1820. An additional module may be separately configured so as to perform the complex conjugation and/or the reverse operation. The modulated sequence is mapped to subcarriers by the modulator 1830 or an additionally configured module. According to a channel that will carry the sequence, the modulated sequence may be mapped to consecutive or distributed subcarriers. A Radio Frequency (RF) module 1832 generates an RF signal by processing the mapped sequence to be suitable for an air interface (e.g. digital-to-analog conversion, amplification, filtering and frequency upconversion). The RF signal is transmitted to the receiver through an antenna 1834.

The receiver receives the signal at an RF module 1854 from the transmitter 1810 through an antenna 1852. The RF module 1854 provides input samples by processing the received signal (e.g. filtering, amplification, frequency downconversion, and analog-to-digital conversion). A demodulator 1860 provides a sequence by demodulating the input samples. A channel estimator 1880 calculates a channel estimate based on received pilot values. The demodulator 1860 equalizes the received sequence using the channel estimate and thus provides a sequence estimate. A sequence detector 1870 detects or estimates the sequence transmitted by the transmitter 1810 by the exemplary method illustrated in FIG. 6 or any other method.

Controllers/processors 1840 and 1890 manage and control the operations of various processing modules of the transmitter 1810 and the receiver 1850, respectively. Memories 1842 and 1892 store program codes and data for the transmitter 1810 and the receiver 1850, respectively.

The embodiments of the present invention described hereinbelow are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. It is obvious to those skilled in the art that claims that are not explicitly cited in each other in the appended claims may be presented in combination as an embodiment of the present invention or included as a new claim by a subsequent amendment after the application is filed.

In the embodiments of the present invention, a description is made, centering on a data transmission and reception relationship between a BS and an MS. In some cases, a specific operation described as performed by the BS may be performed by an upper node of the BS.

Herein, the term 'BS' refers to a terminal node of a network, which communicates directly with the MS. Namely, it is apparent that, in a network comprised of a plurality of network nodes including a BS, various operations performed for communication with an MS may be performed by the BS, or network nodes other than the BS. The term 'BS' may be replaced with the term 'fixed station', 'Node B', 'enhanced Node B (eNode B or eNB)', 'access point', etc. The term 'MS' may be replaced with the term 'User Equipment (UE)', 'Mobile Subscriber Station (MSS)', 'mobile terminal', etc.

The embodiments of the present invention may be achieved by various means, for example, hardware, firmware, software, or a combination thereof. In a hardware configuration, the methods according to the embodiments of the present invention may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, the embodiments of the present invention may be implemented in the form of a module, a procedure, a function, etc. For example, software code may be stored in a memory unit and executed by a processor. The memory unit is located at the interior or exterior of the processor and may transmit and receive data to and from the processor via various known means.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

INDUSTRIAL APPLICABILITY

The present invention is applicable to wireless communication systems, especially wireless communication systems supporting at least one of SC-FDMA, MC-FDMA, and OFDMA. More particularly, the present invention is applicable to a method and apparatus for transmitting and receiving sequences in a wireless communication system.

What is claimed is:

1. A method of transmitting a signal at a base station in a wireless communication system, the method comprising:
   transmitting a preamble including a modulation sequence, the modulation sequence being indexed as one of 0 to 2N−1,
   wherein the index of the modulation sequence is used to determine a cell identifier and N is a number of pre-defined hexadecimal sequences,
   wherein, if the index of the modulation sequence is within 0 to N−1, the modulation sequence is obtained by modulation of one of the pre-defined hexadecimal sequences, and
   wherein, if the index of the modulation sequence is within N to 2N−1, the modulation sequence is obtained by using the following equation:

$$v_k^{(q)} = (v_k^{(q-N)})^* \text{ (for } N \leq q \leq 2N-1)$$

where $v_k^{(q)}$ is a $k^{th}$ modulation symbol in a modulation sequence of index q, $v_k^{(q-N)}$ is a $k^{th}$ modulation symbol in a modulation sequence of index (q−N), k is an integer greater than or equal to 0, and the symbol "*" represents a conjugate operation.

2. The method of claim 1, wherein the one of the pre-defined hexadecimal sequences is modulated by converting each element $X_i^{(q)}$ of a corresponding hexadecimal sequence into two Quadrature Phase Shift Keying (QPSK) symbols $v_{k\,2i}^{(x)}$ and $v_{k\,2i+1}^{(x)}$ by using the following equation:

$$v_{2i}^{(x)} = \exp\left(j\frac{\pi}{2}(2 \cdot b_{i,0}^{(q)} + b_{i,1}^{(q)})\right)$$

$$v_{2i+1}^{(x)} = \exp\left(j\frac{\pi}{2}(2 \cdot b_{i,2}^{(q)} + b_{i,3}^{(q)})\right)$$

where $X_i^{(q)} = 2^3 \cdot b_{i,0}^{(q)} + 2^2 \cdot b_{i,1}^{(q)} + 2^1 \cdot b_{i,2}^{(q)} + 2^0 \cdot b_{i,3}^{(q)}$, q is an integer of 0 to N−1, and i is an integer greater than or equal to 0.

3. The method of claim 1, wherein the preamble is a Secondary Advanced Preamble (SA-Preamble).

4. The method of claim 3, wherein the SA-Preamble is located on subcarriers given by the following equation, $$SAPreambleCarrierSet_n = n + 3 \cdot k + 40 \cdot \frac{N_{SAP}}{144} + \left\lfloor \frac{2 \cdot k}{N_{SAP}} \right\rfloor$$

where n is an index of an SA-Preamble carrier set, indicating a segment Identifier (ID) ranging from 0 to 2, $N_{SAP}$ is a value given for the SA-Preamble, and k is an integer ranging from 0 to $N_{SAP}-1$.

5. The method of claim 4, wherein the cell identifier (ID-cell) is determined by the following equation, $$IDcell = 256 \times n + Idx$$

where n is the index of the SA-Preamble carrier set, indicating the segment ID ranging from 0 to 2, and Idx is an integer ranging from 0 to 255, the Idx being obtained from the index of the modulation sequence.

6. A method of receiving a signal at a mobile station in a wireless communication system, the method comprising:
receiving a preamble including a modulation sequence, the modulation sequence being indexed as one of 0 to 2N−1,
wherein the index of the modulation sequence is used to determine a cell identifier and N is a number of pre-defined hexadecimal sequences,
wherein, if the index of the modulation sequence is within 0 to N−1, the modulation sequence is obtained by modulation of one of the pre-defined hexadecimal sequences, and
wherein, if the index of the modulation sequence is within N to 2N−1, the modulation sequence is obtained by using the following equation:

$v_k^{(q)} = (v_k^{(q-N)})^*$ (for $N \leq q \leq 2N-1$)

where $v_k^{(q)}$ is a $k^{th}$ modulation symbol in a modulation sequence of index q, $v_k^{(q-N)}$ is a $k^{th}$ modulation symbol in a modulation sequence of index (q−N), k is an integer greater than or equal to 0, and the symbol "*" represents a conjugate operation.

7. The method of claim 6, wherein the one of the pre-defined hexadecimal sequences is modulated by converting each element $X_i^{(q)}$ of a corresponding hexadecimal sequence into two Quadrature Phase Shift Keying (QPSK) symbols $v_{k\,2i}^{(x)}$ and $v_{k\,2i+1}^{(x)}$ by using the following equation:

$$v_{2i}^{(x)} = \exp\left(j\frac{\pi}{2}(2 \cdot b_{i,0}^{(q)} + b_{i,1}^{(q)})\right)$$

$$v_{2i+1}^{(x)} = \exp\left(j\frac{\pi}{2}(2 \cdot b_{i,2}^{(q)} + b_{i,3}^{(q)})\right)$$

where $X_i^{(q)} = 2^3 \cdot b_{i,0}^{(q)} + 2^2 \cdot b_{i,1}^{(q)} + 2^1 \cdot b_{i,2}^{(q)} + 2^0 \cdot b_{i,3}^{(q)}$, q is an integer of 0 to N−1, and i is an integer greater than or equal to 0.

8. The method of claim 6, wherein the preamble is a Secondary Advanced Preamble (SA-Preamble).

9. The method of claim 8, wherein the SA-Preamble is located on subcarriers given by the following equation, $$SAPreambleCarrierSet_n = n + 3 \cdot k + 40 \cdot \frac{N_{SAP}}{144} + \left\lfloor \frac{2 \cdot k}{N_{SAP}} \right\rfloor$$

where n is an index of an SA-Preamble carrier set, indicating a segment Identifier (ID) ranging from 0 to 2, $N_{SAP}$ is a value given for the SA-Preamble, and k is an integer ranging from 0 to $N_{SAP}-1$.

10. The method of claim 9, wherein the cell identifier (IDcell) is determined by the following equation, IDcell = 256×n+Idx where n is the index of the SA-Preamble carrier set, indicating the segment ID ranging from 0 to 2, and Idx is an integer ranging from 0 to 255, the Idx being obtained from the index of the modulation sequence.

11. A base station used for transmitting a signal in a wireless communication system, the base station comprising:
a Radio Frequency (RF) module; and
a processor configured to transmit a preamble including a modulation sequence, the modulation sequence being indexed as one of 0 to 2N−1,
wherein the index of the modulation sequence is used to determine a cell identifier and N is a number of pre-defined hexadecimal sequences,
wherein, if the index of the modulation sequence is within 0 to N−1, the modulation sequence is obtained by modulation of one of the pre-defined hexadecimal sequences, and
wherein, if the index of the modulation sequence is within N to 2N−1, the modulation sequence is obtained by using the following equation:

$v_k^{(q)} = (v_k^{(q-N)})^*$ (for $N \leq q \leq 2N-1$)

where $v_k^{(q)}$ is a $k^{th}$ modulation symbol in a modulation sequence of index q, $v_k^{(q-N)}$ is a $k^{th}$ modulation symbol in a modulation sequence of index (q−N), k is an integer greater than or equal to 0, and the symbol "*" represents a conjugate operation.

12. The base station of claim 11, wherein the one of the pre-defined hexadecimal sequences is modulated by converting each element $X_i^{(q)}$ of a corresponding hexadecimal sequence into two Quadrature Phase Shift Keying (QPSK) symbols $v_{k\,2i}^{(x)}$ and $v_{k\,2i+1}^{(x)}$ by using the following equation:

$$v_{2i}^{(x)} = \exp\left(j\frac{\pi}{2}(2 \cdot b_{i,0}^{(q)} + b_{i,1}^{(q)})\right)$$

$$v_{2i+1}^{(x)} = \exp\left(j\frac{\pi}{2}(2 \cdot b_{i,2}^{(q)} + b_{i,3}^{(q)})\right)$$

where $X_i^{(q)} = 2^3 \cdot b_{i,0}^{(q)} + 2^2 \cdot b_{i,1}^{(q)} + 2^1 \cdot b_{i,2}^{(q)} + 2^0 \cdot b_{i,3}^{(q)}$, q is an integer of 0 to N−1, and i is an integer greater than or equal to 0.

13. The base station of claim 11, wherein the preamble is a Secondary Advanced Preamble (SA-Preamble).

14. The base station of claim 13, wherein the SA-Preamble is located on subcarriers given by the following equation, $$SAPreambleCarrierSet_n = n + 3 \cdot k + 40 \cdot \frac{N_{SAP}}{144} + \left\lfloor \frac{2 \cdot k}{N_{SAP}} \right\rfloor$$

where n is an index of an SA-Preamble carrier set, indicating a segment Identifier (ID) ranging from 0 to 2, $N_{SAP}$ is a value given for the SA-Preamble, and k is an integer ranging from 0 to $N_{SAP}-1$.

15. The base station of claim 14, wherein the cell identifier (IDcell) is determined by the following equation, IDcell = 256×n+Idx where n is the index of the SA-Preamble carrier set, indicating the segment ID ranging from 0 to 2, and Idx is an integer ranging from 0 to 255, the Idx being obtained from the index of the modulation sequence.

16. A mobile station used for receiving a signal in a wireless communication system, the mobile station comprising:
a Radio Frequency (RF) module; and
a processor configured to receive a preamble including a modulation sequence, the modulation sequence being indexed as one of 0 to 2N−1,
wherein the index of the modulation sequence is used to determine a cell identifier and N is a number of pre-defined hexadecimal sequences,
wherein, if the index of the modulation sequence is within 0 to N−1, the modulation sequence is obtained by modulation of one of the pre-defined hexadecimal sequences, and
wherein, if the index of the modulation sequence is within N to 2N−1, the modulation sequence is obtained by using the following equation:

$v_k^{(q)} = (v_k^{(q-N)})^*$ (for $N \leq q \leq 2N-1$)

where $v_k^{(q)}$ is a $k^{th}$ modulation symbol in a modulation sequence of index q, $v_k^{(q-N)}$ is a $k^{th}$ modulation symbol in a modulation sequence of index (q−N), k is an integer greater than or equal to 0, and the symbol "*" represent a conjugate operation.

17. The mobile station of claim 16, wherein the one of the pre-defined hexadecimal sequences is modulated by converting each element $X_i^{(q)}$ of a corresponding hexadecimal sequence into two Quadrature Phase Shift Keying (QPSK) symbols $v_{k\,2i}^{(x)}$ and $v_{k\,2i+1}^{(x)}$ by using the following equation:

$$v_{2i}^{(x)} = \exp\left(j\frac{\pi}{2}\left(2 \cdot b_{i,0}^{(q)} + b_{i,1}^{(q)}\right)\right)$$

$$v_{2i+1}^{(x)} = \exp\left(j\frac{\pi}{2}\left(2 \cdot b_{i,2}^{(q)} + b_{i,3}^{(q)}\right)\right)$$

where $X_i^{(q)} = 2^3 \cdot b_{i,0}^{(q)} + 2^2 \cdot b_{i,2}^{(q)} + 2^0 \cdot b_{i,3}^{(q)}$, q is an integer of 0 to N−1, and i is an integer greater than or equal to 0.

18. The mobile station of claim 16, wherein the preamble is a Secondary Advanced Preamble (SA-Preamble).

19. The mobile station of claim 18, wherein the SA-Preamble is located on subcarriers given by the following equation, $$SAPreambleCarrierSet_n = n + 3 \cdot k + 40 \cdot \frac{N_{SAP}}{144} + \left\lfloor \frac{2 \cdot k}{N_{SAP}} \right\rfloor$$

where n is an index of an SA-Preamble carrier set, indicating a segment Identifier (ID) ranging from 0 to 2, $N_{SAP}$ is a value given for the SA-Preamble, and k is an integer ranging from 0 to $N_{SAP}-1$.

20. The mobile station of claim 19, wherein the cell identifier (IDcell) is determined by the following equation, $$IDcell = 256 \times n + Idx$$

where n is the index of the SA-Preamble carrier set, indicating the segment ID ranging from 0 to 2, and Idx is an integer ranging from 0 to 255, the Idx being obtained from the index of the modulation sequence.

* * * * *